US012592190B2

(12) United States Patent
Zhang et al.

(10) Patent No.: US 12,592,190 B2
(45) Date of Patent: Mar. 31, 2026

(54) PIXEL CIRCUIT, DISPLAY PANEL COMPRISING THE PIXEL CIRCUIT, AND DISPLAY DEVICE

(71) Applicant: BOE TECHNOLOGY GROUP CO., LTD., Beijing (CN)

(72) Inventors: Hao Zhang, Beijing (CN); Libin Liu, Beijing (CN); Yu Feng, Beijing (CN); Song Cui, Beijing (CN); Mingche Hsieh, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 121 days.

(21) Appl. No.: 18/681,742

(22) PCT Filed: May 23, 2023

(86) PCT No.: PCT/CN2023/095715
§ 371 (c)(1),
(2) Date: Feb. 6, 2024

(87) PCT Pub. No.: WO2024/239225
PCT Pub. Date: Nov. 28, 2024

(65) Prior Publication Data
US 2025/0225929 A1 Jul. 10, 2025

(51) Int. Cl.
*G09G 3/3233* (2016.01)

(52) U.S. Cl.
CPC ..... *G09G 3/3233* (2013.01); *G09G 2310/061* (2013.01); *G09G 2310/08* (2013.01);
(Continued)

(58) Field of Classification Search
CPC ........... G09G 3/3233; G09G 2310/061; G09G 2310/08; G09G 2320/0233;
(Continued)

(56) References Cited

U.S. PATENT DOCUMENTS 11,620,942 B2 * 4/2023 Yang .................... G09G 3/3233 345/212
11,811,004 B1 11/2023 Xing
(Continued)

FOREIGN PATENT DOCUMENTS

CN 106129094 A 11/2016
CN 108107623 A 6/2018
(Continued)

*Primary Examiner* — Dmitriy Bolotin
(74) *Attorney, Agent, or Firm* — Myers Bigel, P.A.

(57) ABSTRACT

A pixel circuit includes a pixel driving circuit, a first light-emitting element, a second light-emitting element, a switching circuit including a first terminal, a second terminal and a control terminal, and a reset circuit. The pixel driving circuit is electrically connected to the first light-emitting element the first terminal is electrically connected to the pixel driving circuit, the second terminal is electrically connected to the second light-emitting element, the switching circuit is configured to: electrically connect the second light-emitting element to the pixel driving circuit in response to the control terminal receiving a first level signal, and disconnect an electrical connection between the second light-emitting element and the pixel driving circuit in response to the control terminal receiving a second level signal. The reset circuit is configured to reset the first light-emitting element and/or the second light-emitting element using the first reference voltage under control of the reset control signal.

18 Claims, 29 Drawing Sheets

(52) U.S. Cl.
CPC ............... *G09G 2320/0233* (2013.01); *G09G 2320/0247* (2013.01); *G09G 2320/0257* (2013.01)

(58) Field of Classification Search
CPC ... G09G 2320/0247; G09G 2320/0257; G09G 3/3208
See application file for complete search history.

(56) References Cited

U.S. PATENT DOCUMENTS

| | | | | |
|---|---|---|---|---|
| 12,315,457 | B2 * | 5/2025 | Hwang | G09G 3/3258 |
| 2005/0024339 | A1 * | 2/2005 | Yamazaki | H04M 1/0214 345/169 |
| 2009/0115705 | A1 | 5/2009 | Miller et al. | |
| 2012/0249407 | A1 | 10/2012 | Hatakeyama | |
| 2018/0277026 | A1 | 9/2018 | Xu et al. | |
| 2018/0294311 | A1 | 10/2018 | Hsiang et al. | |
| 2019/0073955 | A1 * | 3/2019 | Zou | G09G 3/3258 |
| 2019/0317343 | A1 | 10/2019 | Li et al. | |
| 2019/0362674 | A1 * | 11/2019 | Xu | G09G 3/3241 |
| 2021/0166630 | A1 * | 6/2021 | Kim | G09G 3/3291 |
| 2021/0173260 | A1 | 6/2021 | Kimura | |
| 2021/0208431 | A1 | 7/2021 | You et al. | |
| 2022/0076632 | A1 * | 3/2022 | Tang | G09G 3/3275 |
| 2022/0399529 | A1 | 12/2022 | Shin et al. | |
| 2023/0005423 | A1 * | 1/2023 | Lu | G09G 3/3233 |
| 2023/0096638 | A1 | 3/2023 | Lou | |
| 2023/0100284 | A1 * | 3/2023 | Yao | G09G 3/3233 345/55 |
| 2023/0337456 | A1 | 10/2023 | Sakakibara et al. | |
| 2024/0363065 | A1 * | 10/2024 | Shen | G09G 3/3233 |

FOREIGN PATENT DOCUMENTS

| | | | |
|---|---|---|---|
| CN | 108549166 | A | 9/2018 |
| CN | 109564366 | A | 4/2019 |
| CN | 114447252 | A | 5/2022 |
| CN | 115172425 | A | 10/2022 |
| CN | 115188752 | A | 10/2022 |
| CN | 115273661 | A | 11/2022 |
| CN | 115331583 | A | 11/2022 |
| CN | 115457909 | A | 12/2022 |
| JP | 2007-094230 | A | 4/2007 |
| JP | 2012-215666 | A | 11/2012 |
| KR | 10-2022-0008699 | A | 1/2022 |
| WO | 2022/044240 | A1 | 3/2022 |

* cited by examiner

PIXEL CIRCUIT, DISPLAY PANEL COMPRISING THE PIXEL CIRCUIT, AND DISPLAY DEVICE

RELATED APPLICATIONS

The present application is the U.S. national phase entry of PCT/CN2023/095715, with an international filing date of May 23, 2023, the entire disclosures of which are incorporated herein by reference.

TECHNICAL FIELD

The present application relates to the field of electronic circuit technologies, and more specifically, to a pixel circuit, a display panel comprising the pixel circuit, and a display device comprising the display panel.

BACKGROUND

With the development of electronic semiconductor technology and Internet technology, electronic display products have been widely used in people's daily life and work. Moreover, in addition to the common image display function, other additional or personalized functions for the display products are also desired. When display products are used in public places, there may be requirements that the displayed image content is not suitable for viewing by others or that the displayed content needs to be kept confidential. For example, people using mobile phones or tablet display devices on public transportation do not expect the displayed content to be easily seen by others next to or nearby. Moreover, this need for confidentiality of displayed content continues to grow. Therefore, in some occasions, some anti-peep measures need to be taken to protect the privacy of content displayed on a display product. At present, a commonly used measure is to install an anti-peep film on the display screen of a display product to reduce the display viewing angle.

SUMMARY

An embodiment of the application proposes a pixel circuit comprising a pixel driving circuit, a first light-emitting element, a second light-emitting element, a switching circuit and a reset circuit. The pixel driving circuit is electrically connected to the first light-emitting element to drive the first light-emitting element to emit light, the switching circuit comprises a first terminal, a second terminal and a control terminal, the first terminal of the switching circuit is electrically connected to the pixel driving circuit, the second terminal of the switching circuit is electrically connected to the second light-emitting element, and the switching circuit is configured to: electrically connect the second light-emitting element to the pixel driving circuit in response to the control terminal receiving a first level signal, so that the pixel driving circuit drives the second light-emitting element to emit light, and disconnect an electrical connection between the second light-emitting element and the pixel driving circuit in response to the control terminal receiving a second level signal, so that the second light-emitting element is in a non-luminous state. The reset circuit comprises a reference voltage connection terminal for receiving a first reference voltage and a reset control terminal for receiving a reset control signal, the reset circuit is electrically connected to either of the first terminal and the second terminal of the switching circuit, and at least one of the first light-emitting element and the second light-emitting element, and is configured to reset the first light-emitting element and/or the second light-emitting element using the first reference voltage under control of the reset control signal.

According to some embodiments of the application, the switching circuit comprises a first transistor, the first terminal of the switching circuit comprises a first electrode of the first transistor, the second terminal of the switching circuit comprises a second electrode of the first transistor, and the control terminal of the switching circuit comprises a control electrode of the first transistor, the first electrode of the first transistor is electrically connected to a first electrode of the first light-emitting element, the second electrode of the first transistor is electrically connected to a first electrode of the second light-emitting element, the control electrode of the first transistor is configured to receive the first level signal or the second level signal, and a second electrode of the first light-emitting element and a second electrode of the second light-emitting element are electrically connected to a second reference voltage terminal.

According to some embodiments of the application, the reset circuit comprises a second transistor, a first electrode of the second transistor is electrically connected to the first electrode of the second light-emitting element, a second electrode of the second transistor is electrically connected to the reference voltage connection terminal, and a control electrode of the second transistor is electrically connected to the reset control terminal.

According to some embodiments of the application, the reset circuit comprises a second transistor, a first electrode of the second transistor is electrically connected to the first electrode of the first light-emitting element, a second electrode of the second transistor is electrically connected to the reference voltage connection terminal, and a control electrode of the second transistor is electrically connected to the reset control terminal.

According to some embodiments of the application, the reset circuit comprises a third transistor and a fourth transistor, the third transistor and the fourth transistor are connected in series between a first electrode of the first light-emitting element and a first electrode of the second light-emitting element, a second electrode of the first light-emitting element and a second electrode of the second light-emitting element are electrically connected to a second reference voltage terminal, a first node between the third transistor and the fourth transistor is electrically connected to the reference voltage connection terminal, and a control electrode of the third transistor and a control electrode of the fourth transistor are electrically connected to the reset control terminal.

According to some embodiments of the application, the switching circuit comprises a fifth transistor, the first terminal of the switching circuit comprises a first electrode of the fifth transistor, the second terminal of the switching circuit comprises a second electrode of the fifth transistor, and the control terminal of the switching circuit comprises a control electrode of the fifth transistor, the pixel driving circuit comprises a driving transistor, a sixth transistor, and a power supply voltage terminal for receiving a power supply voltage, the driving transistor and the sixth transistor are connected in series between the power supply voltage terminal and the first electrode of the first light-emitting element, the first electrode of the fifth transistor is electrically connected to a first electrode or a second electrode of the sixth transistor, and the second electrode of the fifth transistor is electrically connected to the first electrode of the second light-emitting element.

According to some embodiments of the application, the pixel driving circuit includes a driving transistor, a sixth transistor, a seventh transistor, and a power supply voltage terminal for receiving a power supply voltage, and the seventh transistor, the driving transistor and the sixth transistor are connected in series between the power supply voltage terminal and the first electrode of the first light-emitting element successively, the pixel driving circuit further comprises an eighth transistor, a first electrode of the eighth transistor is electrically connected to a third node between the driving transistor and the seventh transistor, a second electrode of the eighth transistor is electrically connected to a third reference voltage terminal, and a control electrode of the eighth transistor is electrically connected to the reset control terminal.

According to some embodiments of the application, the pixel driving circuit further comprises a ninth transistor, a tenth transistor, a capacitor, and a fourth reference voltage terminal, wherein the capacitor, the ninth transistor and the tenth transistor are connected in series between the power supply voltage terminal and the fourth reference voltage terminal successively, and a control electrode of the driving transistor is electrically connected to a fourth node between the capacitor and the ninth transistor. A control electrode of the tenth transistor is electrically connected to the reset control terminal, and a control electrode of the ninth transistor is configured to receive a first scanning signal.

According to some embodiments of the application, the pixel driving circuit further comprises an eleventh transistor and a twelfth transistor, a first electrode and a second electrode of the eleventh transistor are electrically connected to a second node between the driving transistor and the sixth transistor, and a fifth node between the ninth transistor and the tenth transistor, respectively, a first electrode of the twelfth transistor is configured to receive a data signal, a second electrode of the twelfth transistor is electrically connected to the third node, and a control electrode of the eleventh transistor and a control electrode of the twelfth transistor are configured to receive a second scanning signal.

According to some embodiments of the application, the ninth transistor comprises a metal oxide thin film transistor, and the driving transistor, the sixth transistor, the seventh transistor, the eighth transistor, the tenth transistor, the eleventh transistor and the twelfth transistor each comprises a low temperature polysilicon thin film transistor.

Another embodiment of the application provides a display panel, comprising: a base substrate; and a plurality of pixel circuits, each pixel circuit being the pixel circuit according to any of the foregoing embodiments, the plurality of pixel circuits are arranged in an array on the base substrate to form a pixel circuit array.

According to some embodiments of the application, the display panel comprises a first reference voltage line on the base substrate, and the first reference voltage line is electrically connected to the reference voltage terminal to transmit the first reference voltage, two adjacent pixel circuits in the pixel circuit array share the first reference voltage line, and the two adjacent pixel circuits are symmetrically arranged on two sides of the first reference voltage line.

According to some embodiments of the application, the first reference voltage line comprises a first portion extending in a column direction of the pixel circuit array and a second portion extending in a row direction of the pixel circuit array, and the first portion intersects the second portion, the two adjacent pixel circuits are symmetrically arranged on two sides of the first portion.

According to some embodiments of the application, the switching circuit comprises a first transistor, the first terminal of the switching circuit comprises a first electrode of the first transistor, the second terminal of the switching circuit comprises a second electrode of the first transistor, the control terminal of the switching circuit comprises a control electrode of the first transistor, the reset circuit comprises a second transistor, a first electrode of the second transistor is electrically connected to a first electrode of the first light-emitting element or the second light-emitting element, a second electrode of the second transistor is electrically connected to the reference voltage connection terminal, and a control electrode of the second transistor is electrically connected to the reset control terminal, the pixel driving circuit comprises a driving transistor, a sixth transistor, and a power supply voltage terminal for receiving a power supply voltage, and the driving transistor and the sixth transistor are connected in series between the power supply voltage terminal and the first electrode of the first light-emitting element, the display panel further comprises a first gate metal layer on the base substrate, wherein the first gate metal layer comprises a first gate metal line, a second gate metal line and a third gate metal line that extend along the row direction of the pixel circuit array and are spaced apart from each other in the column direction of the pixel circuit array, the first gate metal line comprises a gate of the first transistor, the second gate metal line comprises a gate of the second transistor, the third gate metal line comprises a gate of the sixth transistor, and the first gate metal line is located between the second gate metal line and the third gate metal line.

According to some embodiments of the application, the reset circuit comprises a third transistor and a fourth transistor, the third transistor and the fourth transistor are connected in series between a first electrode of the first light-emitting element and a first electrode of the second light-emitting element, a second electrode of the first light-emitting element and a second electrode of the second light-emitting element are electrically connected to a second reference voltage terminal, a first node between the third transistor and the fourth transistor is electrically connected to the reference voltage connection terminal, and a control electrode of the third transistor and a control electrode of the fourth transistor are electrically connected to the reset control terminal, the switching circuit comprises a fifth transistor, the first terminal of the switching circuit comprises a first electrode of the fifth transistor, the second terminal of the switching circuit comprises a second electrode of the fifth transistor, and the control terminal of the switching circuit comprises a control electrode of the fifth transistor, the pixel driving circuit comprises a driving transistor, a sixth transistor, and a power supply voltage terminal for receiving a power supply voltage, the driving transistor and the sixth transistor are connected in series between the power supply voltage terminal and the first electrode of the first light-emitting element, the first electrode of the fifth transistor is electrically connected to a second node between the driving transistor and the sixth transistor, and the second electrode of the fifth transistor is electrically connected to the first electrode of the second light-emitting element, the display panel further comprises a first gate metal layer on the base substrate, wherein the first gate metal layer comprises a fourth gate metal line, a fifth gate metal line and a sixth gate metal line that extend along the row direction of the pixel circuit array and are spaced apart from each other in the column direction of the pixel circuit array, the fourth gate metal line comprises gates of the third transistor and the fourth transistor, the fifth gate metal line comprises a gate of the fifth transistor, the sixth gate metal line comprises a gate of the sixth transistor, and the fifth gate metal line is located between the fourth gate metal line and the sixth gate metal line.

According to some embodiments of the application, the display panel further comprises a third gate metal layer, the third gate metal layer is located on a side of the second gate metal layer facing away from the base substrate, and comprises a top gate of a ninth transistor and a fourth reference voltage line, and the fourth reference voltage line is electrically connected to the fourth reference voltage terminal to transmit a fourth reference voltage, the display panel further comprises a source-drain metal layer on a side of the third gate metal layer facing away from the base substrate, and the source-drain metal layer comprises the first reference voltage line.

According to some embodiments of the application, the display panel further comprises a semiconductor layer on a side of the first gate metal layer facing the base substrate, and the semiconductor layer comprises patterns of active layers, first electrodes and second electrodes of the first transistor, the second transistor and the sixth transistor, patterns of an active layer, the first electrode and the second electrode of the first transistor are connected to patterns of an active layer, a first electrode and a second electrode of the sixth transistor, and patterns of an active layer, the first electrode and the second electrode of the second transistor are separated from patterns of active layers, first electrodes and second electrodes of the first transistor and the sixth transistor, the display panel further comprises a source-drain metal layer on a side of the first gate metal layer facing away from the base substrate, and the source-drain metal layer comprises the first reference voltage line and an electrode transition line, wherein the electrode transition line electrically connects the patterns of the active layer, the first electrode and the second electrode of the second transistor to the patterns of the active layer, the first electrode and the second electrode of the sixth transistor.

According to some embodiments of the application, the display panel comprises a semiconductor layer on a side of the first gate metal layer facing the base substrate, and the semiconductor layer comprises first electrodes, second electrodes and active layers of the third transistor and the fourth transistor, patterns of first electrodes, second electrodes and active layers of third transistors and fourth transistors in the two adjacent pixel circuits are symmetrical with respect to the first portion, the display panel further comprises a source-drain metal layer on a side of the first gate metal layer facing away from the base substrate, and the source-drain metal layer comprises the first reference voltage line, sources of the third transistors and the fourth transistors in the two adjacent pixel circuits are electrically connected to the first reference voltage line via a same via hole at a connection point between the first portion and the second portion.

According to some embodiments of the application, the display panel further comprises a first light-shielding layer on a side of the first gate metal layer facing the base substrate, the first light-shielding layer comprises a plurality of first light-shielding portions, and the first gate metal layer comprises a gate of the driving transistor, an orthographic projection of one of the plurality of first light-shielding portions on the base substrate covers and exceeds orthographic projections of the gate and an active layer of the driving transistor on the base substrate.

Another embodiment of the application provides display panel, comprising: a base substrate; a pixel circuit according to any one of the foregoing embodiments on the base substrate; a pixel definition layer on a side of the pixel circuit facing away from the base substrate, the pixel definition layer defining a first light-emitting region of the first light-emitting element and a second light-emitting region of the second light-emitting element; and an optical structure on a side of the pixel definition layer facing away from the base substrate. The optical structure is optically coupled to the first light-emitting region to suppress propagation of light from the first light-emitting element in a first emission direction that is not perpendicular to a light-emitting surface of the display panel.

According to some embodiments of the application, the optical structure comprises a light-absorbing layer, the light-absorbing layer at least partially surrounds the first light-emitting region, and an orthographic projection of the light-absorbing layer on the base substrate does not overlap an orthographic projection of the second light-emitting region on the base substrate.

According to some embodiments of the application, the display panel further comprises an encapsulation layer on a side of the pixel definition layer facing away from the base substrate, the optical structure further comprises a light-transmitting layer, the light-absorbing layer comprises a first light-absorbing sub-layer and a second light-absorbing sub-layer, the first light-absorbing sub-layer is located on a side of the encapsulation layer facing away from the base substrate, the light-transmitting layer covers the first light-absorbing sub-layer, and the second light-absorbing sub-layer is located on a side of the light-transmitting layer facing away from the base substrate.

According to some embodiments of the application, the light-transmitting layer comprises a first light-transmitting portion and a second light-transmitting portion, the first light-transmitting portion is located on a side of the first light-absorbing sub-layer facing away from the base substrate, the second light-transmitting portion is located on a side of the first light-transmitting portion facing away from the base substrate, and the second light-transmitting portion covers the first light-transmitting portion, the second light-transmitting portion has a refractive index higher than a refractive index of the first light-transmitting portion.

According to some embodiments of the application, the display panel further comprises an encapsulation layer on a side of the pixel definition layer facing away from the base substrate, the optical structure comprises a microlens on a side of the encapsulation layer facing away from the base substrate, and the microlens is configured to converge light from the first light-emitting element.

Yet another embodiment of the present application provides a display device, which may comprise the display panel according to any of the foregoing embodiments.

These and other advantages of the present application will be apparent from and set forth with reference to the embodiments described below.

BRIEF DESCRIPTION OF THE DRAWINGS

Embodiments of the present application will now be described in more detail and with reference to the accompanying drawings. It can be understood that the electrical components and layer structures of the display panel shown in the accompanying drawings only schematically represent partial structures in the display panel that are related to technical solutions described in the embodiments of the present application, and do not necessarily represent the actual product structures.

Figure 1A:
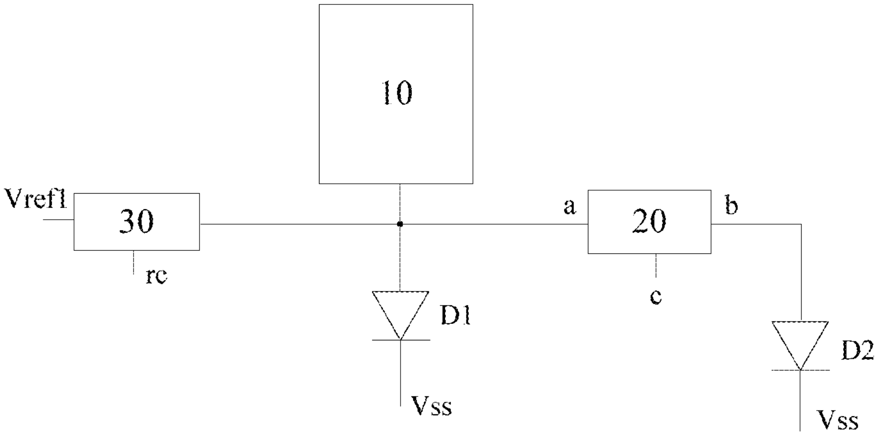
FIG. 1*a* illustrates a structural block diagram of a pixel circuit according to an embodiment of the application.

These and other advantages of the present application will be apparent from and set forth with reference to the embodiments described hereinafter.

DETAILED DESCRIPTION OF EMBODIMENTS

Specific details of embodiments of the application will be provided in the description below to enable those skilled in the art to fully understand and implement the embodiments of the application. In some cases, the application does not show or describe in detail some structures or functions that are well known in the art, in order to avoid unnecessary descriptions from obscuring the description of the embodiments of the application. The technical solution of the present application can be embodied in many different forms and purposes, and should not be limited to the embodiments set forth herein. These embodiments are provided to make the technical solution of the application clear and complete, but they do not define the protection scope of this patent application.

Here, some terms involved in the embodiments of the application are first described to facilitate understanding by those skilled in the art. The "control electrode" mentioned herein refers to a gate of a transistor for receiving a scanning signal. The transistor may be in an on-state or an off-state under the control of the signal received by its control electrode. The "first electrode" of a transistor mentioned herein refers to one of two terminals among the terminals of the transistor except the control electrode, and the "second electrode" of a transistor refers to the other one of the two terminals among the terminals of the transistor except the control electrode. That is, the first electrode of a transistor may be one of the source and the drain of the transistor, and the second electrode of the transistor may be the other of the source and the drain of the transistor. The "first light-emitting element" or "second light-emitting element" mentioned herein refers to an element that can be driven by a voltage to emit light. The first light-emitting element or the second light-emitting element may be various diodes such as an organic light-emitting diode. A first electrode of a light-emitting element refers to one of the cathode and the anode, and a second electrode of the light-emitting element refers to the other of the cathode and the anode.

The "display panel" and "display device" mentioned herein both have an image display function, but the display device may include some components that the display panel does not have. In other words, the display device is a display product that can be delivered directly to users. Although the display panel has an image display function, it does not yet comprise some necessary peripheral components (e.g., frame, etc.). Therefore, a display panel can be regarded as part of a display device.

An embodiment of the application provides a pixel circuit. The pixel circuit comprises a pixel driving circuit, a first light-emitting element, a second light-emitting element, a switching circuit and a reset circuit. The pixel driving circuit is electrically connected to the first light-emitting element to drive the first light-emitting element to emit light. The switching circuit comprises a first terminal, a second terminal and a control terminal. The first terminal of the switching circuit is electrically connected to the pixel driving circuit, and the second terminal of the switching circuit is electrically connected to the second light-emitting element. The switching circuit is configured to: electrically connect the second light-emitting element to the pixel driving circuit in response to the control terminal receiving a first level signal, so that the pixel driving circuit drives the second light-emitting element to emit light, and disconnect an electrical connection between the second light-emitting element and the pixel driving circuit in response to the control terminal receiving a second level signal, so that the second light-emitting element is in a non-luminous state. The reset circuit comprises a reference voltage connection terminal for receiving a first reference voltage and a reset control terminal for receiving a reset control signal, and the reset circuit is electrically connected to either of the first terminal and the second terminal of the switching circuit, and at least one of the first light-emitting element and the second light-emitting element, and is configured to reset the first light-emitting element or the second light-emitting element using the first reference voltage under the control of the reset control signal.

Figure 1B:
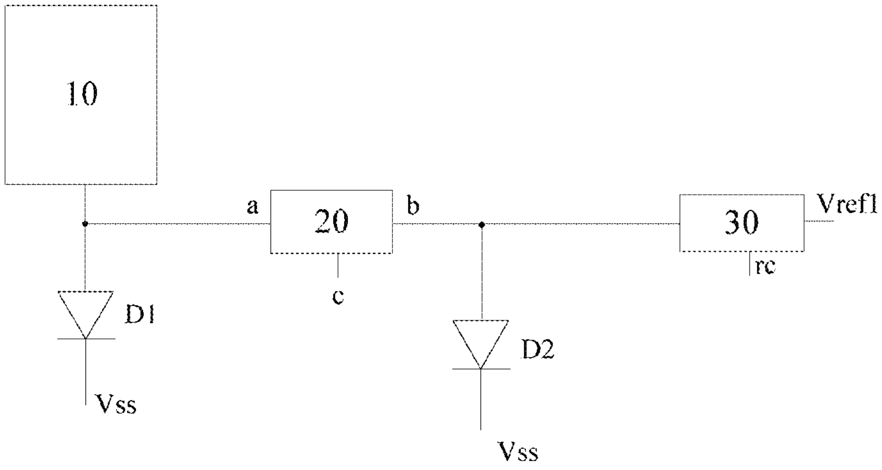
FIG. 1*b* illustrates a structural block diagram of a pixel circuit according to another embodiment of the application.
Figure 1C:
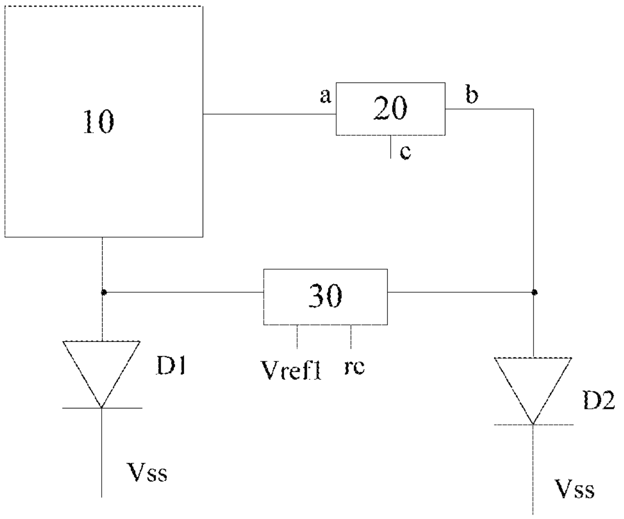
FIG. 1*c* illustrates a structural block diagram of a pixel circuit according to another embodiment of the application.

FIG. 1*a*, FIG. 1*b* and FIG. 1*c* illustrate different examples of the pixel circuit described above. As shown in FIG. 1*a*, the pixel circuit comprises a pixel driving circuit 10, a first light-emitting element D1, a second light-emitting element D2, a switching circuit 20 and a reset circuit 30. The pixel driving circuit 10 is electrically connected to the first light-emitting element D1 to drive the first light-emitting element D1 to emit light.

The switching circuit 20 comprises a first terminal a, a second terminal b and a control terminal c. The first terminal a of the switching circuit is electrically connected to the pixel driving circuit 10, and the second terminal b of the switching circuit is electrically connected to the second light-emitting element D2. The control terminal c of the switching circuit 20 may receive corresponding control signals having different levels. In the case that the control terminal c of the switching circuit 20 receives a first level signal, the switching circuit 20 electrically connects the second light-emitting element D2 to the pixel driving circuit 10, so that the pixel driving circuit 10 drives the second light-emitting element D2 to emit light. In the case that the control terminal c of the switching circuit 20 receives a second level signal, the switching circuit 20 disconnects the electrical connection between the second light-emitting element D2 and the pixel driving circuit 10, so that the second light-emitting element D2 is in a non-luminous state. In the pixel circuit provided by the embodiment of the application, the switching circuit 20 does not control or affect normal light emission of the first light-emitting element D1. That is to say, when the pixel circuit is in operation, if the control terminal c of the switching circuit 20 receives a first level signal, both the first light-emitting element D1 and the second light-emitting element D2 are driven by the pixel driving circuit 10 to emit light. If the control terminal c of the switching circuit 20 receives a second level signal, the second light-emitting element D2 is in a non-luminous state because it is disconnected from the pixel driving circuit 10. As shown in FIG. 1*a*, the reset circuit 30 comprises a reference voltage connection terminal Vref1 for receiving a first reference voltage and a reset control terminal rc for receiving a reset control signal. The reset circuit 30 is electrically connected to the first terminal a of the switching circuit 20 and the first light-emitting element D1, the reset circuit 30 is configured to reset the first light-emitting element D1 and/or the second light-emitting element D2 using the first reference voltage under the control of the reset control signal.

Another example of the pixel circuit is illustrated in FIG. 1*b*. Like the example shown in FIG. 1*a*, the pixel circuit comprises a pixel driving circuit 10, a first light-emitting element D1, a second light-emitting element D2, a switching circuit 20 and a reset circuit 30. Moreover, the first light-emitting element D1 and the second light-emitting element D2 in the pixel circuit shown in FIG. 1*b* operate in the same way as the example of FIG. 1*a*, that is, when the pixel circuit 10 is operating normally, if the control terminal c of the switching circuit 20 receives a first level signal, both the first light-emitting element D1 and the second light-emitting element D2 are driven by the pixel driving circuit 10 to emit light. When the control terminal c of the switching circuit 20 receives a second level signal, the second light-emitting element D2 is in a non-luminous state since it is disconnected from the pixel driving circuit 10. Different from the example shown in FIG. 1*a*, the reset circuit 30 is electrically connected to the second terminal b of the switching circuit 20 and the second light-emitting element D2, the reset circuit 30 can reset the first light-emitting element D1 or the second light-emitting element D2 using the first reference voltage received from the reference voltage connection terminal Vref1 under the control of the reset control signal.

FIG. 1*c* illustrates a further example of the pixel circuit. As shown in FIG. 1*c*, the pixel circuit comprises a pixel driving circuit 10, a first light-emitting element D1, a second light-emitting element D2, a switching circuit 20 and a reset circuit 30. The pixel driving circuit 10 is electrically connected to the first light-emitting element D1 to drive the first light-emitting element D1 to emit light. The switching circuit 20 comprises a first terminal a, a second terminal b and a control terminal c. The first terminal a of the switching circuit 20 is electrically connected to the pixel driving circuit 10, and the second terminal b of the switching circuit 20 is electrically connected to the second light-emitting element D2. The reset circuit 30 comprises a reference voltage connection terminal Vref1 for receiving a first reference voltage and a reset control terminal rc for receiving a reset control signal. The reset circuit 30 is electrically connected to the second terminal b of the switching circuit 20, the first light-emitting element D1 and the second light-emitting element D2, and the reset circuit 30 resets the first light-emitting element D1 or the second light-emitting element D2 using the first reference voltage under the control of the reset control signal. In this example, the switching circuit 20 electrically connects the second light-emitting element D2 to the pixel driving circuit 10 in response to the control terminal c receiving a first level signal, so that the pixel driving circuit 10 drives the second light-emitting element D2 to emit light. The switching circuit 20 disconnects the electrical connection between the second light-emitting element D2 and the pixel driving circuit 10 in response to the control terminal c receiving a second level signal, so that the second light-emitting element D2 is in a non-luminous state.

Inventors of the application realize that there are imperfections in conventional anti-peep solutions. For example, the anti-peep film will cause a serious decrease in the brightness of displayed images, and the actual anti-peep effect may be positively related to the thickness of the anti-peep film. However, the greater the thickness of the anti-peep film is, the more serious the influence on the brightness of displayed images will be. In addition, the anti-peep film can usually only restrict the viewing angles of viewers on two sides of a display device, and thus has a limited degree of protection for the privacy of displayed images. With the pixel circuit provided by the embodiment of the application, for display products that need to achieve an anti-peep function, an optical structure may be used to replace the anti-peep film in the conventional anti-peep solutions, which can alleviate or avoid the above defects resulting from the anti-peep film.

Figure 2A:
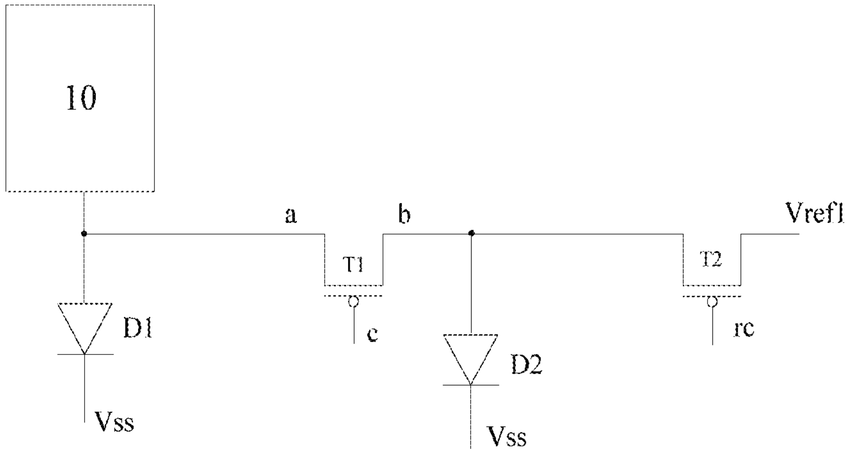
FIG. 2*a* illustrates a structural block diagram of a pixel circuit according to another embodiment of the application.
Figure 2B:
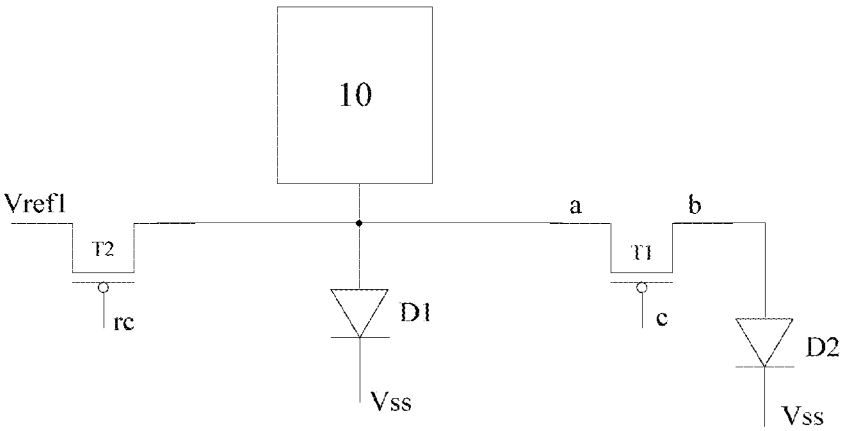
FIG. 2*b* illustrates a structural block diagram of a pixel circuit according to another embodiment of the application.
Figure 2C:
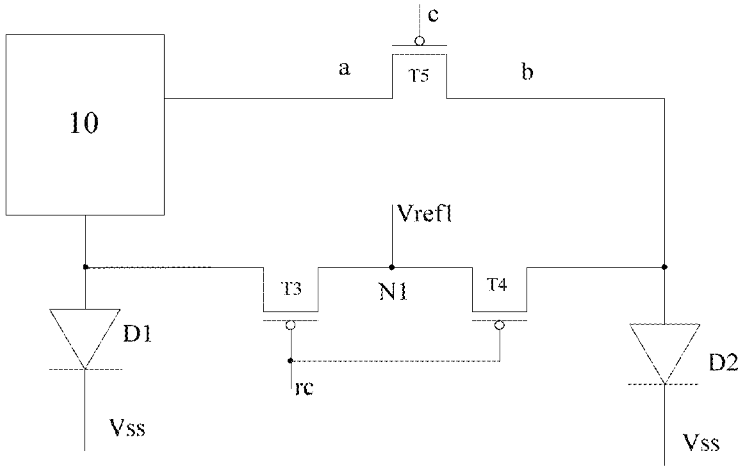
FIG. 2*c* illustrates a structural block diagram of a pixel circuit according to another embodiment of the application.

It can be understood that, based on the connection relationships between the switching circuit or the reset circuit and other circuits or elements in the pixel circuit and their functions described above, there can be various different specific implementations for the switching circuit and the reset circuit. FIG. 2*a*, FIG. 2*b* and FIG. 2*c* provide examples of different implementations of the switching circuit and the reset circuit.

As shown in FIG. 2*a*, the switching circuit comprises a first transistor T1, the first terminal a of the switching circuit comprises a first electrode of the first transistor T1, the second terminal b of the switching circuit comprises a second electrode of the first transistor T1, and the control terminal c of the switching circuit comprises a control electrode of the first transistor T1. The first electrode of the first transistor T1 is electrically connected to a first electrode (e.g., anode) of the first light-emitting element D1, the second electrode of the first transistor T1 is electrically connected to a first electrode (e.g., anode) of the second light-emitting element D2, the control electrode of the first transistor T1 is configured to receive the first level signal or the second level signal mentioned previously, and a second electrode (e.g., cathode) of the first light-emitting element D1 and a second electrode (e.g., cathode) of the second light-emitting element D2 are electrically connected to a second reference voltage terminal Vss. Referring to FIG. 2*a*, the reset circuit comprises a second transistor T2. A first electrode of the second transistor T2 is electrically connected to the first electrode of the second light-emitting element D2, a second electrode of the second transistor T2 is electrically connected to the reference voltage connection terminal Vref1, and a control electrode of the second transistor T2 is electrically connected to the reset control terminal rc. That is, in the example of FIG. 2*a*, the first light-emitting element D1 and the second light-emitting element D2 are connected in parallel to each other via the first transistor T1, and the second transistor T2 in the reset circuit is electrically connected to the first electrode of the first light-emitting element D1.

The switching circuit in the pixel circuit shown in FIG. 2*b* is the same as that in the example in FIG. 2*a*, but the second transistor in the reset circuit is connected in a different manner from that in the example in FIG. 2*a*. As shown in FIG. 2*b*, the reset circuit comprises a second transistor T2. A first electrode of the second transistor T2 is electrically connected to the first electrode of the first light-emitting element D1, a second electrode of the second transistor T2 is electrically connected to the reference voltage connection terminal Vref1, and a control electrode of the second transistor T2 is electrically connected to the reset control terminal rc. As will be discussed in the description of more specific implementations of the pixel circuit below, the embodiments of FIG. 2*a* and FIG. 2*b* have different requirements for the arrangement of control signals for the pixel circuit.

In the embodiment shown in FIG. 2*c*, the reset circuit comprises a third transistor T3 and a fourth transistor T4. The third transistor T3 and the fourth transistor T4 are connected in series between the first electrode of the first light-emitting element D1 and the first electrode of the second light-emitting element D2, the second electrode of the first light-emitting element D1 and the second electrode of the second light-emitting element D2 are electrically connected to the second reference voltage terminal Vss, and a first node N1 between the third transistor T3 and the fourth transistor T4 is electrically connected to the reference voltage connection terminal Vref1 to receive the first reference voltage mentioned previously, and control electrodes of the third transistor T3 and the fourth transistor T4 are electrically connected to the reset control terminal rc. In this embodiment, the switching circuit comprises a fifth transistor T5, the first terminal a of the switching circuit comprises a first electrode of the fifth transistor T5, the second terminal b of the switching circuit comprises a second electrode of the fifth transistor T5, and the control terminal c of the switching circuit comprises a control electrode of the fifth transistor T5. The first electrode of the fifth transistor T5 is electrically connected to the pixel driving circuit 10, and the second electrode of the fifth transistor T5 is electrically connected to the second light-emitting element D2.

Next, a specific implementation of the pixel circuit proposed in the embodiment of the application will be further described in detail through additional examples.

Figure 3:
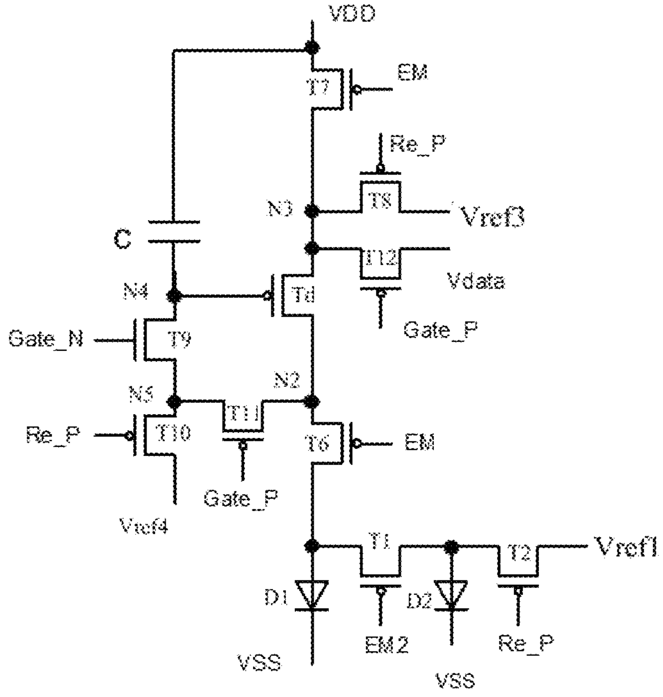
FIG. 3 illustrates a circuit diagram of a pixel circuit according to an embodiment of the application.

FIG. 3 illustrates a schematic diagram of a pixel circuit provided by an embodiment of the application. As shown in FIG. 3, the pixel circuit comprises a pixel driving circuit, a reset circuit, a switching circuit, a first light-emitting element D1 and a second light-emitting element D2. The switching circuit comprises a first transistor T1, and the reset circuit comprises a second transistor T2. The pixel driving circuit comprises a driving transistor Td, a sixth transistor T6, a seventh transistor T7, and a power supply voltage terminal VDD for receiving a power supply voltage. The seventh transistor T7, the driving transistor Td, and the sixth transistor T6 are connected in series between the power supply voltage terminal VDD and the first electrode of the first light-emitting element D1. The pixel driving circuit further comprises an eighth transistor T8. A first electrode of the eighth transistor T8 is electrically connected to a third node N3 between the driving transistor Td and the seventh transistor T7, a second electrode of the eighth transistor T8 is electrically connected to a third reference voltage terminal Vref3, and a control electrode of the eighth transistor T8 is electrically connected to the reset control terminal.

Optionally, as shown in FIG. 3, in some embodiments, the pixel driving circuit may further comprise a ninth transistor T9, a tenth transistor T10, a capacitor C and a fourth reference voltage terminal Vref4. The capacitor C, the ninth transistor T9 and the tenth transistor T10 are connected in series between the power supply voltage terminal VDD and the fourth reference voltage terminal Vref4, the control electrode of the driving transistor Td is electrically connected to a fourth node N4 between the capacitor C and the ninth transistor, a control electrode of the tenth transistor T10 is electrically connected to the reset control terminal, and a control electrode of the ninth transistor T9 is configured to receive a first scanning signal Gate_N.

As shown in FIG. 3, in some embodiments, the pixel driving circuit may further comprise an eleventh transistor T11 and a twelfth transistor T12. A first electrode and a second electrode of the eleventh transistor T11 are electrically connected to a second node N2 between the driving transistor Td and the sixth transistor T6, and a fifth node N5 between the ninth transistor T9 and the tenth transistor T10, respectively. A first electrode of the twelfth transistor T12 is configured to receive a data signal Vdata, a second electrode of the twelfth transistor T12 is electrically connected to the third node N3, and control electrodes of the eleventh transistor T11 and the twelfth transistor T12 are configured to receive a second scanning signal Gate_P.

In the example of FIG. 3, the first light-emitting element D1 and the second light-emitting element D2 may comprise an organic electroluminescent diode (OLED). The cathodes of the first light-emitting element D1 and the second light-emitting element D2 are electrically connected to the second reference voltage terminal VSS, the anode of the first light-emitting element D1 is electrically connected to the first electrode of the first transistor T1, and the anode of the second light-emitting element D2 is electrically connected to the second electrode of the first transistor T1 and the first electrode of the second transistor T2. The second electrode of the second transistor T2 is electrically connected to the reference voltage terminal Vref1 to receive the first reference voltage, the control electrode of the first transistor T1 is configured to receive a control signal EM2, and the control electrode of the second transistor T2 is configured to receive a reset control signal Re_P. The second reference voltage of the second reference voltage terminal VSS may be a ground voltage of the pixel circuit. The first reference voltage received from the first reference voltage terminal Vref1 may be a constant negative voltage lower than the second reference voltage. When the first transistor T1 and the second transistor T2 are turned on respectively under the control of respective control signals, the first reference voltage can reset the anodes of the first light-emitting element D1 and the second light-emitting element D2, or in other words, a discharge path through the second transistor T2 and the first reference voltage terminal can be formed for the anodes of the first light-emitting element D1 and the second light-emitting element D2, which is advantageous to increase the contrast of a display device that applies the pixel circuit when displaying images. The control electrode of the eighth transistor T8 is also electrically connected to the reset control terminal of the reset circuit to receive the reset control signal Re_P. The third reference voltage received by the second electrode of the eighth transistor T8 from the third reference voltage terminal Vref3 may be a constant positive voltage higher than the second reference voltage. With the third reference voltage and the eighth transistor T8, the potential of the third node N3 can be initialized before the pixel driving circuit drives the first light-emitting element D1 and the second light-emitting element D2 to emit light, which is advantageous to alleviate the drift phenomenon in the threshold voltage of the driving transistor Td, facilitate the stability of the threshold voltage of the driving transistor Td, and thus improve the flickering or afterimage phenomenon when the display device displays images.

The ninth transistor T9 and the tenth transistor T10 connected in series between the capacitor C and the fourth reference voltage terminal Vref4 can initialize the capacitor C and the control electrode of the driving transistor Td using the fourth reference voltage before the pixel driving circuit drives the first light-emitting element D1 and the second light-emitting element D2 to emit light. The control electrode of the tenth transistor T10 is also electrically connected to the reset control terminal of the reset circuit to receive the reset control signal Re_P. Therefore, in the embodiment of FIG. 3, the second transistor T2, the eighth transistor T8 and the tenth transistor T10 are controlled by the same signal, i.e., the reset control signal Re_P. The control electrode of the sixth transistor T6 and the control electrode of the seventh transistor T7 are configured to receive a control signal EM.

As can be understood from the previous introduction to the pixel circuit, the pixel circuit proposed in the embodiment of the application can actually operate in two modes. In a first operating mode, the switching circuit disconnects the electrical connection between the second light-emitting element and the pixel driving circuit, the pixel driving circuit only drives the first light-emitting element to emit light, and the second light-emitting element is in a non-luminous state. In a second operating mode, the switching circuit electrically connects the second light-emitting element to the pixel driving circuit, the pixel driving circuit can drive the first light-emitting element and the second light-emitting element to emit light simultaneously.

Figure 4A:
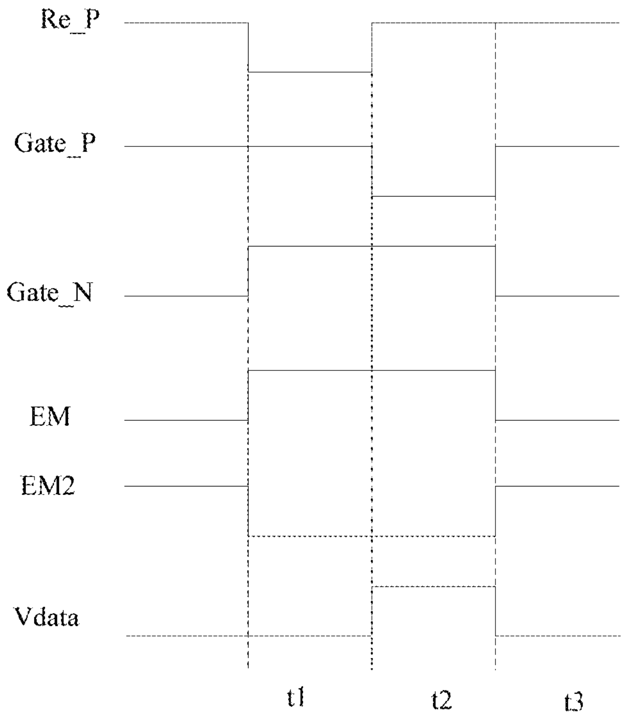
FIG. 4*a* illustrates a signal timing diagram when the pixel circuit shown in FIG. 3 is in a first operating mode.

The first operating mode of the pixel circuit shown in FIG. 3 will be described below with reference to FIG. 3 and FIG. 4*a*. FIG. 4*a* schematically illustrates a timing diagram of control signals when the pixel circuit shown in FIG. 3 is in the first operating mode. As shown in FIG. 4*a*, one frame time period for a display device may include a first time period t1, a second time period t2, and a third time period t3. During the first time period t1, the reset control signal Re_P is at a low level, the first scanning signal Gate_N is at a high level, the second scanning signal Gate_P is at a high level, the control signal EM is at a high level, and the control signal EM2 is at a low level. Accordingly, the first transistor T1, the second transistor T2, the eighth transistor T8, the ninth transistor T9 and the tenth transistor T10 are all turned on, while the sixth transistor T6, the seventh transistor T7, the eleventh transistor T11 and the twelve transistor T12 are all turned off. Therefore, the first light-emitting element D1 and the second light-emitting element D2 are both reset by the first reference voltage, so that the anodes of the first light-emitting element D1 and the second light-emitting element D2 are discharged. In addition, the third node N3 between the driving transistor Td and the seventh transistor T7 is initialized by the third reference voltage, and the fourth node N4 between the capacitor C and the driving transistor Td is initialized by the fourth reference voltage. Resetting or initializing the anodes of the first light-emitting element D1 and the second light-emitting element D2, the third node N3 between the driving transistor Td and the seventh transistor T7, and the fourth node N4 between the capacitor C and the driving transistor Td helps to improve the image display quality of the display device. During the second time period t2, the reset control signal Re_P is at a high level, the first scanning signal Gate_N is at a high level, the second scanning signal Gate_P is at a low level, the control signal EM is at a high level, and the control signal EM2 is at a low level. Accordingly, the first transistor T1, the eleventh transistor T11, the twelfth transistor T12, the ninth transistor T9 and the driving transistor Td are turned on, while the second transistor T2, the eighth transistor T8, the tenth transistor T10, the sixth transistor T6 and the seventh transistor T7 are turned off. The data signal Vdata is written into the third node N3 through the twelfth transistor T12. During the third time period t3, the reset control signal Re_P is at a high level, the first scanning signal Gate_N is at a low level, the second scanning signal Gate_P is at a high level, the control signal EM is at a low level, and the control signal EM2 is at a high level. Accordingly, the sixth transistor T6, the seventh transistor T7 and the driving transistor Td are turned on, while the first transistor T1, the second transistor T2, the eighth transistor T8, the ninth transistor T9, the tenth transistor T10, the eleventh transistor T11 and the twelfth transistor T12 are all turned off. As a result, a current path from the power supply voltage terminal VDD to the second reference voltage terminal VSS through the seventh transistor T7, the driving transistor Td, the sixth transistor T6 and the first light-emitting element D1 is formed, thus the first light-emitting element D1 emits light. However, at this time, the second light-emitting element D2 does not emit light because the first transistor T1 is in an off-state.

Figure 4B:
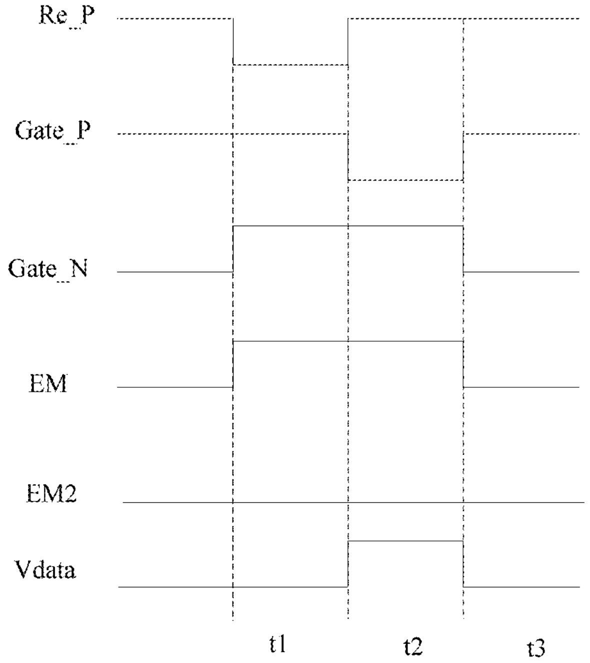
FIG. 4*b* illustrates a signal timing diagram when the pixel circuit shown in FIG. 3 is in a second operating mode.

FIG. 4*b* schematically illustrates a timing diagram of control signals when the pixel circuit shown in FIG. 3 is in the second operating mode. As shown in FIG. 4*b*, one frame time period for a display device may include a first time period t1, a second time period t2, and a third time period t3. During the first time period t1, the reset control signal Re_P is at a low level, the first scanning signal Gate_N is at a high level, the second scanning signal Gate_P is at a high level, the control signal EM is at a high level, and the control signal EM2 is at a low level. Accordingly, the first transistor T1, the second transistor T2, the eighth transistor T8, the ninth transistor T9 and the tenth transistor T10 are all turned on, while the sixth transistor T6, the seventh transistor T7, the eleventh transistor T11 and the twelve transistor T12 are all turned off. Therefore, the first light-emitting element D1 and the second light-emitting element D2 are both reset by the first reference voltage, so that the anodes of the first light-emitting element DI and the second light-emitting element D2 are discharged. In addition, the third node N3 between the driving transistor Td and the seventh transistor T7 is initialized by the third reference voltage, and the fourth node N4 between the capacitor C and the driving transistor Td is initialized by the fourth reference voltage. During the second time period t2, the reset control signal Re_P is at a high level, the first scanning signal Gate_N is at a high level, the second scanning signal Gate_P is at a low level, the control signal EM is at a high level, and the control signal EM2 is at a low level. Accordingly, the first transistor T1, the eleventh transistor T11, the twelfth transistor T12, the ninth transistor T9 and the driving transistor Td are turned on, while the second transistor T2, the eighth transistor T8, the tenth transistor T10, the sixth transistor T6 and the seventh transistor T7 are turned off. The data signal Vdata is written into the third node N3 through the twelfth transistor T12. During the third time period t3, the reset control signal Re_P is at a high level, the first scanning signal Gate_N is at a low level, the second scanning signal Gate_P is at a high level, the control signal EM is at a low level, and the control signal EM2 is at a low level. Accordingly, the first transistor T1, the sixth transistor T6, the seventh transistor T7 and the driving transistor Td are turned on, while the second transistor T2, the eighth transistor T8, the ninth transistor T9, the tenth transistor T10, the eleventh transistor T11 and the twelfth transistor T12 are all turned off. As a result, a first current path from the power supply voltage terminal VDD to the second reference voltage terminal VSS through the seventh transistor T7, the driving transistor Td, the sixth transistor T6 and the first light-emitting element D1, and a second current path from the power supply voltage terminal VDD to the second reference voltage terminal VSS through the seventh transistor T7, the driving transistor Td, the sixth transistor T6 and the second light-emitting element D2 are formed, so that the first light-emitting element D1 and the second light-emitting element D2 both emit light. That is to say, the difference between the signal timing shown in FIG. 4*b* and the signal timing shown in FIG. 4*a* lies in the control signal EM2 provided to the control electrode of the first transistor T1. For the pixel circuit shown in FIG. 3, in the second operating mode, the control signal EM2 always remains at a low level, and accordingly, the first transistor T1 is always in an on-state. Therefore, the pixel driving circuit drives the first light-emitting element D1 and the second light-emitting element D2 to emit light simultaneously.

In the example of FIG. 3, the ninth transistor T9 is a metal oxide thin film transistor, and the first transistor T1, the second transistor T2, the driving transistor Td, the sixth transistor T6, the seventh transistor T7, the eighth transistor T8, and the tenth transistor T10 and the eleventh transistor T11 are all low-temperature polysilicon thin film transistors. Low-temperature polysilicon thin film transistors have advantages of high electron mobility and fast response speed, while metal oxide thin film transistors have relatively small leakage current. In the embodiment of FIG. 3, by providing the metal oxide thin film transistor T9, the stable voltage of the capacitor C can be maintained for a longer period of time, which can provide a good basis for decreasing the frame frequency of the displayed image and achieve an effect of power saving.

Figure 5:
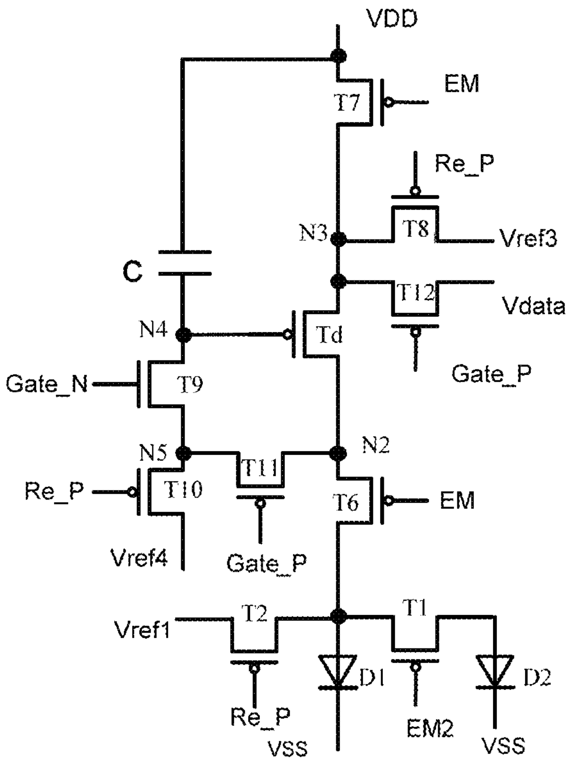
FIG. 5 illustrates a circuit diagram of a pixel circuit according to another embodiment of the application.
Figure 6:
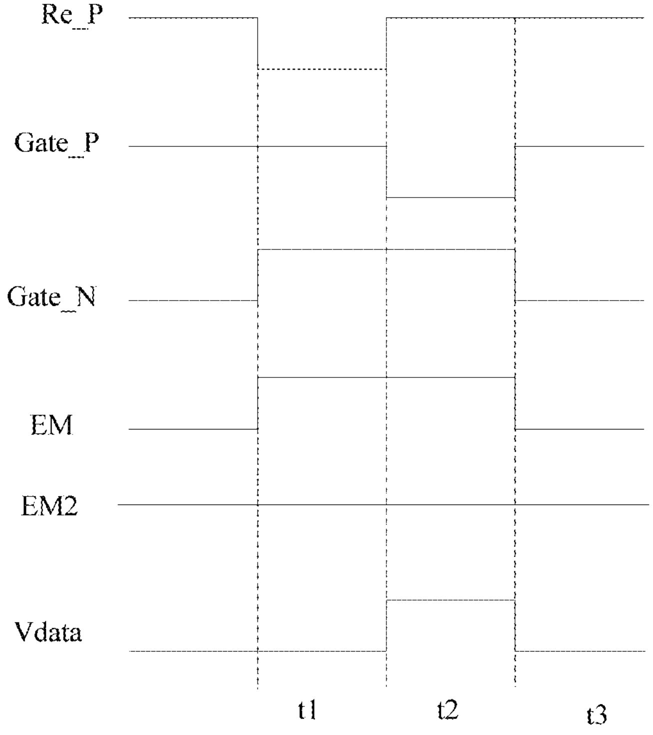
FIG. 6 illustrates a signal timing diagram when the pixel circuit shown in FIG. 5 is in a first operating mode.

FIG. 5 illustrates a circuit diagram of a pixel circuit provided by another embodiment of the application. Compared with the embodiment shown in FIG. 3, the reset circuit in the pixel circuit shown in FIG. 5 is connected in a different manner from other components in the pixel circuit. As shown in FIG. 5, the reset circuit comprises a second transistor T2, the switching circuit comprises a switching transistor T1, the first electrode of the second transistor T2 is connected to the reference voltage terminal Vref1 to receive the first reference voltage, the second electrode of the second transistor T2 is electrically connected to the anode of the first light-emitting element D1, and the second light-emitting element D2 is connected in parallel with the first light-emitting diode D1 via the first transistor T1. The pixel circuit shown in FIG. 5 can also operate in the first operating mode and second operating mode described above. FIG. 6 schematically illustrates a timing diagram of control signals when the pixel circuit shown in FIG. 5 is in the first operating mode. The timing diagram of control signals shown in FIG. 6 is substantially similar to the timing diagram of control signals shown in FIG. 4*a*, except for the control signal EM2 provided to the first transistor T1. Referring to FIG. 5 and FIG. 6, for the pixel circuit shown in FIG. 5, when the pixel circuit operates in the first operating mode, the first transistor T1 may be kept in an off-state all the time without affecting resetting of the first light-emitting element D1 by the first reference voltage or normal light emission of the first light-emitting diode D1. Therefore, as shown in FIG. 6, the control signal EM2 may be maintained at a constant high level. Compared with the situation shown in FIG. 4*a* where a control signal EM2 with varying levels needs to be provided, this can simplify the circuit for providing the control signal EM2. The circuit that provides control signals for the control electrodes of the transistors in the pixel circuit is usually disposed in a frame region of a display device. Therefore, the pixel circuit shown in FIG. 5 is conducive to reducing the area of the frame region, which will help to achieve a narrower frame of a display device.

For the pixel circuit shown in FIG. 5, a timing diagram of control signals for the second operating mode may be the same as that in FIG. 4*b*, which will not be described here again.

Figure 7:
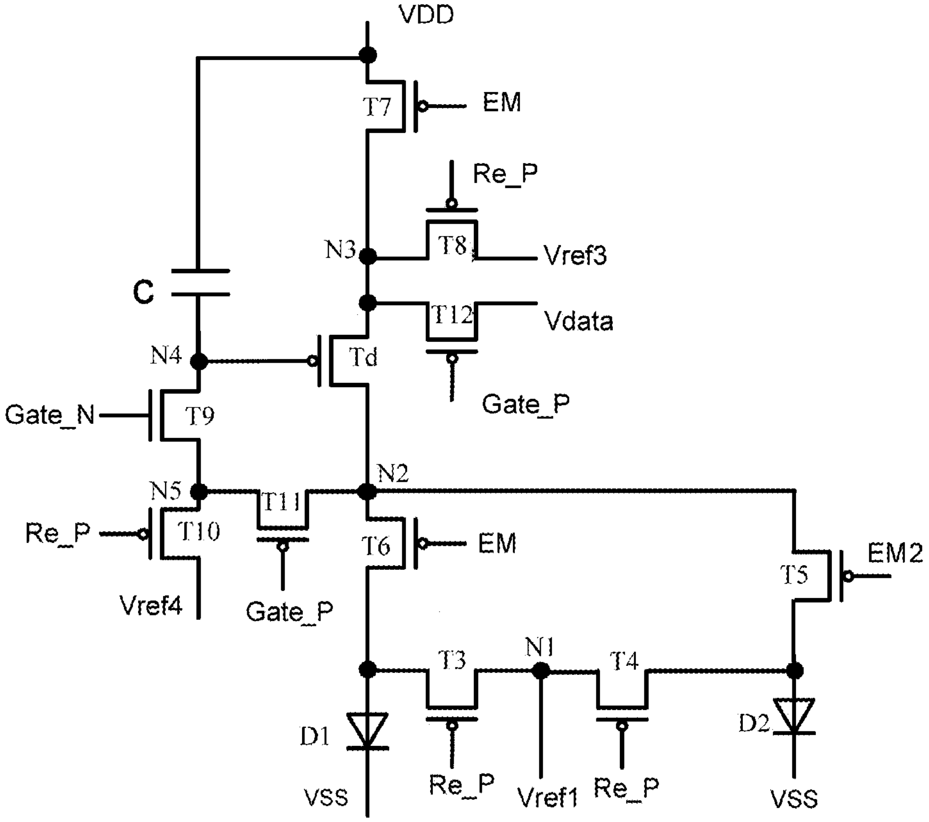
FIG. 7 illustrates a circuit diagram of a pixel circuit according to another embodiment of the application.

FIG. 7 illustrates a schematic diagram of a pixel circuit provided by another embodiment of the application. As shown in FIG. 7, a reset circuit of the pixel circuit comprises a third transistor T3 and a fourth transistor T4. The third transistor T3 and the fourth transistor T4 are connected in series between a first electrode (e.g., anode) of a first light-emitting element D1 and a first electrode (e.g., anode) of a second light-emitting element D2, a second electrode of the first light-emitting element D1 and a second electrode of the second light-emitting element D2 are electrically connected to a second reference voltage terminal Vss, a first node N1 between the third transistor T3 and the fourth transistor T4 is electrically connected to a reference voltage connection terminal Vref1, and control electrodes of the third transistor T3 and the fourth transistor T4 are electrically connected to a reset control terminal to receive a reset control signal Re_P. A switching circuit of the pixel circuit comprises a fifth transistor T5, a first terminal of the switching circuit comprises a first electrode of the fifth transistor T5, a second terminal of the switching circuit comprises a second electrode of the fifth transistor T5, and a control terminal of the switching circuit comprises a control electrode of the fifth transistor T5. A pixel driving circuit comprises a driving transistor Td, a sixth transistor T6 and a power supply voltage terminal VDD for receiving a power supply voltage. The driving transistor Td and the sixth transistor T6 are connected in series between the power supply voltage terminal VDD and the first electrode of the first light-emitting element D1, the first electrode of the fifth transistor T5 is electrically connected to a second node N2 between the driving transistor Td and the sixth transistor T6, and the second electrode of the fifth transistor T5 is electrically connected to the first electrode of the second light-emitting element. For example, the first electrode of the fifth transistor may be electrically connected to a first electrode (e.g., source) of the sixth transistor, and may also be electrically connected to a second electrode (e.g., drain) of the sixth transistor. The pixel driving circuit may further comprise a seventh transistor T7 connected in series between the power supply voltage terminal VDD and the driving transistor Td. The pixel driving circuit may further comprise an eighth transistor T8. A first electrode of the eighth transistor T8 is electrically connected to a third node N3 between the driving transistor Td and the seventh transistor T7, a second electrode of the eighth transistor T8 is electrically connected to a third reference voltage terminal Vref3 to receive a third reference voltage, and a control electrode of the eighth transistor T8 is electrically connected to the reset control terminal to receive the reset control signal Re_P. Control electrodes of the sixth transistor T6 and the seventh transistor T7 both receive a control signal EM. The control electrode of the fifth transistor T5 receives a control signal EM2. Further, the pixel driving circuit may further comprise a ninth transistor T9, a tenth transistor T10, a capacitor C, and a fourth reference voltage terminal Vref4. The capacitor C, the ninth transistor T9 and the tenth transistor T10 are connected in series between the power supply voltage terminal VDD and the fourth reference voltage terminal Vref4 successively, the control electrode of the driving transistor Td is electrically connected to a fourth node N4 between the capacitor C and the ninth transistor, a control electrode of the tenth transistor T10 is electrically connected to the reset control terminal to receive the reset control signal Re_P, and a control electrode of the ninth transistor T9 is configured to receive a first scanning signal Gate_N. Further, the pixel driving circuit further comprises an eleventh transistor T11 and a twelfth transistor T12. A first electrode and a second electrode of the eleventh transistor T11 are electrically connected to the second node N2 between the driving transistor Td and the sixth transistor T6, and a fifth node N5 between the ninth transistor T9 and the tenth transistor T10, respectively. A first electrode of the twelfth transistor T12 is configured to receive a data signal Vdata, a second electrode of the twelfth transistor T12 is electrically connected to the third node N3, and control electrodes of the eleventh transistor T11 and the twelfth transistor T12 are configured to receive a second scanning signal Gate_P.

In the embodiment shown in FIG. 7, the ninth transistor T9 is a metal oxide thin film transistor, and the other transistors may all be low-temperature polysilicon thin film transistors. The eighth transistor T8 and the ninth transistor T9 in the pixel circuit shown in FIG. 7 can achieve similar technical advantages to the eighth transistor and the ninth transistor in the embodiments shown in FIG. 3 and FIG. 5, which will not be described here again.

The pixel circuit shown in FIG. 7 may operate in a first operating mode and a second operating mode. In the first operating mode, the pixel driving circuit only drives the first light-emitting element D1 to emit light. In the second operating mode, the pixel driving circuit drives the first light-emitting element D1 and the second light-emitting element 2 to emit light simultaneously.

Figure 8A:
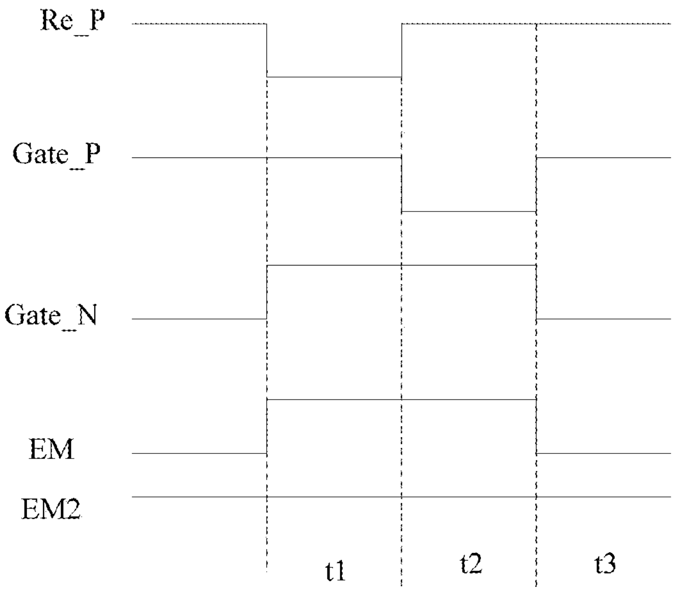
FIG. 8*a* illustrates a signal timing diagram when the pixel circuit shown in FIG. 7 is in a first operating mode.

The process of the pixel circuit shown in FIG. 7 being in the first operating mode will be described below with reference to FIG. 7 and FIG. 8*a*. FIG. 8*a* illustrates a timing diagram of control signals when the pixel circuit shown in FIG. 7 is in the first operating mode. As shown in FIG. 8*a*, one frame time period for a display device may include a first time period t1, a second time period t2, and a third time period t3. During the first time period t1, the reset control signal Re_P is at a low level, the first scanning signal Gate_N is at a high level, the second scanning signal Gate_P is at a high level, and the control signal EM and the control signal EM2 are at a high level. Accordingly, the third transistor T3, the fourth transistor T4, the eighth transistor T8, the ninth transistor T9 and the tenth transistor T10 are all turned on, while the fifth transistor T5, the sixth transistor T6, the seventh transistor T7, the eleventh transistor T11 and the twelfth transistor T12 are all turned off. Therefore, the first light-emitting element D1 and the second light-emitting element D2 are both reset by the first reference voltage provided by the reference voltage terminal Vref1, so that the anodes of the first light-emitting element D1 and the second light-emitting element D2 are discharged. The third node N3 between the driving transistor Td and the seventh transistor T7 is initialized by the third reference voltage, and the fourth node N4 between the capacitor C and the driving transistor Td is initialized by the fourth reference voltage. Resetting or initializing the anodes of the first light-emitting element D1 and the second light-emitting element D2, the third node N3 between the driving transistor Td and the seventh transistor T7, and the fourth node N4 between the capacitor C and the driving transistor Td helps to improve the image display quality of the display device. For example, resetting the first light-emitting element D1 and the second light-emitting element D2 using the first reference voltage can increase the contrast of displayed images of the display device, and resetting or initialize the third node N3 using the third reference voltage through the eighth transistor T8 can help to maintain the stability of the threshold voltage of the driving transistor Td. During the second time period t2, the reset control signal Re_P is at a high level, the first scanning signal Gate_N is at a high level, the second scanning signal Gate_P is at a low level, the control signal EM is at a high level, and the control signal EM2 remains a high level. Accordingly, the eleventh transistor T11, the twelfth transistor T12, the ninth transistor T9 and the driving transistor Td are turned on, while the third transistor T3, the fourth transistor T4, the fifth transistor T5, the eighth transistor T8, and the tenth transistor T10, the sixth transistor T6 and the seventh transistor T7 are turned off. The data signal Vdata is written into the third node N3 through the twelfth transistor T12. During the third time period t3, the reset control signal Re_P is at a high level, the first scanning signal Gate_N is at a low level, the second scanning signal Gate_P is at a high level, the control signal EM is at a low level, and the control signal EM2 is at a high level. Accordingly, the sixth transistor T6, the seventh transistor T7 and the driving transistor Td are turned on, while the third transistor T3, the fourth transistor T4, the fifth transistor T5, the eighth transistor T8, the ninth transistor T9, the tenth transistor T10, the eleventh transistor T11 and the twelfth transistor T12 are all turned off. As a result, a current path from the power supply voltage terminal VDD to the second reference voltage terminal VSS through the seventh transistor T7, the driving transistor Td, the sixth transistor T6 and the first light-emitting element D1 is formed, thus the first light-emitting element D1 emits light. However, at this time, the second light-emitting element D2 does not emit light because the fifth transistor T5 is in an off-state.

Figure 8B:
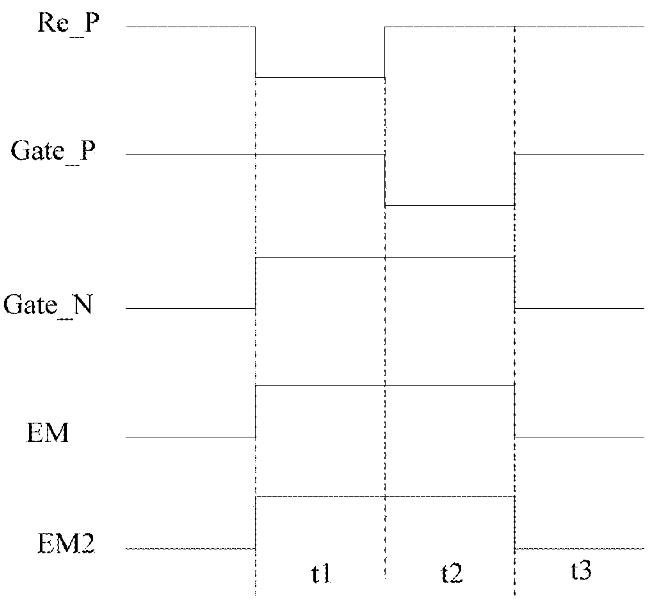
FIG. 8*b* illustrates a signal timing diagram when the pixel circuit shown in FIG. 7 is in a second operating mode.

FIG. 8*b* shows a timing diagram of control signals when the pixel circuit shown in FIG. 7 is in the second operating mode. As shown in FIG. 8*b*, one frame time period for a display device may include a first time period t1, a second time period t2, and a third time period t3. During the first time period t1, the reset control signal Re_P is at a low level, the first scanning signal Gate_N is at a high level, the second scanning signal Gate_P is at a high level, and the control signal EM and the control signal EM2 are at a high level. Accordingly, the third transistor T3, the fourth transistor T4, the eighth transistor T8, the ninth transistor T9 and the tenth transistor T10 are all turned on, while the fifth transistor T5, the sixth transistor T6, the seventh transistor T7, the eleventh transistor T11 and The twelfth transistor T12 are all turned off. Therefore, the first light-emitting element D1 and the second light-emitting element D2 are both reset by the first reference voltage provided by the reference voltage terminal Vref1, so that the anodes of the first light-emitting element D1 and the second light-emitting element D2 are discharged. The third node N3 between the driving transistor Td and the seventh transistor T7 is initialized by the third reference voltage, and the fourth node N4 between the capacitor C and the driving transistor Td is initialized by the fourth reference voltage. Resetting or initializing the anodes of the first light-emitting element D1 and the second light-emitting element D2, the third node N3 between the driving transistor Td and the seventh transistor T7, and the fourth node N4 between the capacitor C and the driving transistor Td helps to improve the image display quality of the display device. For example, resetting the first light-emitting element D1 and the second light-emitting element D2 using the first reference voltage can increase the contrast of displayed images of the display device, and resetting or initializing the third node N3 using the third reference voltage through the eighth transistor T8 can help to maintain the stability of the threshold voltage of the driving transistor Td. During the second time period t2, the reset control signal Re_P is at a high level, the first scanning signal Gate_N is at a high level, the second scanning signal Gate_P is at a low level, the control signal EM is at a high level, and the control signal EM2 remains at a high level. Accordingly, the eleventh transistor T11, the twelfth transistor T12, the ninth transistor T9 and the driving transistor Td are turned on, while the third transistor T3, the fourth transistor T4, the fifth transistor T5, the eighth transistor T8, the tenth transistor T10, the sixth transistor T6 and the seventh transistor T7 are turned off. The data signal Vdata is written into the third node N3 through the twelfth transistor T12. During the third time period t3, the reset control signal Re_P is at a high level, the first scanning signal Gate_N is at a low level, the second scanning signal Gate_P is at a high level, the control signal EM is at a low level, and the control signal EM2 is at a low level. Accordingly, the fifth transistor T5, the sixth transistor T6, the seventh transistor T7 and the driving transistor Td are turned on, while the third transistor T3, the fourth transistor T4, the eighth transistor T8, the ninth transistor T9, the tenth transistor T10, the eleventh transistor T11 and the twelfth transistor T12 are all turned off. As a result, a first current path from the power supply voltage terminal VDD to the second reference voltage terminal VSS through the seventh transistor T7, the driving transistor Td, the sixth transistor T6 and the first light-emitting element D1, and a second current path from the power supply voltage terminal VDD to the second reference voltage terminal VSS through the seventh transistor T7, the driving transistor Td, the fifth transistor T5 and the second light-emitting element D2 are formed, so that the first light-emitting element D1 and the second light-emitting element D2 both emit light. That is to say, compared with the signal timing diagram shown in FIG. 8*a*, the timing sequences of the reset control signal Re_P, the first scanning signal Gate_N, the second scanning signal Gate_P and the control signal EM shown in FIG. 8*b* are the same as those shown in FIG. 8*a*, except for the control signal EM2 shown in FIG. 8*b*. During the first time period t1 and the second time period t2, the control signal EM2 remains at a high level, so the fifth transistor T5 remains in an off-state during the first time period t1 and the second time period t2. However, this does not affect resetting of the first light-emitting element D1, the second light-emitting element D2, the third node N3 and the fourth node N4, and writing of the data signal Vdata. During the third time period t3, the control signal EM2 is at a low level, thereby turning on the fifth transistor T5. At this time, the pixel circuit actually includes two current conduction paths, so that the first light-emitting element D1 and the second light-emitting element D2 emit light simultaneously.

Figure 9:
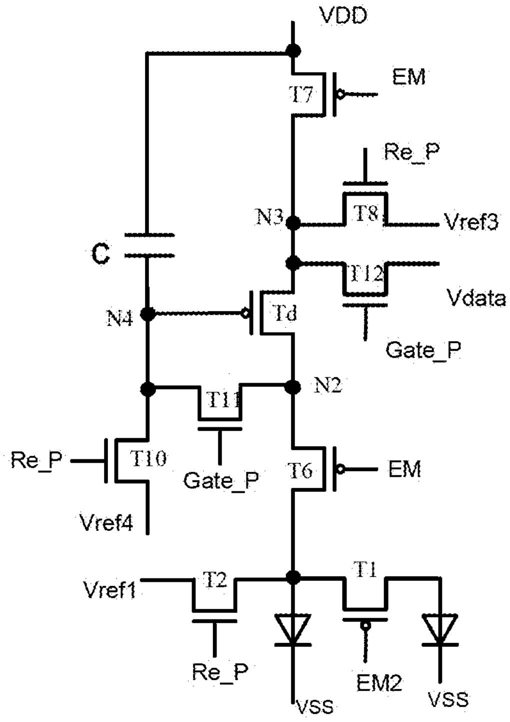
FIG. 9 illustrates a circuit diagram of a pixel circuit according to another embodiment of the application.

The pixel driving circuit in the pixel circuit provided by the embodiments of the application is not limited to the specific implementations described above with reference to FIG. 3, FIG. 5 and FIG. 7. For example, the ninth transistor T9 (metal oxide thin film transistor) in FIG. 3, FIG. 5 and FIG. 7 may be omitted, so that the transistors of the pixel circuit only include low-temperature polycrystalline thin film transistors. Alternatively, the schematic diagrams of the pixel circuits shown in FIG. 3, FIG. 5 and FIG. 7 may be amended or modified. For example, for the pixel circuit shown in FIG. 3, the ninth transistor T9 may be omitted, and meanwhile, the tenth transistor T10, the eleventh transistor T11, the eighth transistor T8, the twelfth transistor T12 and the second transistor T2 may be changed as metal oxide semiconductor transistors, thereby obtaining the pixel circuit as shown in FIG. 9.

The pixel circuit provided by the embodiments of the application may be applied to a display panel and a display device. Therefore, another embodiment of the application provides a display panel. The display panel may comprise a base substrate and a plurality of pixel circuits. Each of the plurality of pixel circuits may be the pixel circuit described in any of the foregoing embodiments. The plurality of pixel circuits may be arranged in an array on the base substrate to form a pixel circuit array.

Figure 10:
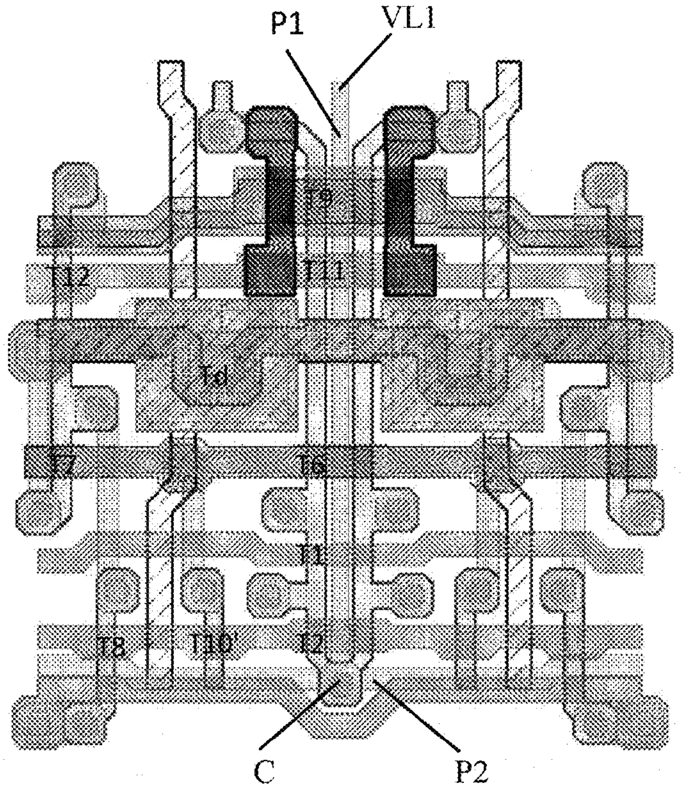
FIG. 10 illustrates a top perspective view of partial layer structures of two adjacent pixel circuits in a display panel according to an embodiment of the application.

In some embodiments, the display panel comprises a first reference voltage line on the base substrate, and the first reference voltage line is electrically connected to the reference voltage terminal of the pixel circuit to transmit the first reference voltage described previously. Two adjacent pixel circuits in the pixel circuit array share the first reference voltage line, and the two adjacent pixel circuits are symmetrically arranged on two sides of the first reference voltage line. FIG. 10 illustrates a top perspective view of partial layer structures included in two adjacent pixel circuits in the pixel circuit array. The first reference voltage line is denoted by VL1 in FIG. 10, and each pixel circuit may include a multi-layer structure on the base substrate, such as a semiconductor layer, an insulating layer, and conductive layers. Two adjacent pixel circuits being symmetrically arranged on two sides of the first reference voltage line means that the patterns of layer structures constituting the two adjacent pixel circuits are symmetrically arranged with respect to the first reference voltage line. In addition, the first reference voltage line is shared by the two adjacent pixel circuits, that is, the first reference voltage line transmits the first reference voltage to the two adjacent pixel circuits simultaneously. With such a symmetrical layout design, a compact arrangement of components of each pixel circuit on the base substrate can be realized, which can save the component layout space on the base substrate, and help to improve the resolution of a display device and implement a small-sized display device.

Next, the structure of the display panel including the pixel circuit provided by an embodiment of the application will be further explained through more specific examples.

In some embodiments, the first reference voltage line includes a first portion extending in a column direction of the pixel circuit array and a second portion extending in a row direction of the pixel circuit array, and the first portion intersects the second portion, and two adjacent pixel circuits are symmetrically arranged on two sides of the first portion. For example, FIG. 10 shows a first portion P1 and a second portion P2 of the first reference voltage line VL1. The first portion P1 extends in the column direction of the pixel circuit array, and the second portion P2 extends in the row direction of the pixel circuit array and passes through one end of the first portion P1. In FIG. 10, the first portion P1 and the second portion P2 intersect at a point C. In some embodiments, the first portions and the second portions of the first reference voltage lines in the pixel circuits in the pixel circuit array intersect each other, so that the first reference voltage lines in the display panel integrally form a grid-shaped structure.

The partial top perspective view shown in FIG. 10 may correspond to the pixel circuit shown in FIG. 3. FIG. 10 schematically shows approximate positions of the first transistor T1, the second transistor T2, the six transistors T6, the seventh transistor T7, the eighth transistor T8, the ninth transistor T9, the eleventh transistor T11 and the driving transistor Td in the pixel circuit shown in FIG. 3. The patterns on two sides of the first portion P1 of the first reference voltage line VL1 in FIG. 10 represent a layout of partial layer structures of two adjacent pixel circuits, respectively, and the partial layer structures of the two adjacent pixel circuits are symmetrical with respect to the first portion P1 of the first reference voltage line VL1. Reference sign T10' in FIG. 10 represents a partial pattern of the tenth transistor in another pixel circuit adjacent to the pixel circuit on the left side of the first portion P1 in a direction consistent with the extension direction of the first portion P1.

Taking the pixel circuit shown in FIG. 3 as an example, some main layer structures included in the pixel circuit will be individually described below by way of example.

Figure 11:
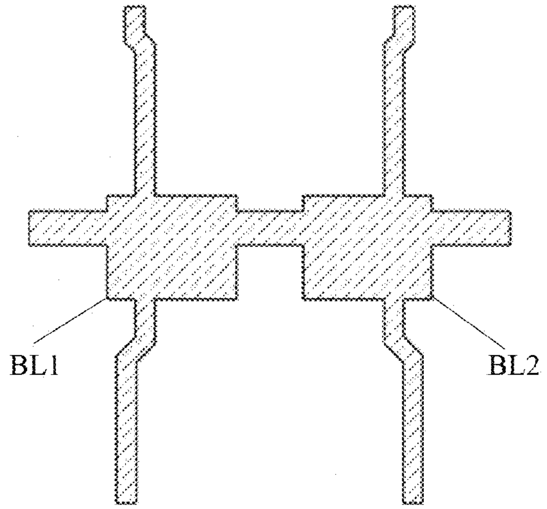
FIG. 11 illustrates a pattern of a light-shielding layer for two adjacent pixel circuits in a display panel according to an embodiment of the application.

In some embodiments, the display panel comprises a light-shielding layer on the base substrate, and the light-shielding layer may be formed of an opaque metal material. The light-shielding layer may include a plurality of light-shielding blocks and light-shielding strips connecting the light-shielding blocks into an entirety. Each light-shielding block may correspond to a pixel circuit, and the light-shielding blocks are electrically connected to each other via the light-shielding strips and have a same potential when the display panel is in operation. FIG. 11 illustrates an example of a partial pattern of the light-shielding layer. The pattern of the light-shielding layer shown in FIG. 11 may be used for two pixel circuits in the pixel circuit array which are adjacent to each other in the row direction. As shown in FIG. 11, the light-shielding layer may include a first light-shielding block BL1 and a second light-shielding block BL2. The light-shielding layer can block out a part of light that may enter the display panel from the backside opposite to the display surface of the display panel for the pixel circuit. In particular, the first light-shielding block BL1 and the second light-shielding block BL2 can block out part of light for the driving transistors in two adjacent pixel circuits, which facilitates the performance stability of the driving transistor Td in the pixel circuit.

Figure 12:
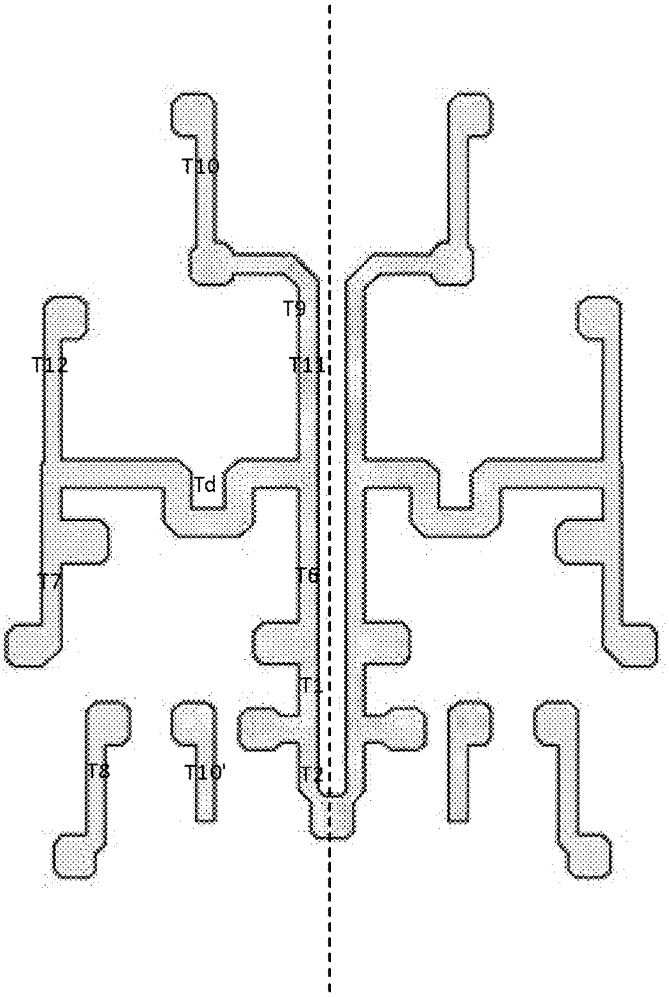
FIG. 12 illustrates a pattern of a semiconductor layer for two adjacent pixel circuits in a display panel according to an embodiment of the application.

FIG. 12 schematically illustrates a partial top view of a semiconductor layer on the base substrate. The semiconductor layer shown in FIG. 12 is used for the two adjacent pixel circuits in the pixel circuit array, and the semiconductor layer may be located on a side of the light-shielding layer facing away from the base substrate. It can be seen from FIG. 12 that the semiconductor layer for two adjacent pixel circuits also presents a symmetrical arrangement. The axis of symmetry (shown by a dotted line in FIG. 12) is actually the first portion P1 of the first reference voltage line VL1 mentioned above. The semiconductor layer shown in FIG. 12 may include an active layer, a first electrode and a second electrode (source and drain) of each transistor in the pixel circuit shown in FIG. 3. In FIG. 12, approximate positions of the active layers of the transistors in the pixel circuit shown in FIG. 3 are also shown with reference signs T1, T2, Td, etc. As can be seen from FIG. 12, at least the active layers of the first transistor T1, the second transistor T2, and the sixth transistor T6 are connected to each other to form an entirety. The patterns of the semiconductor layer on two sides of the dotted line in FIG. 12 are symmetrical with respect to the dotted line, which represent active layers, first electrodes and second electrodes of the transistors in two adjacent pixel circuits in a first direction perpendicular to the dotted line, respectively. Reference sign T10 in FIG. 12 denotes the position of the active layer of the tenth transistor in a pixel circuit on the left side of the dotted line, and reference sign T10' denotes a part of the pattern of the active layer, the first electrode and the second electrode of the tenth transistor in another pixel circuit adjacent to the pixel circuit on the left side of the dotted line in a direction consistent with the dotted line.

As described above, the switching circuit in the pixel circuit may comprise a first transistor T1. The first terminal of the switching circuit includes the first electrode of the first transistor, the second terminal of the switching circuit includes the second electrode of the first transistor, and the control terminal of the switching circuit includes the control electrode of the first transistor. The reset circuit comprises a second transistor T2. The first electrode of the second transistor T2 is electrically connected to the first electrode of the first light-emitting element or the second light-emitting element, the second electrode of the second transistor T2 is electrically connected to the reference voltage connection terminal, and the control electrode of the second transistor T2 is electrically connected to the reset control terminal rc. The pixel driving circuit includes a driving transistor Td, a sixth transistor T6 and a power supply voltage terminal VDD for receiving a supply voltage. The driving transistor Td and the sixth transistor T6 are connected in series between the power supply voltage terminal VDD and the first electrode of the first light-emitting element D1. In some embodiments, the display panel further comprises a first gate metal layer on the base substrate. The first gate metal layer includes a first gate metal line, a second gate metal line and a third gate metal line that extend along a row direction of the pixel circuit array and are spaced apart from each other in a column direction of the pixel circuit array, the first gate metal line includes a gate of the first transistor T1, the second gate metal line includes a gate of the second transistor T2, and the third gate metal line includes a gate of the sixth transistor T6, and the first gate metal line is located between the second gate metal line and the third gate metal line.

Figure 13:
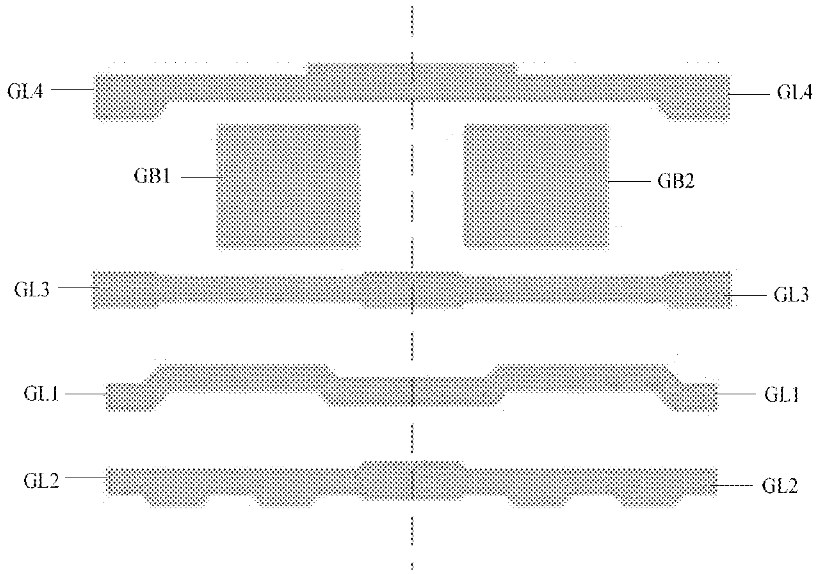
FIG. 13 illustrates a pattern of a first gate metal layer for two adjacent pixel circuits in a display panel according to an embodiment of the application.

FIG. 13 illustrates a partial top view of the first gate metal layer. The pattern of the first gate metal layer shown in FIG. 13 corresponds to the first gate metal layer in the two adjacent pixel circuits described above. The first gate metal layer includes a first gate metal line GL1, a second gate metal line GL2 and a third gate metal line GL3. The first gate metal line GL1, the second gate metal line GL2 and the third gate metal line GL3 are spaced apart from each other in the column direction of the pixel circuit array and extend along the row direction of the pixel circuit array. The first gate metal line GL1 may include a gate of the first transistor T1 in the pixel circuit shown in FIG. 3, the second gate metal line GL2 may include a gate of the second transistor T2 in the pixel circuit shown in FIG. 3, and the third gate metal line GL3 may include a gate of the sixth transistor T6 in the pixel circuit shown in FIG. 3. Using such a layout design of the pattern of the first gate metal layer can reduce the layout space occupied by the reset circuit and the switching circuit in the pixel circuit on the base substrate, which will help to decrease the area occupied by a single pixel circuit on the base substrate. It can be understood that the first gate metal line GL1, the second gate metal line GL2 and the third gate metal line GL3 may each include a gate connection line electrically connected to the gate of a corresponding transistor. In some embodiments, the first gate metal line GL1 includes a gate connection line electrically connected to the gate of the first transistor T1, the second gate metal line GL2 includes a gate of the eighth transistor T8, a gate of the tenth transistor T10 in the pixel circuit shown in FIG. 3, and corresponding gate connection lines, and the third gate metal line GL3 includes a gate of the seventh transistor T7 in the pixel circuit shown in FIG. 3 and a corresponding gate connection line. In the embodiment shown in FIG. 13, the first gate metal layer further includes a fourth gate metal line GL4, and the fourth gate metal line GL4 includes gates of the eleventh transistor T11 and the twelfth transistor T12 shown in FIG. 3 and corresponding gate connection lines. It can be seen from FIG. 13 that the first gate metal layer for two adjacent pixel circuits also presents a symmetrical arrangement. The axis of symmetry (shown by a dotted line in FIG. 13) is actually the first reference voltage line VL1 described previously.

As described above, in some embodiments, the pixel driving circuit further comprises a ninth transistor T9, a tenth transistor T10, a capacitor C, and a fourth reference voltage terminal Vref4. The capacitor C, the ninth transistor T9 and the tenth transistor T10 are connected in series between the power supply voltage terminal VDD and the fourth reference voltage terminal Vref4. The control electrode of the driving transistor Td is electrically connected to the fourth node N4 between the capacitor C and the ninth transistor, the control electrode of the tenth transistor T10 is electrically connected to the reset control terminal, and the control electrode of the ninth transistor T9 is configured to receive the first scanning signal. The first gate metal layer may further include a gate of a driving transistor. For example, FIG. 13 shows gates GB1 and GB2 used for the driving transistors Td in the two adjacent pixel circuits described above.

Figure 14:
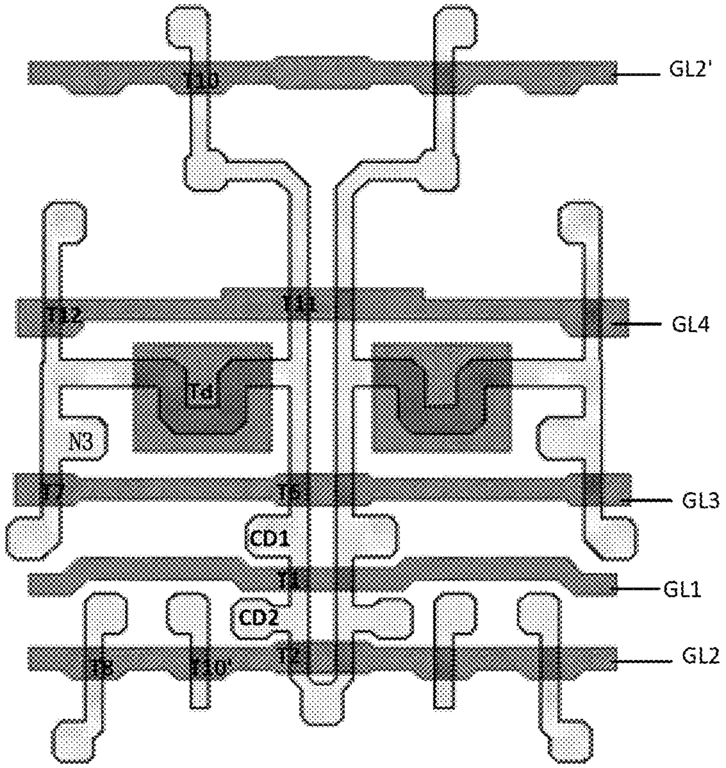
FIG. 14 illustrates a top perspective view of the semiconductor layer and the first gate metal layer for two pixel circuits in a display panel according to an embodiment of the application, which are superimposed over each other.

FIG. 14 illustrates a perspective view of the first gate metal layer and the semiconductor layer in the pixel circuit formed when they are superimposed over each other. FIG. 14 includes the first gate metal line GL1, the second gate metal line GL2, the third gate metal line GL3, the fourth gate metal line GL4, and the gates GB1 and GB2 shown in FIG. 13. GL2' in FIG. 14 denotes a second gate metal line in the first gate metal layer of a pixel circuit adjacent to the pixel circuit in FIG. 14 in the extension direction of the axis of symmetry mentioned above. FIG. 14 similarly shows approximate positions of the first transistor T1, the second transistor T2, the driving transistor Td, the sixth transistor T6, the seventh transistor T7, the eighth transistor T8, the tenth transistor T10, the eleventh transistor T11 and the twelfth transistor T12 in the pixel circuit shown in FIG. 3. T10' denotes an approximate position of the tenth transistor in another pixel circuit adjacent to the pixel circuit on the left side of the axis of symmetry in the direction consistent with the extension direction of the axis of symmetry. As shown in FIG. 14, the semiconductor layers (i.e., active layers, first electrodes and second electrodes of transistors) of the seventh transistor T7 and the twelfth transistor T12 are connected to each other. FIG. 14 further shows a node of the semiconductor layer corresponding to the third node N3 in FIG. 3. FIG. 14 further shows two connection nodes CD1 and CD2 in the semiconductor layer of the pixel circuit. The connection nodes CD1 and CD2 are electrically connected to the first light-emitting element D1 and the second light-emitting element D2 in the pixel circuit shown in FIG. 3, respectively.

Figure 15:
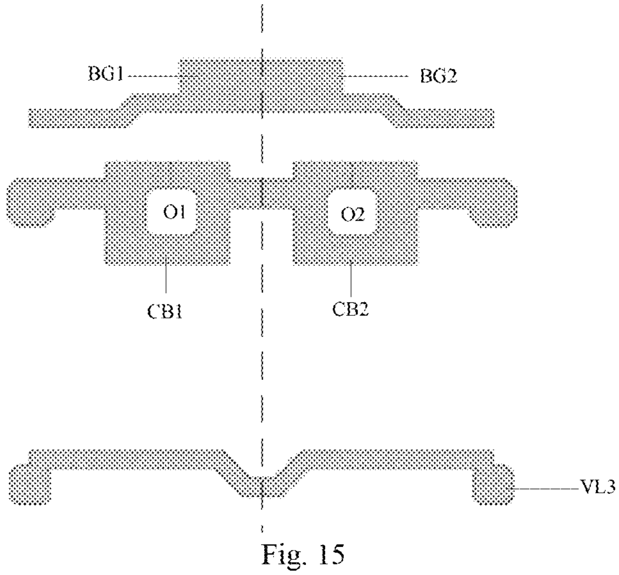
FIG. 15 illustrates a pattern of a second gate metal layer for two adjacent pixel circuits in a display panel according to an embodiment of the application.

In some embodiments, the display panel may further comprise a second gate metal layer on a side of the first gate metal layer facing away from the base substrate. FIG. 15 illustrates a pattern of a second gate metal layer for the two adjacent pixel circuits mentioned above. As shown in FIG. 15, the second gate metal layer includes capacitor electrode blocks CB1, CB2 and bottom gates BG1, BG2 of the ninth transistor T9. The orthographic projection of the capacitor electrode block CB1 or CB2 on the base substrate at least partially overlaps the orthographic projection of the gate GB1 or GB2 of the driving transistor on the base substrate, so as to form the capacitor C described above. The capacitor electrode block CB1 or CB2 includes a penetrating opening, as shown by O1 or O2 in FIG. 15. The orthographic projection of the opening O1 or O2 on the base substrate is located within the orthographic projection of the gate GB1 or GB2 of the driving transistor on the base substrate. In this embodiment, the ninth transistor T9 is a dual-gate metal oxide thin film transistor. A bottom gate of the ninth transistor T9 and the capacitor electrode blocks may be formed by performing a patterning process on the same metal layer, and are formed as the pattern of the second gate metal layer shown in FIG. 15. The opening in the capacitor electrode block may facilitate electrical connections of the gate of the driving transistor to other elements (for example, the ninth transistor T9 shown in FIG. 3) in the pixel circuit through the opening. It can be understood that the display panel may further comprise an insulating layer between the first gate metal layer and the second gate metal layer and in the aforesaid opening. For simplicity, details will not be described here. The second gate metal layer shown in FIG. 15 further includes a third reference voltage line VL3 for electrically connecting with the third reference voltage terminal Vref3 in FIG. 3 to transmit the third reference voltage. As can be seen from FIG. 15, the second gate metal layer for two adjacent pixel circuits also presents a symmetrical arrangement, and the axis of symmetry (shown by a dotted line in FIG. 15) is actually the first reference voltage line VL1.

Figure 16:
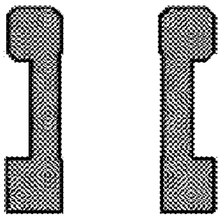
FIG. 16 illustrates a pattern of a metal oxide semiconductor channel for two adjacent pixel circuits in a display panel according to an embodiment of the application.

In some embodiments, the display panel further comprises a third gate metal layer. The third gate metal layer includes a top gate of the ninth transistor T9 and a fourth reference voltage line, and the fourth reference voltage line is electrically connected to the fourth reference voltage terminal Vref4 in the pixel circuit to transmit the fourth reference voltage. The top gate and the bottom gate of the ninth transistor T9 may be located on two opposite sides of a metal oxide semiconductor channel, respectively. FIG. 16 illustrates a pattern of a metal oxide semiconductor channel of the ninth transistor T9 in the two adjacent pixel circuits mentioned above, and FIG. 17 illustrates the third gate metal layer in the two adjacent pixel circuits mentioned above. The third gate metal layer includes top gates TG1, TG2 of the ninth transistors T9 in two adjacent pixel circuits and a fourth reference voltage line VL4. As can be seen from FIG. 17, the pattern of the third gate metal layer for two adjacent pixel circuits also presents a symmetrical arrangement. The axis of symmetry (shown by a dotted line in FIG. 17) is actually the first reference voltage line VL1.

According to some embodiments of the application, the orthographic projection of the fourth reference voltage line VL4 in the third gate metal layer on the base substrate may at least partially overlap the orthographic projection of the first gate metal line GL1 or the third gate metal line GL3 in the first gate metal layer on the base substrate, which can increase the light transmittance of the display panel and improve the image display quality of the display panel.

Although the first gate metal line GL1 or the third gate metal line GL3 may transmit the light emission control signal EM to the gate of the sixth transistor and the gate of the seventh transistor, the fourth reference voltage line VL4 is used to transmit the fourth reference voltage with a constant value, thus the fourth reference voltage line VL4 has a small impact on the light emission control signal line that transmits the control signal EM.

Figure 17:
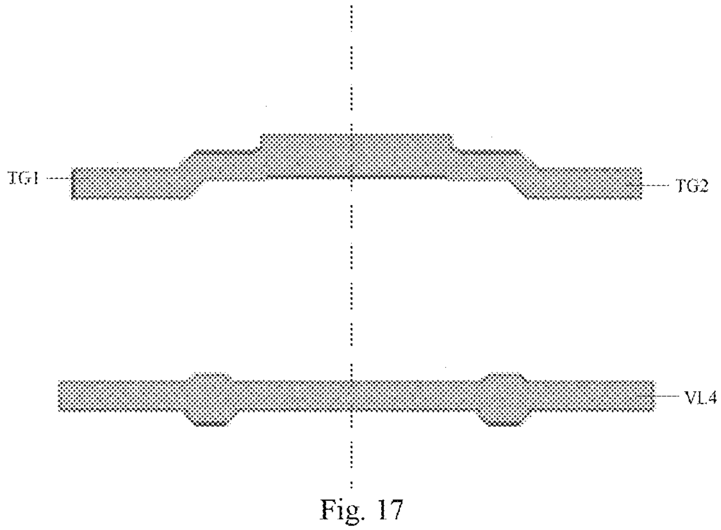
FIG. 17 illustrates a pattern of a third gate metal layer for two adjacent pixel circuits in a display panel according to an embodiment of the application.
Figure 18:
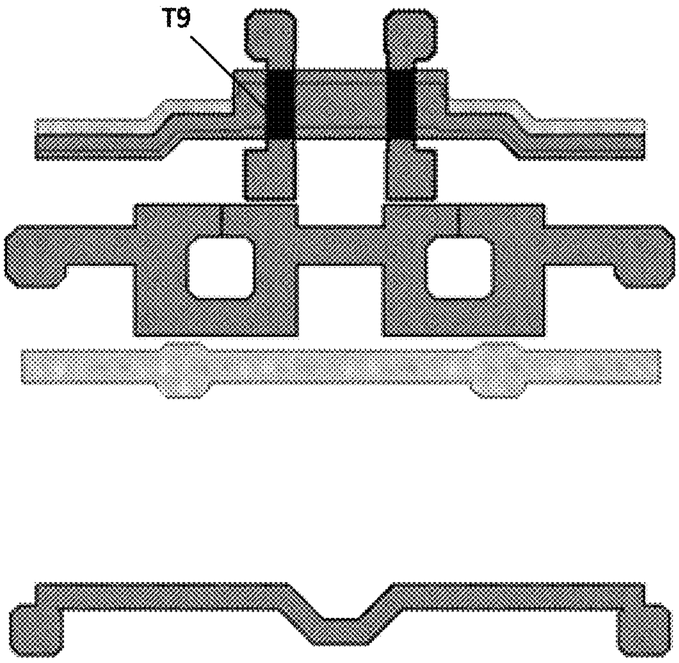
FIG. 18 illustrates a top perspective view of the second gate metal layer shown in FIG. 15, the metal oxide semiconductor channel of a ninth transistor shown in FIG. 16, and the third gate metal layer shown in FIG. 17, which are superimposed over one another.

FIG. 18 illustrates a top perspective view of the second gate metal layer shown in FIG. 15, the metal oxide semiconductor channel of the ninth transistor shown in FIG. 16, and the third gate metal layer shown in FIG. 17, which are superimposed over one another. An approximate position of the ninth transistor in the pixel circuit shown in FIG. 3 is illustrated as T9 in FIG. 18.

Figure 19:
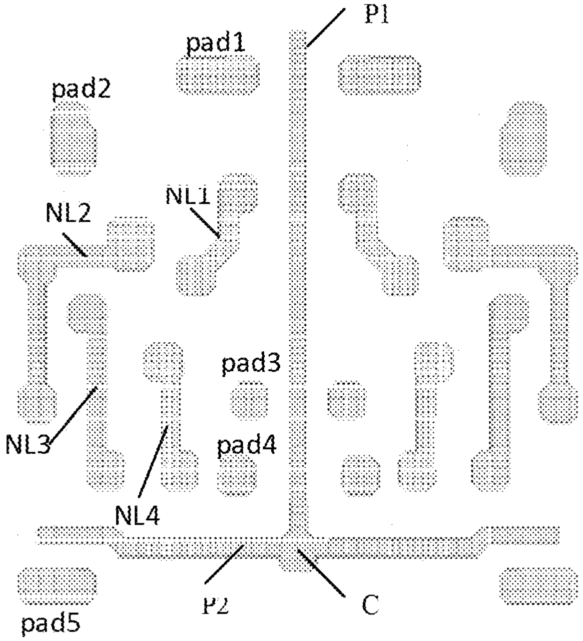
FIG. 19 illustrates a pattern of a source-drain metal layer for two adjacent pixel circuits in a display panel according to an embodiment of the application.

According to some embodiments of the application, the display panel further comprises a source-drain metal layer on a side of the third gate metal layer facing away from the base substrate, and the source-drain metal layer includes the first reference voltage line mentioned in the foregoing embodiments. The first electrode or the second electrode (i.e., source or drain) of the second transistor T2 in the two adjacent pixel circuits is electrically connected to the first reference voltage line through a first via hole at an intersection point of the first portion P1 and the second portion P2 of the first reference voltage line. FIG. 19 illustrates a partial top view of a source-drain metal layer in a display panel according to an embodiment of the present application. As described previously, the first electrodes and the second electrodes (source or drain) of transistors except the ninth transistor T9 in the pixel circuit shown in FIG. 3 are located in the semiconductor layer. The above-mentioned first via hole may penetrate an insulating layer provided between the semiconductor layer and the source-drain metal layer, and the position of the first via hole may be corresponding to an intersection point C (as shown in FIG. 19) of the first portion P1 and the second portion P2 of the first reference voltage line. That is to say, two second transistors T2 included in two adjacent pixel circuits shown in FIG. 3 are both electrically connected to the first reference voltage line through the first via hole, which can decrease the complexity of the component layout in all the pixel circuits of the display panel, and save the space occupied by the pixel circuits on the base substrate. In addition to the first reference voltage line, the source-drain metal layer further includes a plurality of source-drain connection lines, which are used to achieve electrical connections of the first electrode or the second electrode of each of the transistors shown in FIG. 3 to other transistors or electrical components. For example, FIG. 19 illustrates a plurality of connection pads pad1, pad2, pad3, pad4 and pad5, as well as a plurality of connection lines NL1, NL2, NL3 and NL4. Referring to FIG. 3 and FIG. 19, the connection pad pad1 is used to electrically connect the ninth transistor T9 with the tenth transistor T10, the connection pad pad2 is electrically connected to the twelfth transistor T12 for receiving the data signal, the connection pads pad3 and pad4 serve as transition connection pads to respectively implement electrical connections of the first light-emitting element D1 and the second light-emitting element D2 with related transistors, and the connection pad pad5 is electrically connected with the eighth transistor T8 to receive the third reference voltage. The connection lines NL1, NL2, NL3 and NL4 in FIG. 19 represent a connection line for the fourth node N4 in FIG. 3, a connection line for the power supply voltage terminal VDD, a connection line for the third node N3, and a connection line for the fourth reference voltage terminal vref4, respectively. It can be seen from FIG. 19 that the pattern of the source-drain metal layer for two adjacent pixel circuits also presents a symmetrical arrangement. In this embodiment, the axis of symmetry is the first portion P1 of the first reference voltage line.

Figure 20:
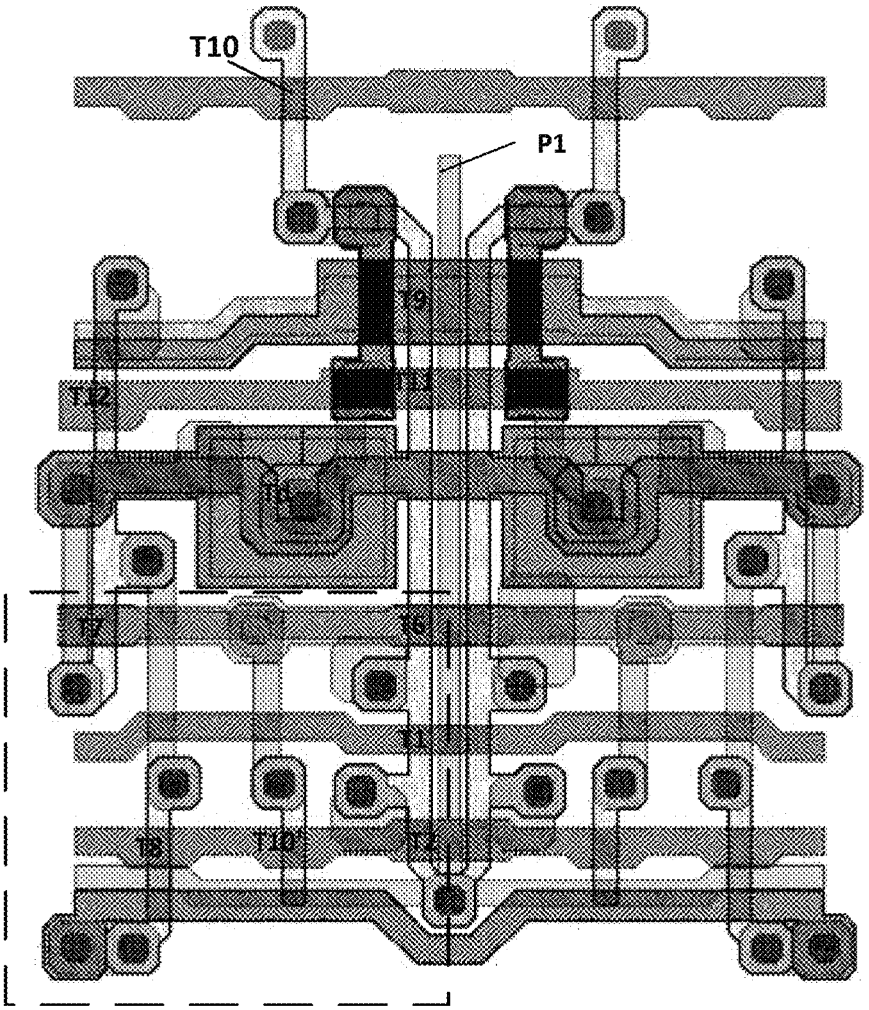
FIG. 20 illustrates a partial top perspective view of the semiconductor layer, the first gate metal layer, the second gate metal layer, the metal oxide semiconductor channel of a ninth transistor in a pixel circuit, the third gate metal layer, and the source-drain metal layer in a display panel according to some embodiments of the application, which are superimposed over one another.

FIG. 20 illustrates a partial top perspective view of the semiconductor layer, the first gate metal layer, the second gate metal layer, the metal oxide semiconductor channel of the ninth transistor in the pixel circuit, the third gate metal layer, and the source-drain metal layer in a display panel according to some embodiments of the present application, which are superimposed over one another. Compared with FIG. 10, FIG. 20 does not illustrate the light-shielding layer on the base substrate of the display panel, but FIG. 20 shows an approximate position of the tenth transistor T10 in the pixel circuit shown in FIG. 3.

Figure 21:
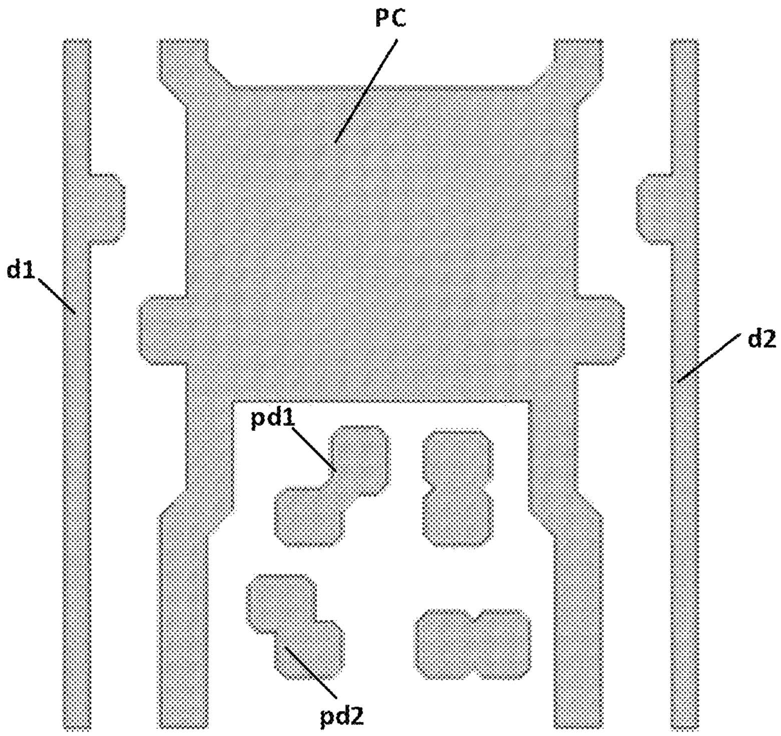
FIG. 21 illustrates a pattern of a power line metal layer for two adjacent pixel circuits in a display panel according to an embodiment of the application.

According to some embodiments of the application, the display panel further comprises a power line metal layer. The power line metal layer includes a power line. The power line is electrically connected to the power supply voltage terminal VDD of the pixel circuit to transmit a supply voltage. The power line includes a first conductive block, which is shared by two adjacent pixel circuits in the pixel circuit array. The orthographic projection of the first conductive block on the base substrate covers and exceeds the orthographic projections of the top gates and the active layers of the ninth transistors T9 in the two adjacent pixel circuits on the base substrate, and the orthogonal projections of the gate and the active layer of the driving transistor Td on the base substrate. FIG. 21 illustrates an example of a pattern of a power line metal layer for two adjacent pixel circuits. As shown in FIG. 21, the power line includes a first conductive block PC, which is shared by two adjacent pixel circuits. The orthographic projection of the first conductive block PC on the base substrate covers and exceeds the orthographic projections of the top gates and the active layers of the ninth transistors T9 in the two adjacent pixel circuits on the base substrate, and the orthogonal projections of the gate and the active layer of the driving transistor Td in the two adjacent pixel circuits on the base substrate. Therefore, in addition to transmitting the supply voltage to the two adjacent pixel circuits, the first conductive block PC in the power line may also play a role of blocking out light at least for the ninth transistor T9 and the driving transistor Td. Specifically, the first conductive block PC in the power line can partially block out external light that may enter the display panel from the display surface and would otherwise reach the ninth transistor T9 and the driving transistor Td. Since the threshold voltage of the metal oxide thin film transistor T9 is relatively sensitive to light, and variations in the threshold voltage of the driving transistor Td have a great impact on the brightness uniformity of displayed images of the display panel, the first conductive block PC is conducive to the stability of the threshold voltages of the metal oxide thin film transistor T9 and the driving transistor Td, and thereby helps to improve the image display quality of the display panel. As shown in FIG. 21, the power line metal layer may further include data lines d1 and d2 electrically connected to the twelfth transistor T12 in FIG. 3, and the data lines d1 and d2 transmit a data signal Vdata for two adjacent pixel circuits, respectively. In some embodiments, the orthographic projection of the top gate of the ninth transistor on the base substrate is located within the orthographic projection of the bottom gate of the ninth transistor on the base substrate. In this way, the positioning consistency of the top gate and the bottom gate of the ninth transistor in a vertical direction perpendicular to the base substrate can be ensured within an allowable error range of the process. FIG. 21 further illustrates connection pads pd1 and pd2 that are electrically connected to the anodes of the first light-emitting element D1 and the second light-emitting element D2 shown in FIG. 3, respectively.

Figure 22:
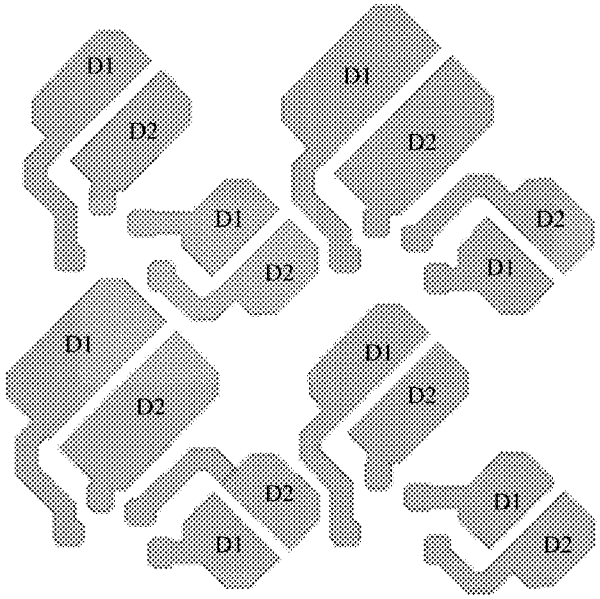
FIG. 22 illustrates a pattern of an anode layer for eight adjacent pixel circuits in a display panel according to an embodiment of the application.
Figure 23:
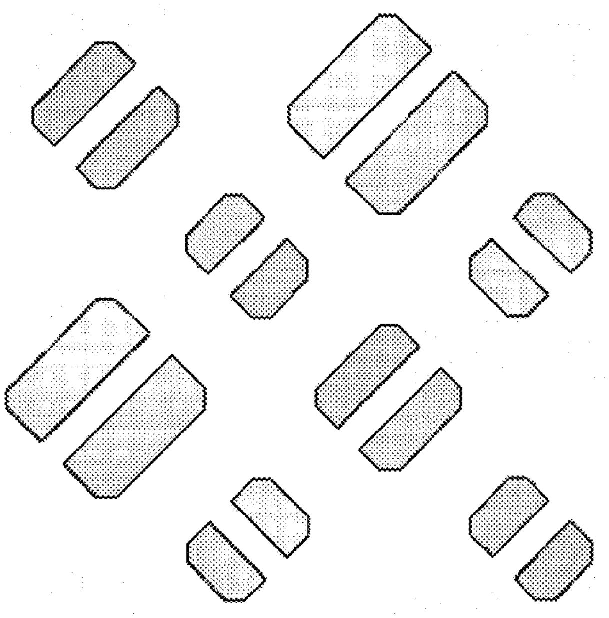
FIG. 23 illustrates a pattern of light-emitting regions of light-emitting elements for eight adjacent pixel circuits defined by a pixel definition layer in a display panel according to an embodiment of the application.

As described above, the first light-emitting element and the second light-emitting element may be organic electroluminescent diodes (OLEDs). FIG. 22 and FIG. 23 illustrate part of a pattern of anodes of the first light-emitting elements and the second light-emitting elements included in the display panel, and part of a pattern of light-emitting regions of light-emitting elements defined by a pixel definition layer, respectively. FIG. 22 illustrates anodes of sixteen light-emitting elements. The sixteen light-emitting elements can be divided into eight pairs of light-emitting elements. Each pair of light-emitting elements corresponds to a pixel circuit, and each pair of light-emitting elements includes a first light-emitting element and a second light-emitting element in a single pixel circuit. The anodes of these light-emitting elements are also shown in FIG. 22 with symbols D1 and D2 respectively. According to an embodiment of the application, the display panel further comprises a pixel definition layer for defining light-emitting regions of the first light-emitting element and the second light-emitting element in the pixel circuit. FIG. 23 schematically illustrates sixteen light-emitting regions defined by the pixel definition layer corresponding to the sixteen light-emitting elements shown in FIG. 22.

Figure 24:
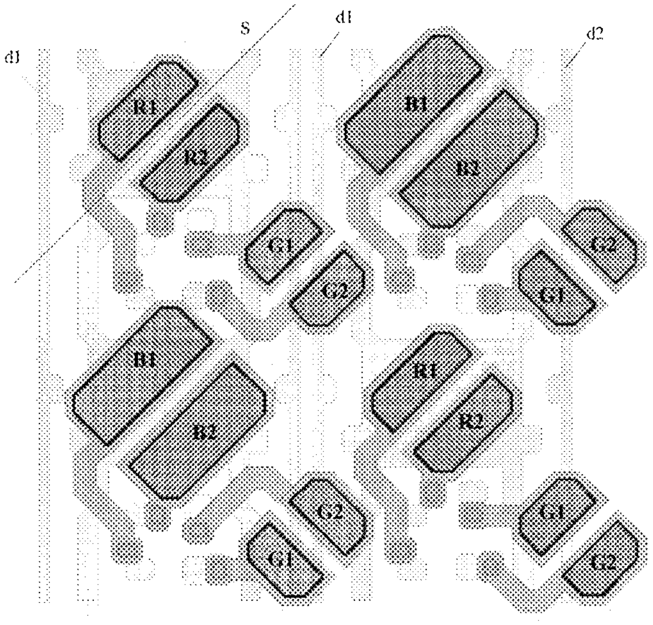
FIG. 24 illustrates a top perspective view of the power line metal layer, the anode layer and the pixel definition layer for eight adjacent pixel circuits in a display panel according to an embodiment of the application, which are superimposed over one another.

FIG. 24 illustrates a top perspective view of the pixel definition layer, the anode layer and the power line metal layer of the display panel, which are superimposed over one another. FIG. 24 illustrates a power line metal layer, as well as an anode layer and a pixel definition layer on a side of the power line metal layer facing away from the base substrate for eight pixel circuits. Since each pixel circuit includes two light-emitting elements, the eight pixel circuits involve a total of sixteen light-emitting elements. According to some embodiments of the application, light-emitting elements in different pixel circuits in the display panel can emit light of different colors, such as red, green and blue. Accordingly, the display region of the display panel includes a red pixel region, a green pixel region, and a blue pixel region. According to an embodiment of the application, the first light-emitting element and the second light-emitting element included in the same pixel circuit emit light of the same color, and each first light-emitting element or each second light-emitting element may correspond to an individual light-emitting region. As shown in FIG. 24, each pixel circuit may correspond to two individual light-emitting regions, for example, red light-emitting regions R1 and R2, green light-emitting regions G1 and G2, and blue light-emitting regions B1 and B2. The first light-emitting element D1 and the second light-emitting element D2 in the pixel circuit shown in FIG. 3 may correspond to the red light-emitting regions R1 and R2, the green light-emitting regions G1 and G2, or the blue light-emitting regions B1 and B2, respectively. As shown in FIG. 24, the first light-emitting region (e.g., red light-emitting region R1) of the first light-emitting element and the second light-emitting region (e.g., red light-emitting region R2) of the second light-emitting element defined by the pixel definition layer are spaced apart from each other and symmetrically distributed on two sides of an axis of symmetry (shown by the dotted line S in FIG. 24), the axis of symmetry intersects an extension line of the first portion P1 of the first reference voltage line. Based on the arrangement of light-emitting regions of different colors shown in FIG. 24, the luminous uniformity of the display panel can be enhanced and the aperture ratio of each light-emitting region can be improved. FIG. 24 further illustrates data lines d1 and d2 in the power line metal layer for transmitting a data signal. In the embodiment of FIG. 21, the area of the blue light-emitting region is larger than the area of the red light-emitting region, and the area of the red light-emitting region is larger than the area of the green light-emitting region. That is, the blue light-emitting region has the largest area, while the green light-emitting region has the smallest area. However, in FIG. 24, two light-emitting elements in the same pixel circuit have light-emitting regions with substantially the same area. That is, the red light-emitting regions R1 and R2 shown in FIG. 24 have the same area, the green light-emitting regions G1 and G2 have the same area, and the blue light-emitting regions B1 and B2 have the same area.

Figure 25:
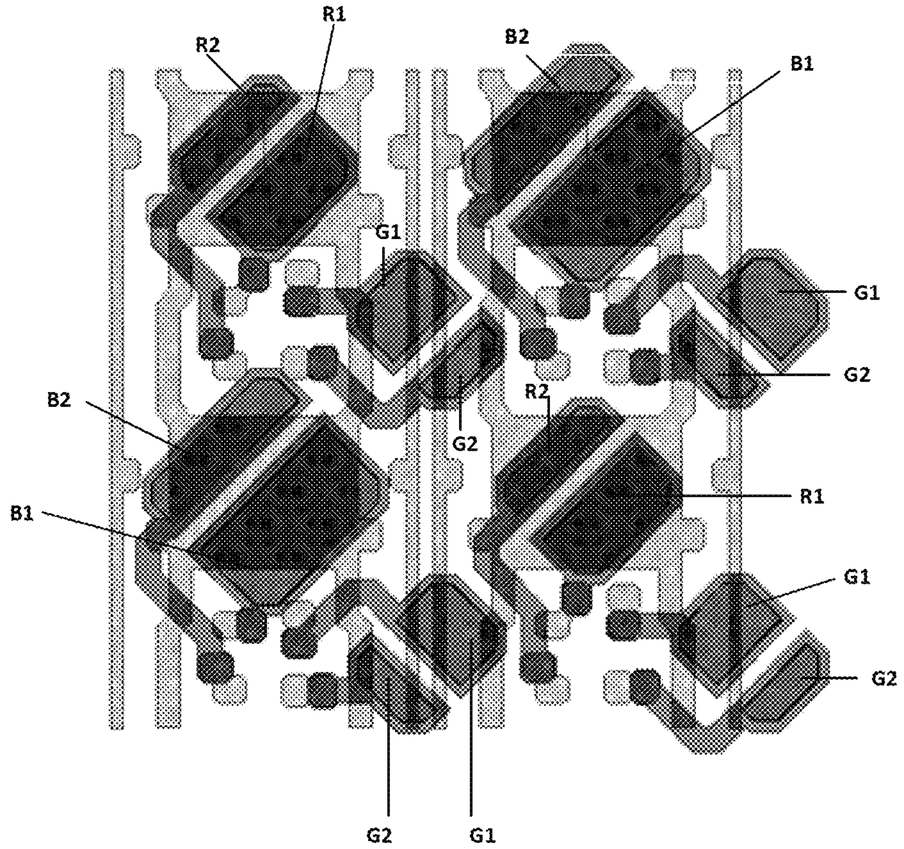
FIG. 25 illustrates a top perspective view of the power line metal layer, the anode layer and the pixel definition layer for eight adjacent pixel circuits in a display panel according to another embodiment of the application, which are superimposed over one another.

FIG. 25 illustrates a top perspective view of the pixel definition layer, the anode layer, and the power line metal layer of a display panel according to another embodiment of the application, which are superimposed over one another. The difference between FIG. 25 and FIG. 24 is that the light-emitting regions of two light-emitting elements in a single pixel circuit have different areas. For example, the area of the first light-emitting region (e.g., red light-emitting region R1) of the first light-emitting element is larger than the area of the second light-emitting region (e.g., red light-emitting region R2) of the second light-emitting element. In some embodiments, the area of the first light-emitting region of the first light-emitting element is twice the area of the second light-emitting region of the second light-emitting element. In FIG. 25, the area of the green light-emitting region G1 is twice the area of the green light-emitting region G2, the area of the red light-emitting region R1 is twice the area of the red light-emitting region R2, and the area of the blue light-emitting region B1 is twice the area of the blue light-emitting region B2. In the case where the area of the first light-emitting region of the first light-emitting element is larger than the area of the second light-emitting region of the second light-emitting element, it is advantageous to reducing the difference in service life between the first light-emitting element and the second light-emitting element.

Figure 26:
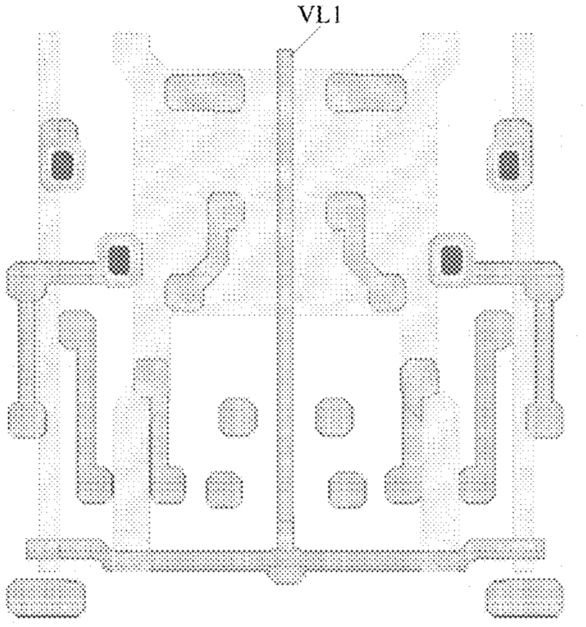
FIG. 26 illustrates a top perspective view of the power line metal layer and the source-drain metal layer for two adjacent pixel circuits in a display panel according to an embodiment of the application, which are superimposed over each other.

FIG. 26 illustrates a top perspective view of the source-drain metal layer and the power line metal layer for two adjacent pixel circuits in a display panel according to some embodiments of the application, which are superimposed over each other.

Figure 27:
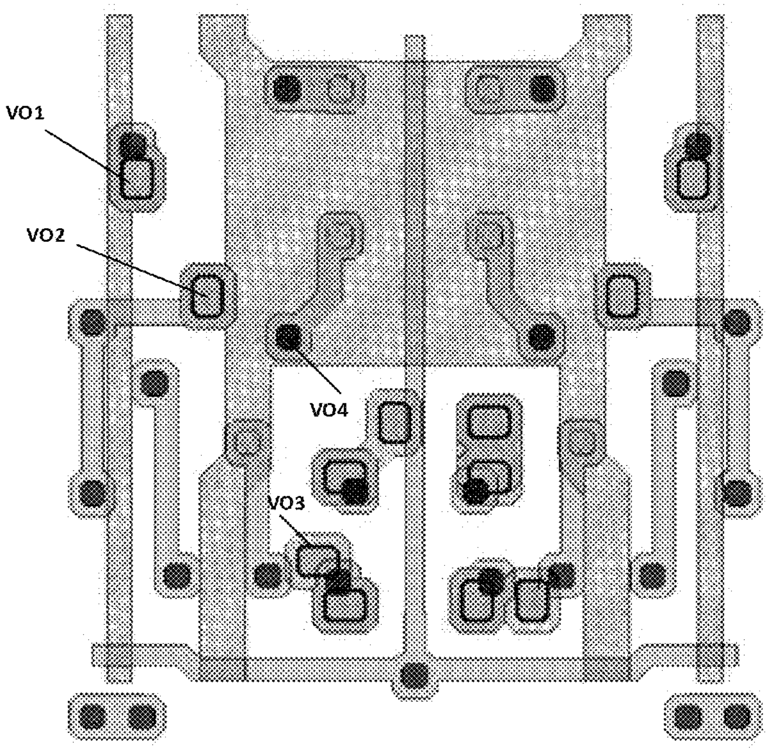
FIG. 27 illustrates locations of some via holes on the basis of FIG. 26.

According to the embodiments of the application, the light-shielding layer, the semiconductor layer, the first gate metal layer, the second gate metal layer, the metal oxide semiconductor channel layer, the third gate metal layer, the source-drain metal layer, the power line metal layer, the anode layer and the pixel definition layer may be arranged on the base substrate successively. Moreover, it can be understood that the display panel may further comprise necessary insulating layers between the above layer structures arranged successively and other layer structures required for normal operation of the pixel circuit. For example, the pixel circuit further comprise a cathode layer for each light-emitting element. For brevity, other layer structures such as insulating layers will not be described in detail herein. Different conductive layers in the display panel may be electrically connected to each other through via holes. For example, based on FIG. 26, FIG. 27 illustrates the locations of some via holes. The via holes shown by black rectangular frames in FIG. 27 include via holes (e.g., via holes VO1, VO2) that electrically connect partial patterns in the source-drain metal layer to partial patterns in the power line metal layer, and via holes (e.g., via hole VO3) that electrically connect partial patterns in the power line metal layer to the anodes of the light-emitting elements. The via holes represented by solid black dots in FIG. 27 include via holes (e.g., via hole VO4 in FIG. 27) that electrically connect partial patterns in the source-drain metal layer to partial patterns in other conductive layers (e.g., the second gate layer, the semiconductor layer or the channel layer of the ninth transistor) between the source-drain metal layer and the base substrate.

Figure 28:
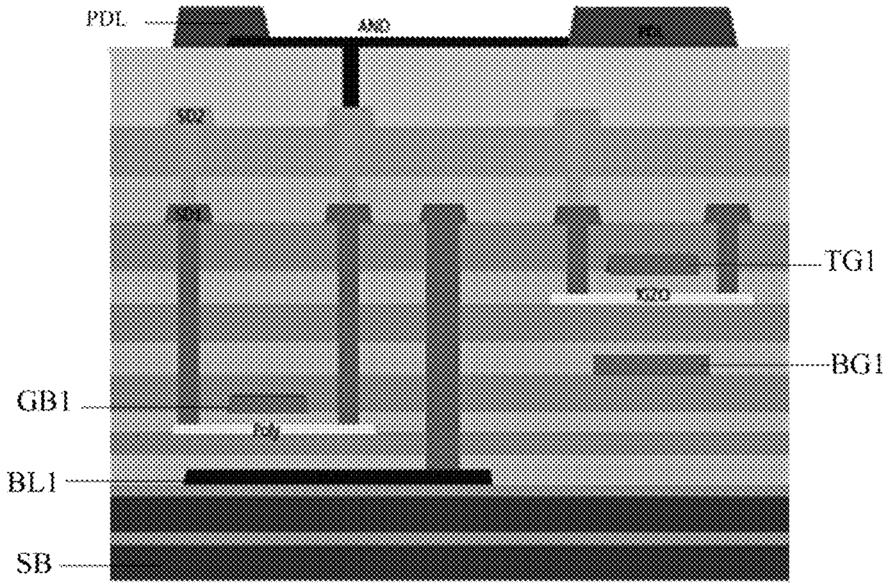
FIG. 28 illustrates a partial sectional view of a display panel according to an embodiment of the application.

In order to more clearly understand the relationships between some layer structures included in the display panel, especially the relationships between the first gate metal layer, the second gate metal layer and the third gate metal layer, FIG. 28 schematically illustrates a partial sectional view of the display panel. As shown in FIG. 28, the display panel comprises a base substrate SB and various layer structures arranged on the base substrate. BL1 in FIG. 28 represents a first light-shielding block in the light-shielding layer. The semiconductor layer includes active layers, sources and drains of the transistors except the ninth transistor shown in FIG. 3. The semiconductor layer of the driving transistor Td is a low-temperature polysilicon semiconductor layer, denoted by Poly in FIG. 28. The first gate metal layer includes a gate GB1 of the driving transistor, the second gate metal layer includes a bottom gate BG1 of the ninth transistor, and the third gate metal layer includes a top gate TG1 of the ninth transistor. The source-drain metal layer includes a source connection line SD1 electrically connected to the source of the driving transistor, and the power line metal layer includes a metal connection line SD2 connected to the source connection line SD1. In FIG. 28, the channel layer (i.e., active layer) of the ninth transistor is denoted by IGZO. The pixel definition layer and the anode of the light-emitting element are denoted by PDL and AND respectively. It may also be understood from FIG. 28 that the light-shielding layer, the semiconductor layer, the first gate metal layer, the second gate metal layer, the third gate metal layer, the source-drain metal layer, the power line metal layer, the anode layer and the pixel definition layer are arranged successively on the base substrate in a direction perpendicular to the base substrate SB, and necessary interlayer insulating layers may be included between the above layer structures.

As described previously with reference to FIG. 11, the light-shielding layer may block out part of light that may enter the display panel from the backside opposite to the display surface of the display panel for the pixel circuit. In some embodiments, the light-shielding layer includes a first light-shielding block BL1 and a second light-shielding block BL2, and the orthographic projection of the first light-shielding block BL1 or the second light-shielding block BL2 on the base substrate covers the orthographic projections of the active layers and the gates of the driving transistors in the two adjacent pixel circuits on the base substrate, as shown in FIG. 28. As a result, the first light-shielding block BL1 and the second light-shielding block BL2 can block out part of light for the driving transistors in two adjacent pixel circuits, respectively, which facilitates the stability of the threshold voltage of the driving transistor Td in the pixel circuit and improves the brightness uniformity of displayed images of the display panel.

FIG. 10 to FIG. 28 can be regarded as examples of layouts of spatial structures and planar patterns of some layers of a display panel in the case where the display panel comprises the pixel circuit shown in FIG. 3.

In the case where the display panel comprises the pixel circuit shown in FIG. 5, adjacent pixel circuits in the display panel may also have a symmetrical layout described with reference to the foregoing embodiments. That is to say, a plurality of pixel circuits as shown in FIG. 5 can form a pixel circuit array in a display panel. The display panel comprises a first reference voltage line on the base substrate, and the first reference voltage line is electrically connected to a reference voltage terminal of the pixel circuit to transmit the first reference voltage. Two adjacent pixel circuits in the pixel circuit array share the first reference voltage line, and the two adjacent pixel circuits are symmetrically arranged on two sides of the first reference voltage line. Based on such a symmetrical layout design, a compact arrangement of components of the pixel circuits on the base substrate can be realized, which can save the component layout space on the base substrate, and help to improve the resolution of the display device and implement a small-sized display device.

However, for the pixel circuit shown in FIG. 5, the patterns of partial layer structures in the display panel may be different from those in the embodiments described with reference to FIG. 10 to FIG. 28. According to some embodiments of the application, the display panel comprises a semiconductor layer on a side of the first gate metal layer facing the base substrate. The semiconductor layer includes patterns of the active layers, the first electrodes and the second electrodes of the first transistor, the second transistor and the sixth transistor. The patterns of the active layer, the first electrode and the second electrode of the first transistor are connected to the patterns of the active layer, the first electrode and the second electrode of the sixth transistor, and the patterns of the active layer, the first electrode and the second electrode of the second transistor are separated from the patterns of the active layers, the first electrodes and the second electrodes of the first transistor and the sixth transistor. The display panel further comprises a source-drain metal layer on a side of the first gate metal layer facing away from the base substrate. The source-drain metal layer includes the first reference voltage line and an electrode transition line, the electrode transition line electrically connects the patterns of the active layer, the first electrode and the second electrode of the second transistor to the patterns of the active layer, the first electrode and the second electrode of the sixth transistor. That is to say, in this embodiment, at least the semiconductor layer and the source-drain metal layer of the display panel are different from those in the embodiments described with reference to FIG. 10 to FIG. 28. This embodiment will be described in detail below with reference to FIG. 29 and FIG. 20.

Figure 29:
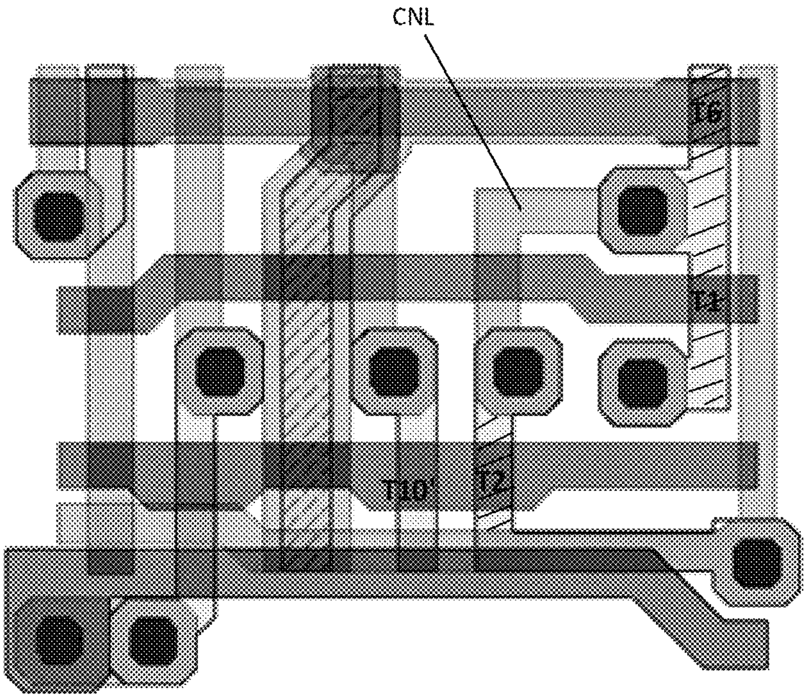
FIG. 29 illustrates a partial top perspective view of a single pixel circuit in a display panel according to an embodiment of the application corresponding to a portion shown by the lower left dotted rectangular frame in FIG. 20.

FIG. 29 illustrates a partial top perspective view of a single pixel circuit in a display panel according to an embodiment of this application, which can be regarded as being corresponding to the portion shown by the dotted rectangular frame on the bottom left of FIG. 20. For other portions of the single pixel circuit except the portion shown by the dotted rectangular frame, the pixel circuit in this embodiment may have the same structure and layout as the pixel circuit shown in FIG. 20. In FIG. 29, the patterns of the active layer, the first electrode and the second electrode of the first transistor T1, the patterns of the active layer, the first electrode and the second electrode of the sixth transistor T6, and the patterns of the active layer, the first electrode and the second electrode of the second transistor T2 are denoted by shadow portions with oblique lines. As shown in FIG. 29, the patterns of the active layer, the first electrode and the second electrode of the first transistor T1 are connected to the patterns of the active layer, the first electrode and the second electrode of the sixth transistor T6, and the patterns of the active layer, the first electrode and the second electrode of the second transistor T2 are separated from the patterns of the active layers, the first electrodes and the second electrodes of the first transistor T1 and the sixth transistor T6. That is, the semiconductor layer of the second transistor T2 is independent of the semiconductor layers of the first transistor T1 and the sixth transistor T6. In this case, in addition to the first reference voltage line described above, the source-drain metal layer of the display panel further comprises an electrode transition line CNL. The electrode transition line CNL electrically connects the patterns of the active layer, the first electrode and the second electrode of the second transistor T2 to the patterns of the active layer, the first electrode and the second electrode of the sixth transistor T6. Therefore, as shown in FIG. 29, seen from the row direction of the pixel circuit array, it can be considered that the second transistor T2 is located between the first transistor T1 of the pixel circuit and a tenth transistor T10' in another pixel circuit adjacent to the pixel circuit in the column direction of the pixel circuit array. As mentioned above, for the pixel circuit shown in FIG. 5, when the pixel circuit operates in the first operating mode, the first reference voltage can reset the first light-emitting element D1 through the second transistor T2. At this time, the first transistor T1 may be kept in an off-state all the time, without affecting resetting of the first light-emitting element D1 by the first reference voltage, or normal light emission of the first light-emitting diode D1. The control signal provided to the gate of the first transistor T1 can remain at a constant level in the first operating mode. The semiconductor layer of the second transistor T2 being independent of the semiconductor layers of other transistors enhances a physical isolation degree of the second transistor T2 from other transistors, the existence of the electrode transition line CNL ensures an electrical connection between the second transistor T2 and the sixth transistor T6 (similarly, the first light-emitting elements D1), and spatial gaps between different conductive layers on the base substrate are sufficiently utilized. This facilitates a compact arrangement of components of pixel circuits on the base substrate, saves the component layout space on the base substrate, and thereby helps to improve the resolution of the display device and achieve a small-sized display device. In addition, the second transistor T2 is far away from the gate of the first transistor T1, which will reduce the impact of a parasitic capacitance on the first transistor.

Taking the pixel circuit shown in FIG. 7 as an example, some main layer structures included in the pixel circuit will be briefly described below by way of example.

FIG. 30 to FIG. 39 illustrate some layer structures in a display panel including the pixel circuit shown in FIG. 7. Similar to the foregoing embodiments, the display panel may comprise a light-shielding layer, a semiconductor layer, a first gate metal layer, a second gate metal layer, a third gate metal layer, a source-drain metal layer, a power line metal layer, an anode layer and a pixel definition layer arranged successively on the base substrate in a direction perpendicular to the base substrate. A plurality of pixel circuits as shown in FIG. 7 form a pixel circuit array on the base substrate of the display panel. Two adjacent pixel circuits in the pixel circuit array share a first reference voltage line for transmitting the first reference voltage described above. FIG. 30 to FIG. 39 illustrate patterns of layer structures of the two adjacent pixel circuits in the pixel circuit array. The patterns of layer structures shown in FIG. 30 to FIG. 39 have a similar symmetrical characteristic as those in the embodiments described previously with reference to FIG. 10 to FIG. 28, that is, the pattern of each layer structure of two adjacent pixel circuits is symmetrical with respect to the first reference voltage line.

Figure 30:
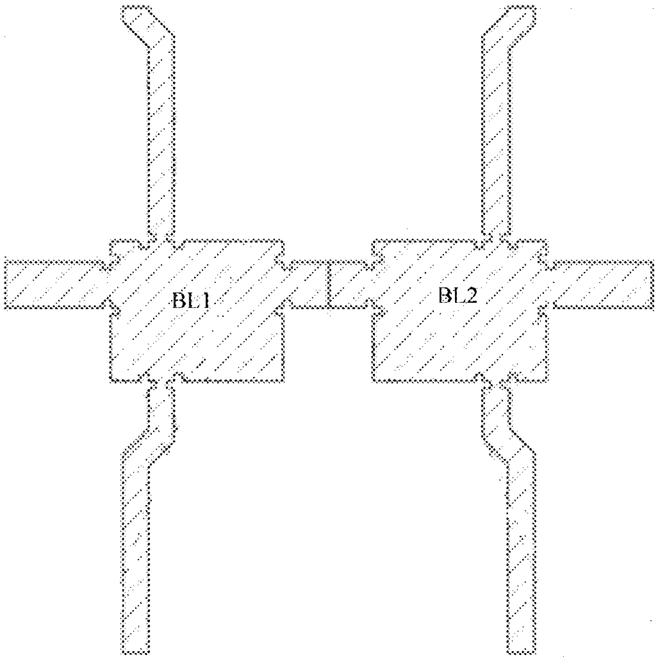
FIG. 30 illustrates a pattern of a light-shielding layer for two adjacent pixel circuits in a display panel according to another embodiment of the application.

FIG. 30 illustrates a pattern of a light-shielding layer for two adjacent pixel circuits in a display panel. The pattern of the light-shielding layer shown in FIG. 30 is similar to the pattern of the light-shielding layer shown in FIG. 11. The light-shielding layer includes a first light-shielding block BL1 and a second light-shielding block BL2, and the first light-shielding block BL1 and the second light-shielding block BL2 can block out part of light for the active layers of the driving transistors Td in two adjacent pixel circuits respectively, thereby facilitating the performance stability of the driving transistor Td in the pixel circuit.

Figure 31:
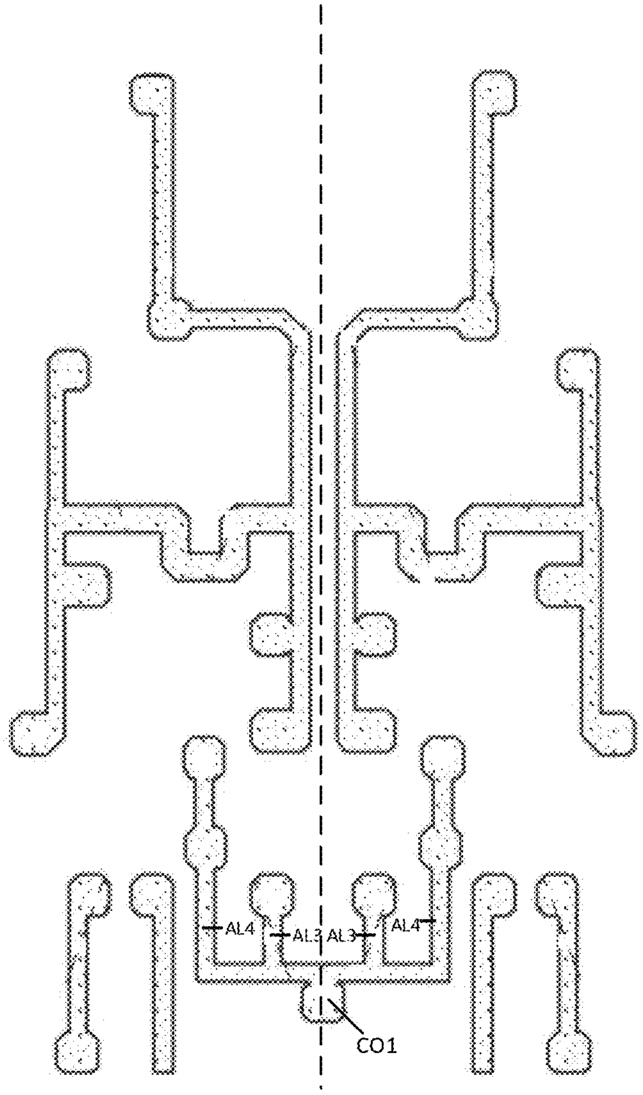
FIG. 31 illustrates a pattern of a semiconductor layer for two adjacent pixel circuits in a display panel according to another embodiment of the application.

FIG. 31 illustrates patterns of semiconductor layers for transistors other than the ninth transistor T9 in FIG. 7 in two adjacent pixel circuits. The semiconductor layer includes a first electrode (e.g., source or drain), a second electrode (e.g., source or drain), and a control electrode (e.g., gate) of respective transistor. In particular, FIG. 31 shows semiconductor layers AL3 and AL4 for the third transistor T3 and the fourth transistor T4 shown in FIG. 7. The semiconductor layers AL3 and AL4 of the third transistors T3 and the fourth transistors T4 in two pixel circuits adjacent to each other in the row direction of the pixel circuit array are symmetrical with respect to a first reference voltage line (shown by a dotted line in FIG. 31). Moreover, the semiconductor layers AL3 and AL4 of the third transistors T3 and the fourth transistors T4 in the two adjacent pixel circuits are electrically connected to the same node CO1. For example, the second electrodes of the third transistors T3 and the first electrodes of the fourth transistors T4 in two adjacent pixel circuits are connected to the node CO1 that will be electrically connected to the first reference voltage line in the source-drain metal layer described below, so that the first reference voltage line transmits the first reference voltage to the third transistors T3 and the fourth transistors T4 in the two adjacent pixel circuits. Since the first reference voltage line in the source-drain metal layer and the semiconductor layer are in different layers, they need to be electrically connected to each other through a via hole that penetrate other layers between the source-drain metal layer and the semiconductor layer. The position of the via hole corresponds to the node CO1, but the sources of the third transistors T3 and the fourth transistors T4 in the two adjacent pixel circuits are electrically connected to the first reference voltage line through the same via hole. That is to say, four transistors (i.e., two third transistors T3 and two fourth transistors T4) in the two adjacent pixel circuits share a first reference voltage line and the four transistor are connected to the first reference voltage line through the same via hole. This can save space occupied by the components of the pixel circuit on the base substrate and help to improve the pixel resolution of the display panel.

Figure 32:
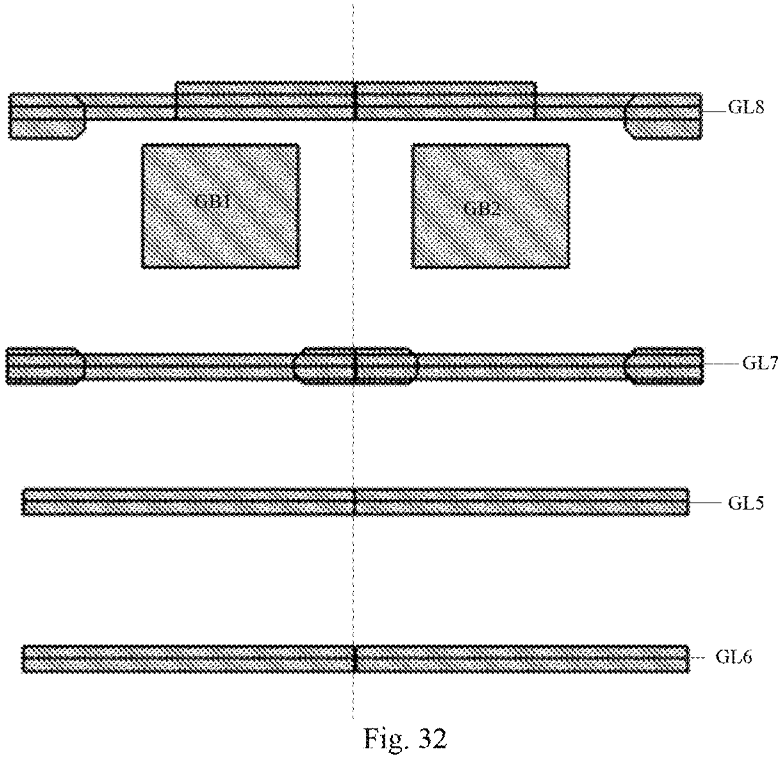
FIG. 32 illustrates a pattern of a first gate metal layer for two adjacent pixel circuits in a display panel according to another embodiment of the application.

The partial pattern of the first gate metal layer shown in FIG. 32 is substantially the same as the pattern of the first gate metal layer shown in FIG. 13. The first gate metal layer includes a fifth gate metal line GL5, a sixth gate metal line GL6, a seventh gate metal line GL7 and an eighth gate metal line GL8 that extend along the row direction of the pixel circuit array and are spaced apart from each other in the column direction of the pixel circuit array, as well as gates GB1 and GB2. The fifth gate metal line includes a gate of the fifth transistor T5 in the pixel circuit shown in FIG. 7, the sixth gate metal line GL6 includes gates of the third transistor T3, the fourth transistor T4 and the eighth transistor T8 in the pixel circuit shown in FIG. 7, the seventh gate metal line includes gates of the sixth transistor T6 and the seventh transistor T7, and the fifth gate metal line is located between the sixth gate metal line and the seventh gate metal line. The pattern of the first gate metal layer shown in FIG. 32 corresponds to the first gate metal layer in two adjacent pixel circuits shown in FIG. 7. With such a layout design of the pattern of the first gate metal layer, the layout space occupied by the reset circuit and switching circuit in the pixel circuit on the base substrate can be reduced, which will help to reduce the area occupied by a single pixel circuit on the base substrate. It can be understood that the fifth gate metal line GL5, the sixth gate metal line GL6 and the seventh gate metal line GL7 may each include a gate connection line electrically connected to the gate of a corresponding transistor. In the embodiment shown in FIG. 32, the eighth gate metal line GL8 include gates of the eleventh transistor T11 and the twelfth transistor T12 shown in FIG. 7 as well as corresponding gate connection lines.

Figure 33:
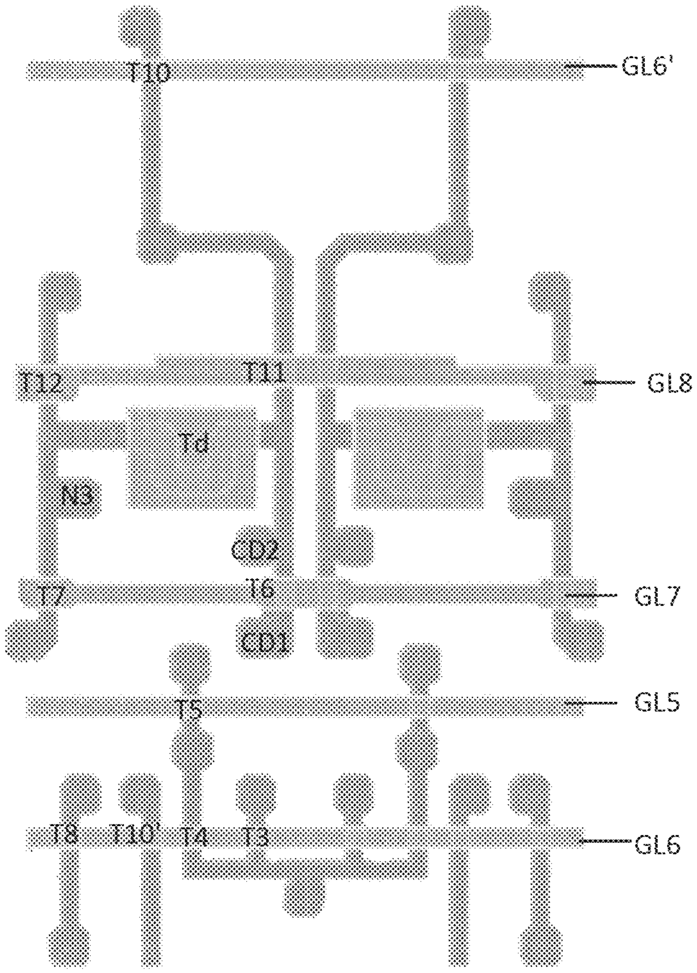
FIG. 33 shows a perspective view of the first gate metal layer and the semiconductor layer in a pixel circuit in a display panel according to another embodiment of the application, which are superimposed over each other.

FIG. 33 illustrates a perspective view where the first gate metal layer and the semiconductor layer in the pixel circuit are superimposed over each other. FIG. 33 includes the fifth gate metal line GL5, the sixth gate metal line GL6, the seventh gate metal line GL7 and the eighth gate metal line GL8, as well as the gates GB1 and GB2 shown in FIG. 32. GL6' in FIG. 33 represents a second gate metal line in the first gate metal layer of another pixel circuit adjacent to the pixel circuit in FIG. 33 in the extension direction of the axis of symmetry mentioned previously. FIG. 33 shows approximate positions of the third transistor T3, the fourth transistor T4, the driving transistor Td, the fifth transistor T5, the sixth transistor T6, the seventh transistor T7, the eighth transistor T8, the tenth transistor T10, the eleventh transistor T11 and the twelfth transistor T12 in the pixel circuit shown in FIG. 7. T10' represents an approximate position of a tenth transistor in another pixel circuit adjacent to the pixel circuit on the left side of the axis of symmetry in a direction consistent with the extension direction of the axis of symmetry. As shown in FIG. 33, the semiconductor layers (i.e., active layers, first electrodes and second electrodes of transistors) of the seventh transistor T7 and the twelfth transistor T12 are connected to each other. FIG. 33 further illustrates a node in the semiconductor layer corresponding to the third node N3 in FIG. 7. FIG. 33 further illustrates two connection nodes CD1 and CD2 in the semiconductor layer of the pixel circuit. The connection nodes CD1 and CD2 are electrically connected to the first light-emitting element D1 and the second light-emitting element D2 in the pixel circuit shown in FIG. 7, respectively.

Figure 34:
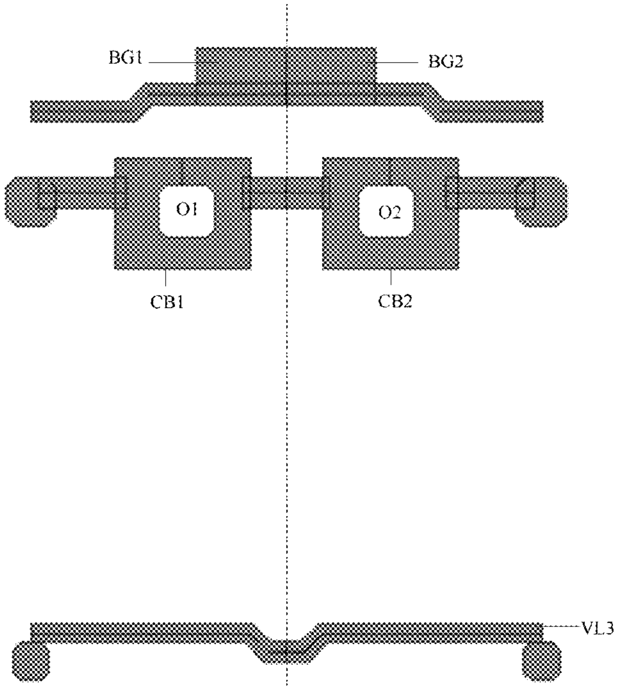
FIG. 34 illustrates a pattern of a second gate metal layer for two adjacent pixel circuits in a display panel according to another embodiment of the application.

Similarly, the display panel comprises a second gate metal layer on a side of the first gate metal layer facing away from the base substrate. The pattern of the second gate metal layer for two adjacent pixel circuits shown in FIG. 34 is similar to the pattern of the second gate metal layer shown in FIG. 15. The ninth transistor T9 in FIG. 7 is a dual-gate thin film transistor. As shown in FIG. 34, the second gate metal layer includes capacitor electrode blocks CB1 and CB2 and bottom gates BG1 and BG2 of the ninth transistor T9. The orthographic projection of the capacitor electrode block CB1 or CB2 on the base substrate at least partially overlaps the orthographic projection of the gate GB1 or GB2 of the driving transistor on the base substrate to form the capacitor C in FIG. 7. The capacitor electrode block CB1 or CB2 includes an opening penetrating the capacitor electrode block, shown by O1 or O2 in FIG. 34. The orthographic projection of the opening O1 or O2 on the base substrate is located within the orthographic projection of the gate GB1 or GB2 of the driving transistor on the base substrate. The second gate metal layer shown in FIG. 34 further includes a third reference voltage line VL3 for electrically connecting with the third reference voltage terminal Vref3 in FIG. 7 so as to transmit the third reference voltage.

Figure 35:
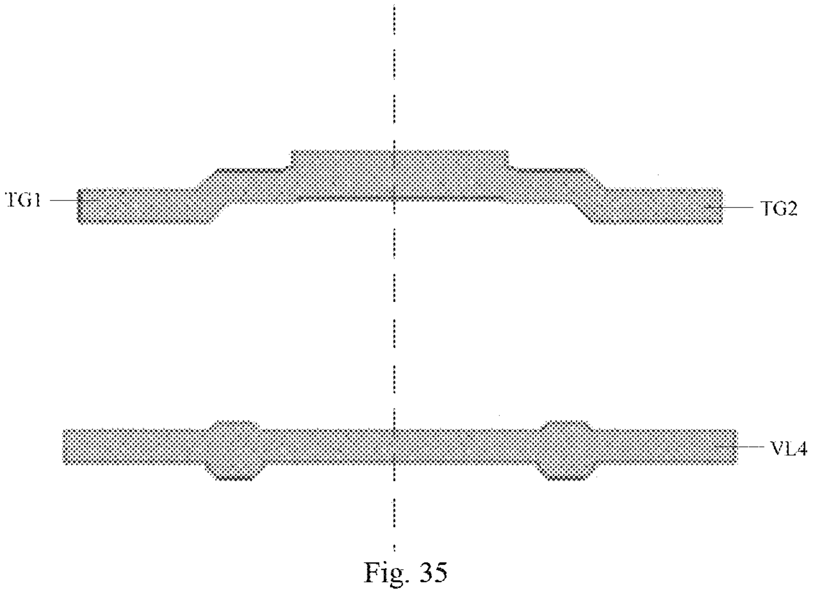
FIG. 35 illustrates a pattern of a third gate metal layer for two adjacent pixel circuits in a display panel according to another embodiment of the application.

FIG. 35 illustrates a third gate metal layer in the display panel. The third gate metal layer includes a top gate of the ninth transistor T9 and a fourth reference voltage line. The fourth reference voltage line is electrically connected to the fourth reference voltage terminal Vref4 in the pixel circuit to transmit the fourth reference voltage. The display panel further comprises a pattern of a metal oxide semiconductor channel of the ninth transistor T9, and the top gate and the bottom gate of the ninth transistor T9 may be located on two opposite sides of the metal oxide semiconductor channel, respectively.

Figure 36:
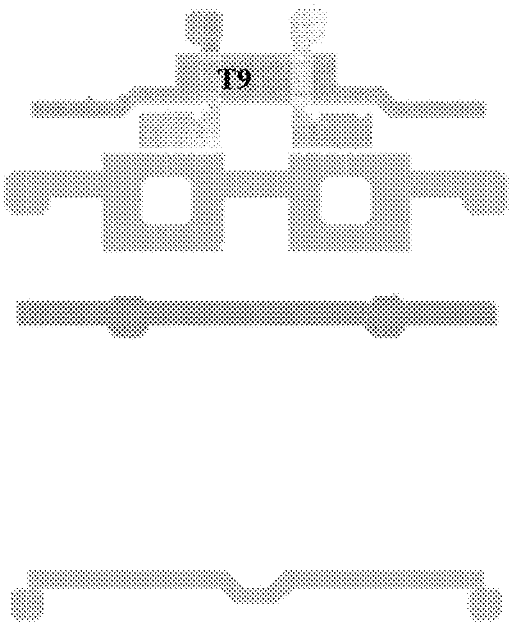
FIG. 36 illustrates a top perspective view of the second gate metal layer shown in FIG. 34, the metal oxide semiconductor channel layer of the ninth transistor, and the third gate metal layer shown in FIG. 35, which are superimposed over one another.

FIG. 36 illustrates a top perspective view of the second gate metal layer shown in FIG. 34, the metal oxide semiconductor channel layer of the ninth transistor, and the third gate metal layer shown in FIG. 35, which are superimposed over one another. An approximate position of the ninth transistor in the pixel circuit shown in FIG. 7 is shown by T9 in FIG. 36.

Figure 37:
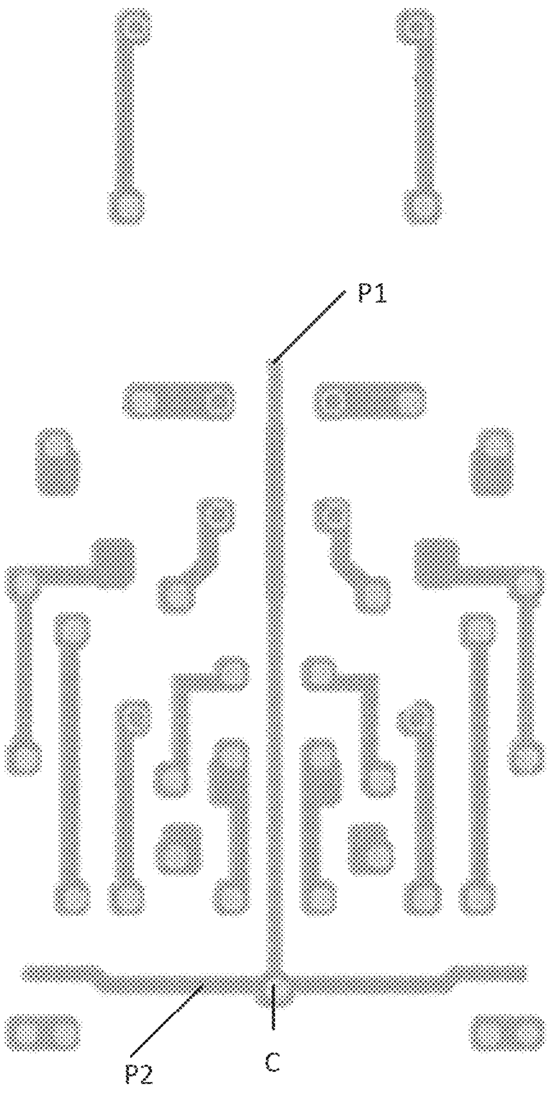
FIG. 37 illustrates a pattern of a source-drain metal layer for two adjacent pixel circuits in a display panel according to another embodiment of the application.

As described previously, the display panel comprises a semiconductor layer on a side of the first gate metal layer facing the base substrate. The semiconductor layer includes first electrodes, second electrodes and active layers of the third transistor and the fourth transistor in the pixel circuit as shown in FIG. 7, patterns of the first electrodes, the second electrodes and the active layers of the third transistors and the fourth transistors in two adjacent pixel circuits are symmetrical with respect to the first portion of the first reference voltage line. The display panel further comprises a source-drain metal layer on a side of the first gate metal layer facing away from the base substrate. The source-drain metal layer includes the first reference voltage line, and the sources of the third transistors and the fourth transistors in the two adjacent pixel circuits are electrically connected to the first reference voltage line through the same via hole at a connection point of the first portion and the second portion. FIG. 37 illustrates a source-drain metal layer on a side of the third gate metal layer facing away from the base substrate. The source-drain metal layer includes a first reference voltage line, and the first reference voltage line includes a first portion P1 and a second portion P2, and the first electrodes or the second electrodes (i.e., sources or drains) of the second transistors T2 in the two adjacent pixel circuits are electrically connected to the first reference voltage line through a second via hole at an intersection of the first portion P1 and the second portion P2 of the first reference voltage line. The second via hole can penetrate an insulating layer provided between the semiconductor layer and the source-drain metal layer, and the position of the second via hole may correspond to an intersection point C (shown in FIG. 37) of the first portion P1 and the second portion P2 of the first reference voltage line and the node CO1 shown in FIG. 31. That is to say, the third transistors and the fourth transistors included in the two adjacent pixel circuits are all electrically connected to the first reference voltage line through the second via hole mentioned above, which can decrease the complexity of the component layout for the pixel circuits of the display panel, and save space occupied by the pixel circuits on the base substrate. In addition to the first reference voltage line, the source-drain metal layer further includes a plurality of source-drain connection lines. These source-drain connection lines are used to implement electrical connections of the first electrode or the second electrode of each of the transistors shown in FIG. 7 to other transistors or electrical components. It can be seen from FIG. 37 that the pattern of the source-drain metal layer for two adjacent pixel circuits also presents a symmetrical arrangement. In this embodiment, the axis of symmetry is the first portion P1 of the first reference voltage line.

Figure 38:
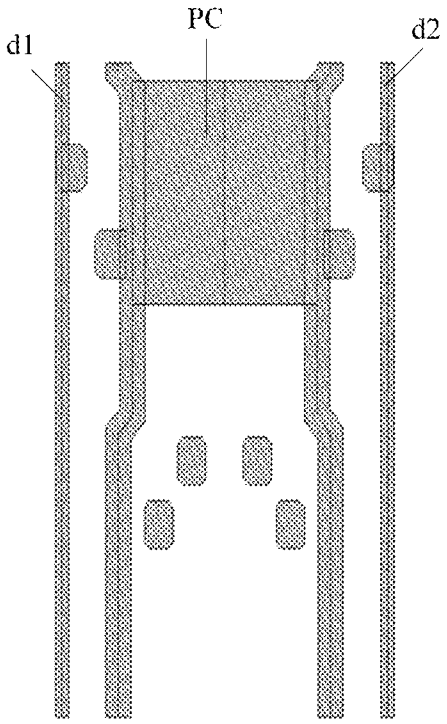
FIG. 38 illustrates a pattern of a power line metal layer for two adjacent pixel circuits in a display panel according to another embodiment of the application.

FIG. 38 illustrates a partial pattern of a power line metal layer on a side of the source-drain metal layer facing away from the base substrate. Basically similar to the power line metal layer shown in FIG. 21, the power line metal layer includes a power line and data lines. As shown in FIG. 38, the power line includes a first conductive block PC, which is shared by two adjacent pixel circuits. Moreover, the orthographic projection of the first conductive block PC on the base substrate covers and exceeds the orthographic projections of the top gates and the active layers of the ninth transistors T9, and the gates and the active layers of the driving transistors Td in the two adjacent pixel circuits on the base substrate. Therefore, in addition to transmitting a supply voltage to two adjacent pixel circuits, the first conductive block PC in the power line may also play a role of blocking out light at least for the ninth transistor T9 and the driving transistor Td. As shown in FIG. 38, data lines d1 and d2 transmit a data signal Vdata to two adjacent pixel circuits, respectively.

Figure 39:
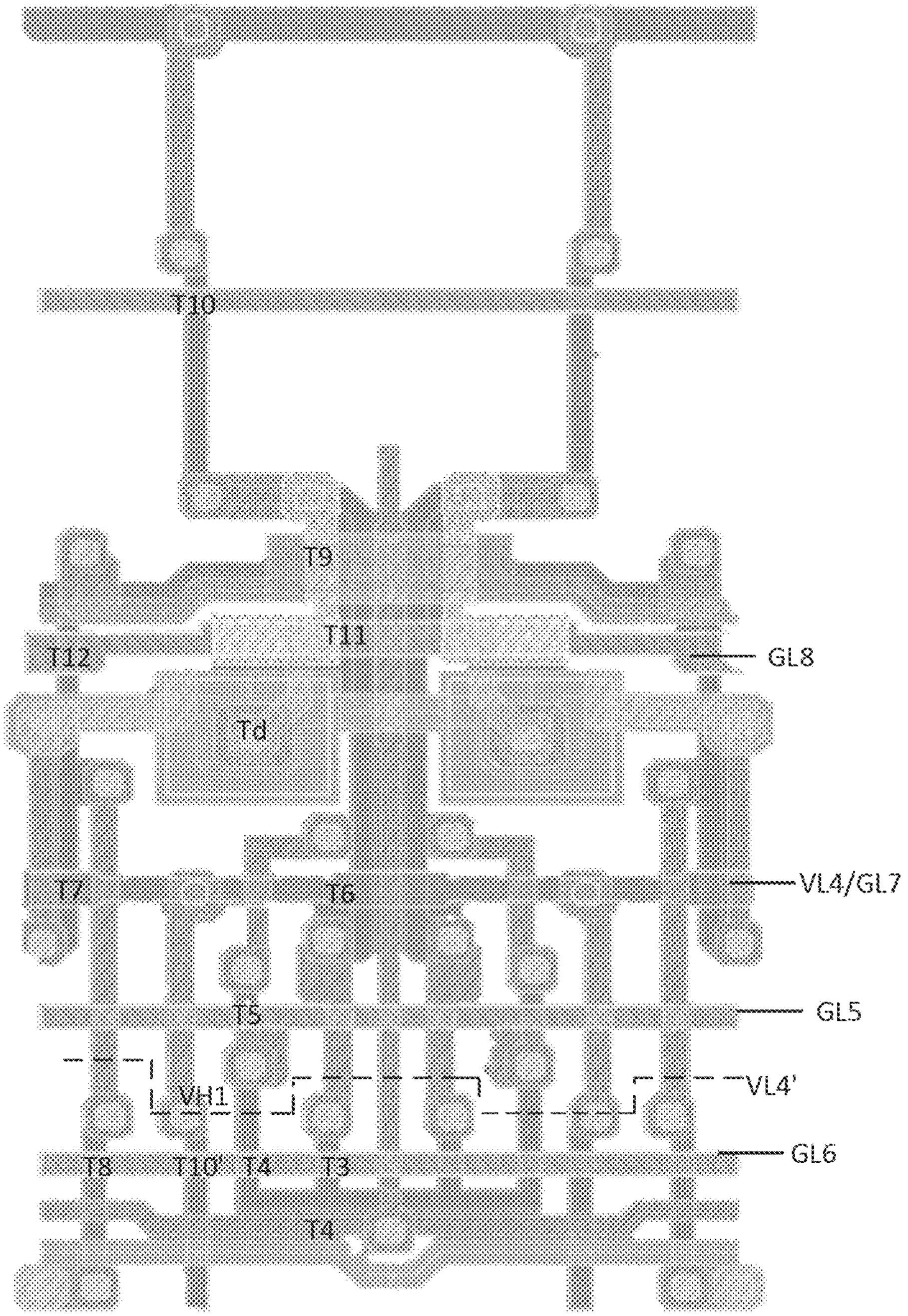
FIG. 39 schematically illustrates a top perspective view of the semiconductor layer, the first gate metal layer, the second gate metal layer, the third gate metal layer, the channel layer of the ninth transistor, the source-drain metal layer, and the power line metal layer shown in FIG. 31 to FIG. 38, which are superimposed over one another.

FIG. 39 schematically illustrates a top perspective view of the semiconductor layer, the first gate metal layer, the second gate metal layer, the third gate metal layer, the channel layer of the ninth transistor, the source-drain metal layer and the power line metal layer shown in FIG. 31 to FIG. 38, which are superimposed over one another. FIG. 39 also marks approximate positions of the third transistor T3, the fourth transistor T4, the fifth transistor T5, the sixth transistor T6, the seventh transistor T7, the driving transistor Td, the eighth transistor T8, and the ninth transistor T9, the tenth transistor T10, the eleventh transistor T11 and the twelfth transistor T12 shown in FIG. 7. The positions of transistors described herein with respect to planar patterns of component and wire layouts in the pixel circuit of the display panel refer to approximate positions of the gates of transistors on corresponding planar patterns of component and wire layouts. As shown in FIG. 39, according to some embodiments of the application, the orthographic projection of the fourth reference voltage line VL4 in the third gate metal layer on the base substrate may at least partially overlap the orthogonal projection of the seventh gate metal line GL7 on the base substrate, which can increase the light transmittance of the display panel and improve the image display quality of the display panel. Although the seventh gate metal line GL7 can transmit a light emission control signal to the gates of the sixth transistor T6 and the seventh transistor T7, the fourth reference voltage line VL4 is used to transmit a fourth reference voltage with a constant voltage, thus the fourth reference voltage line VL4 has a small impact on the light emission control signal line that transmits the control signal EM. In addition, the fifth transistor T5 may be electrically connected to the source or drain of the sixth transistor T6. In the case where the fifth transistor T5 is electrically connected to the drain of the sixth transistor T6 (that is, the drain of the sixth transistor is electrically connected to the second node N2), a connection line between the fifth transistor T5 and the sixth transistor T6 may not cross the fourth reference voltage line VL4 electrically connected to the fourth reference voltage terminal Vref4, thereby reducing coupling between different signal lines.

According to a further embodiment of the application, the fourth reference voltage line in the third gate metal layer may be arranged at another different position. As shown in FIG. 39, the fourth reference voltage line VL4' shown by a dotted line is formed as a curve and arranged in gaps between adjacent wires. Specifically, in the row direction parallel to the pixel circuit array, the fourth reference voltage line extends approximately between the fifth gate metal line GL5 and the sixth gate metal line GL6, and the fourth reference voltage line VL4' is electrically connected to the tenth transistor T10' through a via hole VH1. This can facilitate a compact arrangement of components of the pixel circuits on the base substrate, and save the component layout space on the base substrate.

Figure 40:
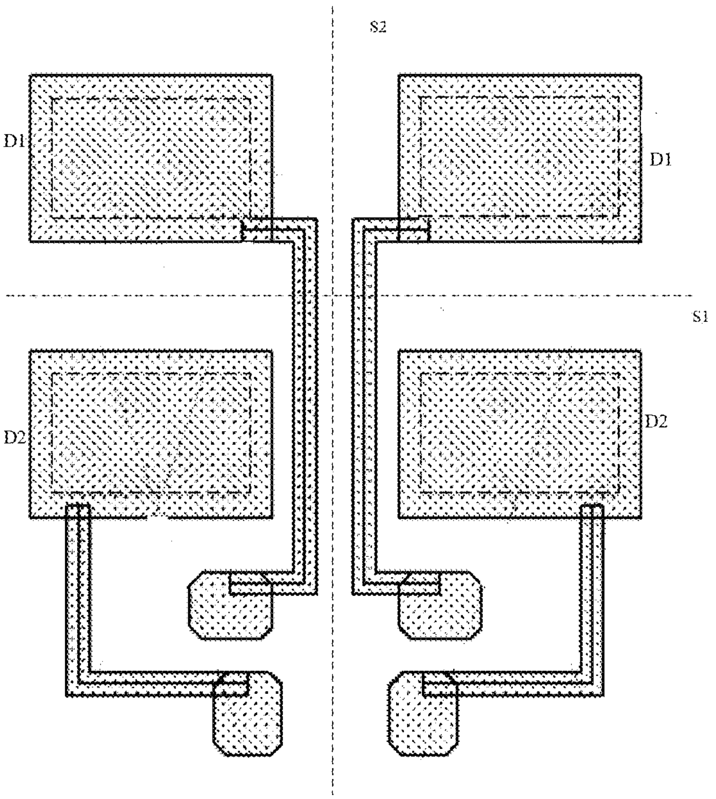
FIG. 40 illustrates a pattern of an anode layer and light-emitting regions of light-emitting elements for two adjacent pixel circuits defined by a pixel definition layer in a display panel according to another embodiment of the application.

FIG. 40 illustrates anodes of two adjacent pixel circuits of the display panel and light-emitting regions defined by a pixel definition layer. The anodes of the first light-emitting element D1 and the second light-emitting element D2 in each pixel circuit are shown by solid rectangular regions in FIG. 40, and the light-emitting regions defined by the pixel definition layer is shown by dotted rectangular regions in FIG. 40. The anode of a light-emitting element in the pixel circuit is electrically connected to a corresponding source-drain connection line in the source-drain metal layer through a wire pattern and a via hole.

As shown in FIG. 40, the first light-emitting region of the first light-emitting element and the second light-emitting region of the second light-emitting element defined by the pixel definition layer are spaced apart from each other and symmetrically distributed on two sides of an axis of symmetry. The axis of symmetry (shown by the dotted line S1 in FIG. 40) intersects the extension line of the first portion of the first reference voltage line (shown by the dotted line S2 in FIG. 40).

FIG. 41 to FIG. 44 illustrate partial schematic views of a display panel provided by a further embodiment of the application. In these embodiments, the display panel comprises: a base substrate, a pixel circuit, described in any of the foregoing pixel circuit embodiments, arranged on the base substrate, a pixel definition layer on a side of the pixel circuit facing away from the base substrate, and an optical structure on a side of the pixel definition layer facing away from the base substrate. The pixel definition layer defines a first light-emitting region of the first light-emitting element and a second light-emitting region of the second light-emitting element, and the optical structure is optically coupled to the first light-emitting region to suppress propagation of light from the first light-emitting element in a first emission direction that is not perpendicular to the light-emitting surface of the display panel.

As described previously, with the pixel circuit provided by the embodiments of the application, for display products that need to realize an anti-peep function, an optical structure may be used to replace the anti-peep film in conventional anti-peep solutions, which can alleviate or avoid the above-mentioned defects resulting from using the anti-peep film. The optical structure optically coupled to the first light-emitting region corresponding to the first light-emitting element in the pixel circuit may replace the anti-peep film in conventional anti-peep solutions, thereby enabling the display panel to have an anti-peep function. For example, when the pixel circuit in the display panel operates in the first operating mode, the pixel driving circuit in the pixel circuit only drives the first light-emitting element to emit light, and the second light-emitting element is in a non-luminous state. The optical structure optically coupled to the first light-emitting region corresponding to the first light-emitting element in the pixel circuit can suppress propagation of light from the first light-emitting element in the first emission direction that is not perpendicular to the light-emitting surface of the display panel. That is, if the vertical direction perpendicular to the light-emitting surface of the display panel is taken as a reference direction, light whose emission direction intersects the reference direction to form a large angle (i.e., light with a large emission angle) is suppressed by the optical structure. Therefore, if viewers deviate from the front of the light-emitting surface of the display panel, for example, viewers on two sides of the display panel will be unable to see the displayed images clearly, while users whose viewing directions are consistent with or have a small deviation from the reference direction will not be affected when viewing the displayed images of the display panel, the display panel can be regarded as being in a narrow-viewing angle display mode at that time. When the pixel circuit in the display panel operates in the second operating mode, the pixel driving circuit drives the first light-emitting element and the second light-emitting element to emit light simultaneously, and propagation of light emitted by the second light-emitting element in each pixel circuit will not be affected by the optical structure. At this time, the display panel can be regarded as being in a wide-viewing angle display mode, and viewers directly in front of and around the display panel can see the displayed images clearly.

Figure 41:
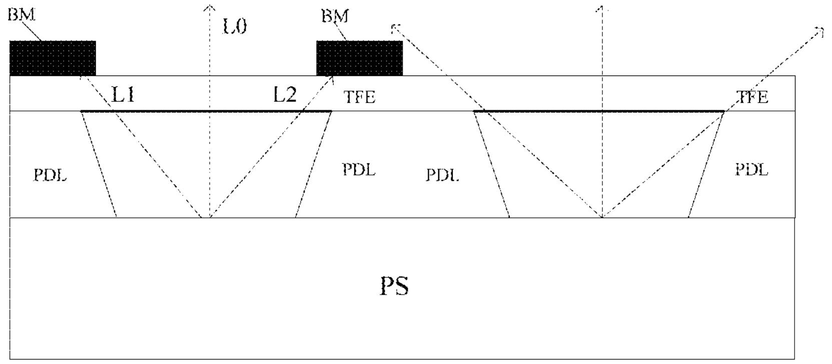
FIG. 41 illustrates a partial sectional view of a display panel according to another embodiment of the application, which relates to first light-emitting regions and second light-emitting regions of two light-emitting elements in a single pixel circuit.

Examples of the optical structure in the display panel will be described below with reference to FIG. 41 to FIG. 44. In FIG. 41 to FIG. 44, for simplicity, the base substrate and the pixel circuit on the base substrate are denoted by PS as an entirety. As shown in FIG. 41, the optical structure includes a light-absorbing layer BM, the light-absorbing layer BM at least partially surrounds the first light-emitting region corresponding to the first light-emitting element, and the orthographic projection of the light-absorbing layer on the base substrate does not overlap the orthographic projection of the second light-emitting region corresponding to the second light-emitting element on the base substrate. As a result, light emitted from the first light-emitting element, which has a light emission direction consistent with the reference direction (e.g., light L0 shown in FIG. 41) or has a small emission angle, can be emitted from the display panel normally, and light with a large emission angle (e.g., light L1, L2 shown in FIG. 41) is absorbed or blocked by the light-absorbing layer BM, while light emitted from the second light-emitting element is less or not affected by the light-absorbing layer BM. Therefore, the operating state of the display panel may switch between the wide-viewing angle display mode and the narrow-viewing angle display mode mentioned above. That is, the display panel may operate in both an anti-peep display mode and a normal display mode, and the implementation of the anti-peep function of the display panel can avoid the defects resulting from the anti-peep film in conventional anti-peep solutions. In some embodiments, the display panel comprises an encapsulation layer TFE which may cover the pixel definition layer PDL, and the light-absorbing layer BM may be located on a side of the encapsulation layer TFT facing away from the base substrate, as shown in FIG. 41.

Figure 42:
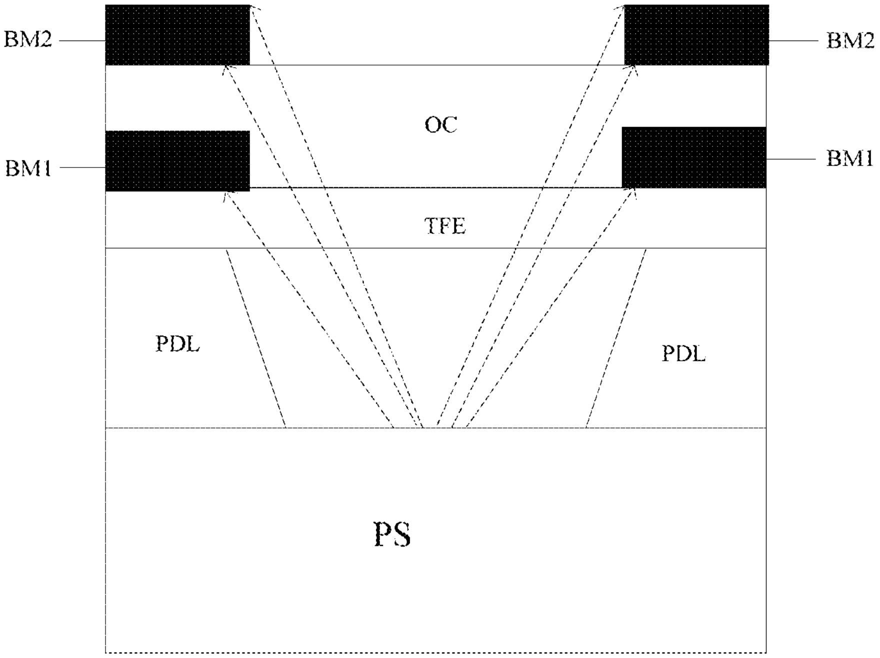
FIG. 42 illustrates a partial sectional view of a display panel according to another embodiment of the application, which relates to a first light-emitting region of a first light-emitting element in a single pixel circuit.
Figure 43:
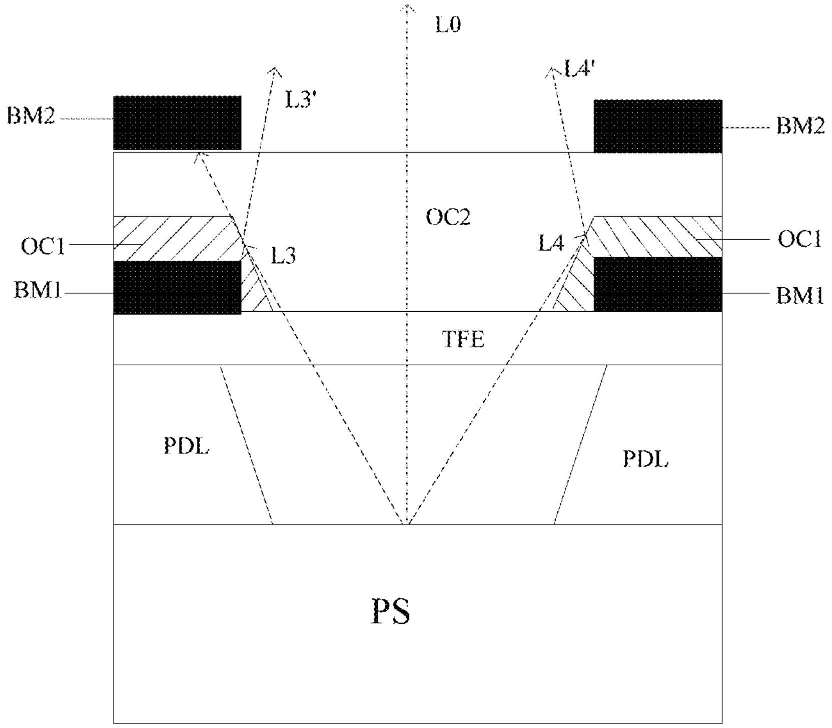
FIG. 43 illustrates a partial sectional view of a display panel according to a further embodiment of the application, which relates to a first light-emitting region of a first light-emitting element in a single pixel circuit.
Figure 44:
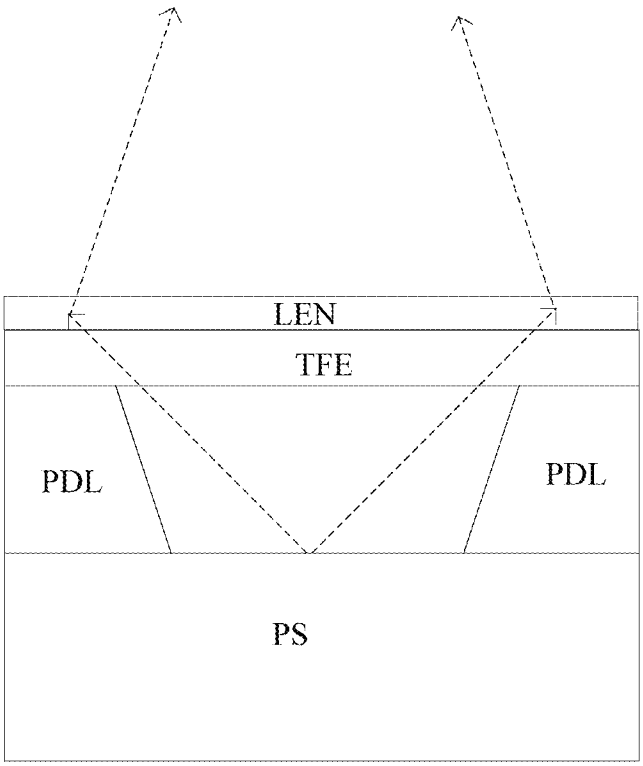
FIG. 44 illustrates a partial sectional view of a display panel according to a further embodiment of the application, which relates to a first light-emitting region of a first light-emitting element in a single pixel circuit.

In FIG. 42 to FIG. 44, for simplicity, only partial sectional views of the first light-emitting region corresponding to the first light-emitting element in the display panel are illustrated, while sectional views of the second light-emitting region corresponding to the second light-emitting element are omitted. As shown in FIG. 42, the display panel further comprises a light-transmitting layer OC. The light-absorbing layer includes a first light-absorbing sub-layer BM1 and a second light-absorbing sub-layer BM2. The first light-absorbing sub-layer BM1 is located on a side of the encapsulation layer TFT facing away from the base substrate, the light-transmitting layer OC covers the first light-absorbing sub-layer BM1, and the second light-absorbing sub-layer BM2 is located on a side of the light-transmitting layer OC facing away from the base substrate. For the embodiment shown in FIG. 42, the requirement for the thickness of a single light-absorbing sub-layer may be decreased to facilitate the preparation of a light-absorbing sub-layer. The first light-absorbing sub-layer and the second light-absorbing sub-layer may be made of black light-absorbing material. Specific materials of the light-absorbing layer (light-absorbing sub-layer) and the light-transmitting layer are not limited herein. The dotted lines in FIG. 42 indicate that light emitted from the first light-emitting element which has a large emission angle is absorbed or blocked by the first light-absorbing sub-layer or the second light-absorbing sub-layer, while light having a small emission angle can be emitted from the light-emitting surface of the display panel normally.

In the embodiment of FIG. 43, the light-transmitting layer includes a first light-transmitting portion OC1 and a second light-transmitting portion OC2. The first light-transmitting portion OC1 is located on a side of the first light-absorbing sub-layer BM1 facing away from the base substrate, the second light-transmitting portion OC2 is located on a side of the first light-transmitting portion OC1 facing away from the base substrate, and the second light-transmitting portion covers the first light-transmitting portion. The second light-transmitting portion OC2 has a refractive index higher than that of the first light-transmitting portion OC1. In FIG. 43, the first light-transmitting portion OC1 is shown by a shadow pattern with oblique lines. As shown in FIG. 43, since the refractive index of the second light-transmitting portion OC2 is higher than that of the first light-transmitting portion OC1, at least part of light emitted from the first light-emitting element with a large emission angle (e.g., light L3 or L4 in FIG. 43) may be totally reflected at an interface between the first light-transmitting portion OC1 and the second light-transmitting portion OC2, and the reflected light will become light with a small emission angle, such as light L3' or L4' in FIG. 43. Therefore, the embodiment shown in FIG. 43 can further improve the anti-peep effect of the display panel and enhance the brightness of images viewed by viewers directly in front of the display panel. As shown in FIG. 43, in some embodiments, the orthographic projection of the first light-transmitting portion OC1 on the base substrate can completely cover the orthographic projection of the first light-absorbing sub-layer BM1 on the base substrate, and the orthographic projection of the second light-absorbing sub-layer BM2 on the base substrate does not exceed the orthographic projection of the first light-absorbing sub-layer BM1 on the base substrate.

FIG. 44 shows a partial sectional view of a display panel according to a further embodiment of the application. As shown in FIG. 44, the display panel comprises a pixel definition layer PDL on the base substrate and an encapsulation layer TFE on a side of the pixel definition layer facing away from the base substrate. The pixel definition layer defines a first light-emitting region of the first light-emitting element and a second light-emitting region of the second light-emitting element (only the pixel definition layer defining the first light-emitting region is illustrated in FIG. 44). The optical structure includes a microlens LEN on a side of the encapsulation layer TFE facing away from the base substrate, and the microlens is configured to converge light from the first light-emitting element. The microlens LEN may include a micro convex lens, and its orthographic projection on the base substrate may cover and exceed the orthographic projection of the first light-emitting region on the base substrate. The microlens LEN may converge light emitted from the first light-emitting element, and light with a large emission angle is thus converted into light with a small emission angle, thereby achieving the anti-peep effect of the display panel.

Figure 45:
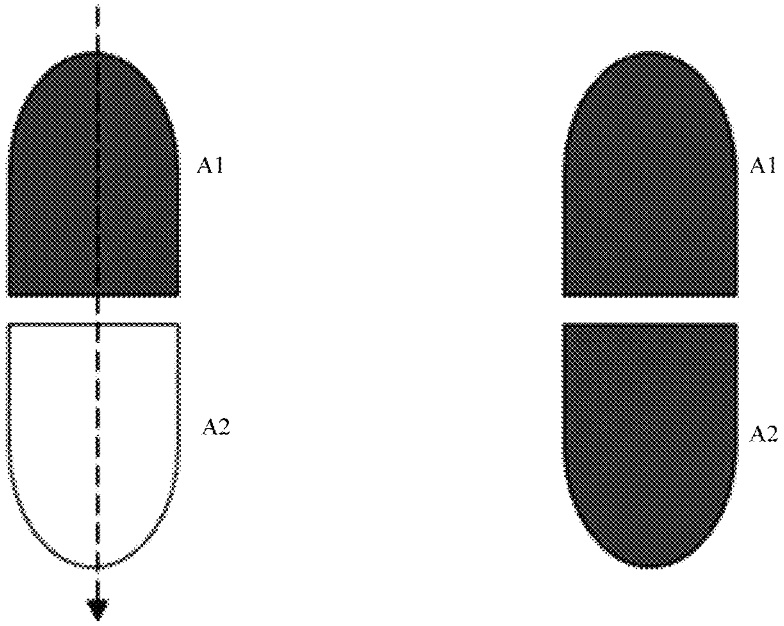
FIG. 45 illustrates schematic views of different states of two light-emitting regions of a display panel corresponding to two light-emitting elements in a single pixel circuit in an anti-peep display mode and a normal display mode, respectively.

FIG. 45 illustrates a schematic view of different states of two light-emitting regions of the display panel corresponding to two light-emitting elements in a single pixel circuit in an anti-peep display mode and a normal display mode, respectively. Two light-emitting regions corresponding to two light-emitting elements (i.e., the first light-emitting element and the second light-emitting element mentioned previously) in a single pixel circuit are denoted by A1 and A2, respectively. The left-side figure in FIG. 45 shows the states of the two light-emitting regions A1 and A2 when the display panel is in an anti-peep display mode, and the right-side figure in FIG. 45 shows the states of the two light-emitting regions A1 and A2 when the display panel is in a normal display mode. The light-emitting region A1 is provided with the optical structure described in the foregoing embodiments, while the optical structure is absent from the light-emitting region A2. As shown in the left-side figure in FIG. 45, the light-emitting region A1 is in a luminous state, but no light is emitted from the light-emitting region A2 because the second light-emitting element corresponding to the light-emitting region A2 is in a non-luminous state at that time. However, light emitted from the first light-emitting element corresponding to the light-emitting region A1 at a large emission angle is inhibited or blocked by the optical structure, making it difficult for viewers around the display panel to see the displayed content of the display panel clearly, so that the anti-peep effect can be achieved. As shown in the right-side figure in FIG. 45, both the light-emitting region A1 and the light-emitting region A2 are in a luminous state, and light emitted from the light-emitting region A2 is not blocked or restricted by the optical structure, so that the viewing effects of viewers directly in front of and around the display panel are not affected by the optical structure, and the display panel is in a normal display mode.

A yet another embodiment of the application provides a display device, which may comprise the display panel described in any of the foregoing embodiments regarding display panels. The display device may be any electronic device with an image display function, such as a mobile phone, a tablet computer, and the like.

It can be understood that in the drawings, the sizes or thicknesses of some elements or structures may sometimes be exaggerated for clarity. Therefore, the implementation of any embodiment of the present application is not necessarily limited to the dimensions shown in the drawings, and the shapes and sizes of components in the drawings do not reflect the true proportions of the sizes of various components in an actual product. For convenience, the expressions such as “upper”, “lower”, “front”, “back”, “vertical”, “horizontal”, “top”, “bottom”, “inside” and “outside” indicating orientations or positional relationships are used herein to describe the positional relationships of elements with reference to the drawings, which are only for the convenience of describing the embodiments and simplifying the description, and do not indicate or imply that the device or element referred to must have a specific orientation or be constructed and operated in a specific orientation, and therefore should not be construed as limitations on the application. The positional relationships of constituent elements may be appropriately changed depending on the described directions of the constituent elements. Therefore, they are not limited to the expressions explained therein, but can be appropriately changed according to the situation.

The phrase “and/or” used in the specification and claims should be understood to mean “any one or two” of the elements so combined, i.e., the elements that present jointly in some cases and present separately in other cases. element. Multiple elements listed with “and/or” should be interpreted in the same manner as “one or more” of the elements so combined. In addition to elements specifically represented by the phrase “and/or”, other elements may be presented optionally, whether related or unrelated to the specifically identified elements. Thus, as a non-limiting example, a reference to “A and/or B”, when used in combination with an open expression (such as “include”), refers only to A (optionally including elements other than B) in an embodiment; refers only to B (optionally including elements other than A) in another embodiment; or refers to both A and B (optionally including other elements) in a further embodiment.

Unless otherwise expressly stated and limited, the terms “connected”, “connection” and “electrical connection” herein should be interpreted broadly. For example, it can be a fixed connection, a detachable connection, or an integral connection; it can be a direct connection, an indirect connection through an intermediate element, or an internal connection between two elements. For those of ordinary skill in the art, the meanings of the above terms in the present application can be understood according to the situation.

A transistor used herein refers to an element including at least three terminals, i.e., a gate electrode, a drain electrode, and a source electrode. The transistor has a channel region between the drain electrode and the source electrode, and current can flow through the drain electrode, the channel region, and the source electrode. The first electrode may be a drain electrode and the second electrode may be a source electrode, or the first electrode may be a source electrode and the second electrode may be a drain electrode. The “electrical connection” herein includes the case where the constituent elements are connected together through an element having certain electrical effect. The “film” and the “layer” used herein may be interchanged. For example, a “conductive layer” may sometimes be replaced by a “conductive film”. Similarly, an “insulating film” may sometimes be replaced by an “insulating layer”.

In the description of this specification, the description by reference to the terms “an embodiment,” “another embodiment,” etc. means that specific features, structures, materials or characteristics described in connection with the embodiment is included in at least one embodiment of the application. In this specification, schematic expressions of the above terms are not necessarily directed to the same embodiment or example. Furthermore, the specific features, structures, materials or characteristics described may be combined in any suitable manner in any one or more embodiments or examples. In addition, those skilled in the art may combine different embodiments or examples and features of different embodiments or examples described in this specification unless they are contradictory to each other. In addition, it is to be noted that in this specification, the terms “first” and “second” are only used for descriptive purposes and cannot be understood as indicating or implying relative importance or implicitly indicating the number of indicated technical features.

What have been described above are only some specific implementations of the embodiments of the application, but the protection scope of the application is not so limited. Any variation or substitution that can be easily conceived by a skilled person familiar with the technical field shall be encompassed within the protection scope of the application. Therefore, the protection scope of the application shall be based on the protection scope of the claims.

The invention claimed is:

1. A pixel circuit, comprising a pixel driving circuit, a first light-emitting element, a second light-emitting element, a switching circuit and a reset circuit, wherein the pixel driving circuit is electrically connected to the first light-emitting element to drive the first light-emitting element to emit light, the switching circuit comprises a first terminal, a second terminal and a control terminal, the first terminal of the switching circuit is electrically connected to the pixel driving circuit, the second terminal of the switching circuit is electrically connected to the second light-emitting element, and the switching circuit is configured to:

electrically connect the second light-emitting element to the pixel driving circuit in response to the control terminal receiving a first level signal, so that the pixel driving circuit drives the second light-emitting element to emit light, and disconnect an electrical connection between the second light-emitting element and the pixel driving circuit in response to the control terminal receiving a second level signal, so that the second light-emitting element is in a non-luminous state, wherein the reset circuit comprises a reference voltage connection terminal for receiving a first reference voltage and a reset control terminal for receiving a reset control signal, the reset circuit is electrically connected to either of the first terminal and the second terminal of the switching circuit, and at least one of the first light-emitting element and the second light-emitting element, and is configured to reset the first light-emitting element and/or the second light-emitting element using the first reference voltage under control of the reset control signal, wherein the switching circuit comprises a first transistor, the first terminal of the switching circuit comprises a first electrode of the first transistor, the second terminal of the switching circuit comprises a second electrode of the first transistor, and the control terminal of the switching circuit comprises a control electrode of the first transistor, wherein the first electrode of the first transistor is directly connected to a first electrode of the first light-emitting element, the second electrode of the first transistor is electrically connected to a first electrode of the second light-emitting element, the control electrode of the first transistor is configured to receive the first level signal or the second level signal, and a second electrode of the first light-emitting element and a second electrode of the second light-emitting element are electrically connected to a second reference voltage terminal.

2. The pixel circuit according to claim 1, wherein the reset circuit comprises a second transistor, a first electrode of the second transistor is electrically connected to the first electrode of the second light-emitting element, a second electrode of the second transistor is electrically connected to the reference voltage connection terminal, and a control electrode of the second transistor is electrically connected to the reset control terminal.

3. The pixel circuit according to claim 1, wherein the reset circuit comprises a second transistor, a first electrode of the second transistor is electrically connected to the first electrode of the first light-emitting element, a second electrode of the second transistor is electrically connected to the reference voltage connection terminal, and a control electrode of the second transistor is electrically connected to the reset control terminal.

4. The pixel circuit according to claim 1, wherein the reset circuit comprises a third transistor and a fourth transistor, the third transistor and the fourth transistor are connected in series between a first electrode of the first light-emitting element and a first electrode of the second light-emitting element, a second electrode of the first light-emitting element and a second electrode of the second light-emitting element are electrically connected to a second reference voltage terminal, a first node between the third transistor and the fourth transistor is electrically connected to the reference voltage connection terminal, and a control electrode of the third transistor and a control electrode of the fourth transistor are electrically connected to the reset control terminal.

5. The pixel circuit according to claim 4, wherein the switching circuit comprises a fifth transistor, the first terminal of the switching circuit comprises a first electrode of the fifth transistor, the second terminal of the switching circuit comprises a second electrode of the fifth transistor, and the control terminal of the switching circuit comprises a control electrode of the fifth transistor, wherein the pixel driving circuit comprises a driving transistor, a sixth transistor, and a power supply voltage terminal for receiving a power supply voltage, the driving transistor and the sixth transistor are connected in series between the power supply voltage terminal and the first electrode of the first light-emitting element, the first electrode of the fifth transistor is electrically connected to a first electrode or a second electrode of the sixth transistor, and the second electrode of the fifth transistor is electrically connected to the first electrode of the second light-emitting element.

6. The pixel circuit according to claim 1, wherein the pixel driving circuit includes a driving transistor, a sixth transistor, a seventh transistor, and a power supply voltage terminal for receiving a power supply voltage, and the seventh transistor, the driving transistor and the sixth transistor are connected in series between the power supply voltage terminal and the first electrode of the first light-emitting element successively, wherein the pixel driving circuit further comprises an eighth transistor, a first electrode of the eighth transistor is electrically connected to a third node between the driving transistor and the seventh transistor, a second electrode of the eighth transistor is electrically connected to a third reference voltage terminal, and a control electrode of the eighth transistor is electrically connected to the reset control terminal, wherein the pixel driving circuit further comprises a ninth transistor, a tenth transistor, a capacitor, and a fourth reference voltage terminal, wherein the capacitor, the ninth transistor and the tenth transistor are connected in series between the power supply voltage terminal and the fourth reference voltage terminal successively, and a control electrode of the driving transistor is electrically connected to a fourth node between the capacitor and the ninth transistor, and wherein a control electrode of the tenth transistor is electrically connected to the reset control terminal, and a control electrode of the ninth transistor is configured to receive a first scanning signal.

7. The pixel circuit according to claim 6, wherein the pixel driving circuit further comprises an eleventh transistor and a twelfth transistor, a first electrode and a second electrode of the eleventh transistor are electrically connected to a second node between the driving transistor and the sixth transistor, and a fifth node between the ninth transistor and the tenth transistor, respectively, a first electrode of the twelfth transistor is configured to receive a data signal, a second electrode of the twelfth transistor is electrically connected to the third node, and a control electrode of the eleventh transistor and a control electrode of the twelfth transistor are configured to receive a second scanning signal, wherein the ninth transistor comprises a metal oxide thin film transistor, and the driving transistor, the sixth transistor, the seventh transistor, the eighth transistor, the tenth transistor, the eleventh transistor and the twelfth transistor each comprises a low temperature polysilicon thin film transistor.

8. A display panel, comprising:

a base substrate;

a pixel circuit according to claim 1 on the base substrate;

a pixel definition layer on a side of the pixel circuit facing away from the base substrate, the pixel definition layer defining a first light-emitting region of the first light-emitting element and a second light-emitting region of the second light-emitting element; and an optical structure on a side of the pixel definition layer facing away from the base substrate, wherein the optical structure is optically coupled to the first light-emitting region to suppress propagation of light from the first light-emitting element in a first emission direction that is not perpendicular to a light-emitting surface of the display panel, wherein the optical structure comprises a light-absorbing layer, the light-absorbing layer at least partially surrounds the first light-emitting region, and an orthographic projection of the light-absorbing layer on the base substrate does not overlap an orthographic projection of the second light-emitting region on the base substrate.

9. The display panel according to claim 8, wherein the display panel further comprises an encapsulation layer on a side of the pixel definition layer facing away from the base substrate, wherein the optical structure further comprises a light-transmitting layer, the light-absorbing layer comprises a first light-absorbing sub-layer and a second light-absorbing sub-layer, the first light-absorbing sub-layer is located on a side of the encapsulation layer facing away from the base substrate, the light-transmitting layer covers the first light-absorbing sub-layer, and the second light-absorbing sub-layer is located on a side of the light-transmitting layer facing away from the base substrate.

10. The display panel according to claim 9, wherein the light-transmitting layer comprises a first light-transmitting portion and a second light-transmitting portion, the first light-transmitting portion is located on a side of the first light-absorbing sub-layer facing away from the base substrate, the second light-transmitting portion is located on a side of the first light-transmitting portion facing away from the base substrate, and the second light-transmitting portion covers the first light-transmitting portion, wherein the second light-transmitting portion has a refractive index higher than a refractive index of the first light-transmitting portion.

11. The display panel according to claim 8, wherein the display panel further comprises an encapsulation layer on a side of the pixel definition layer facing away from the base substrate, the optical structure comprises a microlens on a side of the encapsulation layer facing away from the base substrate, and the microlens is configured to converge light from the first light-emitting element.

12. A display panel, comprising:

a base substrate; and a plurality of pixel circuits, each pixel circuit comprising a pixel driving circuit, a first light-emitting element, a second light-emitting element, a switching circuit and a reset circuit, wherein the pixel driving circuit is electrically connected to the first light-emitting element to drive the first light-emitting element to emit light, the switching circuit comprises a first terminal, a second terminal and a control terminal, the first terminal of the switching circuit is electrically connected to the pixel driving circuit, the second terminal of the switching circuit is electrically connected to the second light-emitting element, and the switching circuit is configured to:

electrically connect the second light-emitting element to the pixel driving circuit in response to the control terminal receiving a first level signal, so that the pixel driving circuit drives the second light-emitting element to emit light, and disconnect an electrical connection between the second light-emitting element and the pixel driving circuit in response to the control terminal receiving a second level signal, so that the second light-emitting element is in a non-luminous state, wherein the reset circuit comprises a reference voltage connection terminal for receiving a first reference voltage and a reset control terminal for receiving a reset control signal, the reset circuit is electrically connected to either of the first terminal and the second terminal of the switching circuit, and at least one of the first light-emitting element and the second light-emitting element, and is configured to reset the first light-emitting element and/or the second light-emitting element using the first reference voltage under control of the reset control signal, wherein the plurality of pixel circuits are arranged in an array on the base substrate to form a pixel circuit array, wherein the display panel comprises a first reference voltage line on the base substrate, and the first reference voltage line is electrically connected to the reference voltage connection terminal to transmit the first reference voltage, wherein two adjacent pixel circuits in the pixel circuit array share the first reference voltage line, and the two adjacent pixel circuits are symmetrically arranged on two sides of the first reference voltage line.

13. The display panel according to claim 12, wherein the first reference voltage line comprises a first portion extending in a column direction of the pixel circuit array and a second portion extending in a row direction of the pixel circuit array, and the first portion intersects the second portion, wherein the two adjacent pixel circuits are symmetrically arranged on two sides of the first portion.

14. The display panel according to claim 13, wherein the switching circuit comprises a first transistor, the first terminal of the switching circuit comprises a first electrode of the first transistor, the second terminal of the switching circuit comprises a second electrode of the first transistor, the control terminal of the switching circuit comprises a control electrode of the first transistor, the reset circuit comprises a second transistor, a first electrode of the second transistor is electrically connected to a first electrode of the first light-emitting element or the second light-emitting element, a second electrode of the second transistor is electrically connected to the reference voltage connection terminal, and a control electrode of the second transistor is electrically connected to the reset control terminal, wherein the pixel driving circuit comprises a driving transistor, a sixth transistor, and a power supply voltage terminal for receiving a power supply voltage, and the driving transistor and the sixth transistor are connected in series between the power supply voltage terminal and the first electrode of the first light-emitting element, wherein the display panel further comprises a first gate metal layer on the base substrate, wherein the first gate metal layer comprises a first gate metal line, a second gate metal line and a third gate metal line that extend along the row direction of the pixel circuit array and are spaced apart from each other in the column direction of the pixel circuit array, wherein the first gate metal line comprises a gate of the first transistor, the second gate metal line comprises a gate of the second transistor, the third gate metal line comprises a gate of the sixth transistor, and the first gate metal line is located between the second gate metal line and the third gate metal line.

15. The display panel according to claim 14, wherein the display panel further comprises a third gate metal layer, the third gate metal layer is located on a side of the second gate metal line facing away from the base substrate, and comprises a top gate of a ninth transistor and a fourth reference voltage line, and the fourth reference voltage line is electrically connected to a fourth reference voltage terminal to transmit a fourth reference voltage, wherein the display panel further comprises a source-drain metal layer on a side of the third gate metal layer facing away from the base substrate, and the source-drain metal layer comprises the first reference voltage line.

16. The display panel according to claim 14, wherein the display panel further comprises a semiconductor layer on a side of the first gate metal layer facing the base substrate, and the semiconductor layer comprises patterns of active layers, first electrodes and second electrodes of the first transistor, the second transistor and the sixth transistor, wherein patterns of an active layer, the first electrode and the second electrode of the first transistor are connected to patterns of an active layer, a first electrode and a second electrode of the sixth transistor, and patterns of an active layer, the first electrode and the second electrode of the second transistor are separated from patterns of active layers, first electrodes and second electrodes of the first transistor and the sixth transistor, wherein the display panel further comprises a source-drain metal layer on a side of the first gate metal layer facing away from the base substrate, and the source-drain metal layer comprises the first reference voltage line and an electrode transition line, wherein the electrode transition line electrically connects the patterns of the active layer, the first electrode and the second electrode of the second transistor to the patterns of the active layer, the first electrode and the second electrode of the sixth transistor.

17. The display panel according to claim 13, wherein the reset circuit comprises a third transistor and a fourth transistor, the third transistor and the fourth transistor are connected in series between a first electrode of the first light-emitting element and a first electrode of the second light-emitting element, a second electrode of the first light-emitting element and a second electrode of the second light-emitting element are electrically connected to a second reference voltage terminal, a first node between the third transistor and the fourth transistor is electrically connected to the reference voltage connection terminal, and a control electrode of the third transistor and a control electrode of the fourth transistor are electrically connected to the reset control terminal, the switching circuit comprises a fifth transistor, the first terminal of the switching circuit comprises a first electrode of the fifth transistor, the second terminal of the switching circuit comprises a second electrode of the fifth transistor, and the control terminal of the switching circuit comprises a control electrode of the fifth transistor, wherein the pixel driving circuit comprises a driving transistor, a sixth transistor, and a power supply voltage terminal for receiving a power supply voltage, the driving transistor and the sixth transistor are connected in series between the power supply voltage terminal and the first electrode of the first light-emitting element, the first electrode of the fifth transistor is electrically connected to a second node between the driving transistor and the sixth transistor, and the second electrode of the fifth transistor is electrically connected to the first electrode of the second light-emitting element, wherein the display panel further comprises a first gate metal layer on the base substrate, wherein the first gate metal layer comprises a fourth gate metal line, a fifth gate metal line and a sixth gate metal line that extend along the row direction of the pixel circuit array and are spaced apart from each other in the column direction of the pixel circuit array, wherein the fourth gate metal line comprises gates of the third transistor and the fourth transistor, the fifth gate metal line comprises a gate of the fifth transistor, the sixth gate metal line comprises a gate of the sixth transistor, and the fifth gate metal line is located between the fourth gate metal line and the sixth gate metal line.

18. The display panel according to claim 17, wherein the display panel comprises a semiconductor layer on a side of the first gate metal layer facing the base substrate, and the semiconductor layer comprises first electrodes, second electrodes and active layers of the third transistor and the fourth transistor, wherein patterns of first electrodes, second electrodes and active layers of third transistors and fourth transistors in the two adjacent pixel circuits are symmetrical with respect to the first portion, the display panel further comprises a source-drain metal layer on a side of the first gate metal layer facing away from the base substrate, and the source-drain metal layer comprises the first reference voltage line, wherein sources of the third transistors and the fourth transistors in the two adjacent pixel circuits are electrically connected to the first reference voltage line via a same via hole at a connection point between the first portion and the second portion.

* * * * *